US008575285B2

(12) United States Patent
Goto et al.

(10) Patent No.: US 8,575,285 B2
(45) Date of Patent: Nov. 5, 2013

(54) CATALYST FOR LIVING RADICAL POLYMERIZATION

(75) Inventors: Atsushi Goto, Kyoto (JP); Yoshinobu Tsujii, Kyoto (JP); Takeshi Fukuda, Kyoto (JP)

(73) Assignee: Kyoto University (JP)

( * ) Notice: Subject to any disclaimer, the term of this patent is extended or adjusted under 35 U.S.C. 154(b) by 0 days.

(21) Appl. No.: 13/062,688

(22) PCT Filed: Sep. 8, 2009

(86) PCT No.: PCT/JP2009/065694
§ 371 (c)(1),
(2), (4) Date: Jun. 13, 2011

(87) PCT Pub. No.: WO2010/027093
PCT Pub. Date: Mar. 11, 2010

(65) Prior Publication Data
US 2011/0275775 A1    Nov. 10, 2011

(30) Foreign Application Priority Data

Sep. 8, 2008    (JP) .................................. 2008-230334

(51) Int. Cl.
| | | |
|---|---|---|
| C08F 4/00 | (2006.01) | |
| C08F 12/02 | (2006.01) | |
| C07C 19/16 | (2006.01) | |
| C07C 255/50 | (2006.01) | |
| C07C 19/07 | (2006.01) | |
| C07C 25/02 | (2006.01) | |
| C07C 43/247 | (2006.01) | |
| B01J 31/00 | (2006.01) | |
| B01J 27/06 | (2006.01) | |
| B01J 27/135 | (2006.01) | |

(52) U.S. Cl.
USPC ........... 526/206; 526/209; 526/217; 526/346; 570/137; 570/181; 570/182; 568/656; 558/425; 502/224; 502/227; 502/150

(58) Field of Classification Search
USPC .......... 526/346, 206, 209, 217; 502/224, 227, 502/150; 568/656; 558/425
See application file for complete search history.

(56) References Cited

U.S. PATENT DOCUMENTS

| 7,399,814 B2 | 7/2008 | Goto et al. | |
|---|---|---|---|
| 2007/0049715 A1* | 3/2007 | Goto et al. | ..................... 526/346 |
| 2009/0306297 A1 | 12/2009 | Destarac et al. | |

FOREIGN PATENT DOCUMENTS

| EP | 0974604 A2 | 1/2000 |
|---|---|---|
| FR | 2896505 A1 | 7/2007 |

(Continued)

OTHER PUBLICATIONS

"European Application Serial No. 09811616.3, Supplementary European Search Report mailed Oct. 21, 2011", 6 pgs.

(Continued)

*Primary Examiner* — William Cheung
(74) *Attorney, Agent, or Firm* — Schwegman, Lundberg & Woessner, P.A.

(57) ABSTRACT

Provided is a catalyst used for a living radical polymerization method, which contains a central element consisting of carbon and at least one halogen atom binding to the central element. Further, a hydrocarbon compound can be used as a catalyst precursor. A monomer having a radical-reactive unsaturated bond is subjected to a radical polymerization reaction in the presence of the catalyst, consequently a polymer having narrow molecular weight distribution can be obtained, and thus the cost of the living radical polymerization can be remarkably reduced. The present invention is significantly more environmentally friendly and economically excellent than conventional living radical polymerization methods, due to advantages such as low toxicity of the catalyst, low amount of the catalyst used, high solubility of the catalyst, mild reaction conditions, and no coloration/no odor (no need of any post-treatments for a molded article), and the like.

20 Claims, 4 Drawing Sheets

(56) References Cited

FOREIGN PATENT DOCUMENTS

| | | | |
|---|---|---|---|
| JP | 3-263404 A | 11/1991 | |
| JP | 11-269215 A | 10/1999 | |
| JP | 11-269216 A | 10/1999 | |
| JP | 11-322822 A | 11/1999 | |
| JP | 2000-72992 A | 3/2000 | |
| JP | 2002-249505 A | 9/2002 | |
| JP | 2005-105265 A | 4/2005 | |
| JP | 2007-92014 A | 4/2007 | |
| WO | WO-99/20659 A1 | 4/1999 | |
| WO | WO-02/30996 A2 | 4/2002 | |

OTHER PUBLICATIONS

"International Application Serial No. PCT/JP2009/065694, International Preliminary Report on Patentability completed Jan. 4, 2011", (w/ English Translation), 21 pgs.

"International Application Serial No. PCT/JP2009/065694, Written Opinion mailed Dec. 15, 2009", 6 pgs.

"Machine Translation of JP 2005-105265A", 79 pgs, Apr. 21, 2005.

"International Application Serial No. PCT/JP2009/065694, International Search Report mailed Dec. 15, 2009", (w/ English Translation), 10 pgs.

Goto, A., et al., "Germanium- and Tin-Catalyzed Living Radical Polymerizations of Styrene", *Polymer Preprints*, 46(2), (2005), 245-246.

Matyjaszewski, T. E., et al., "Controlled/"Living" Radical Polymerization. Kinetics of the Homogeneous Atom Transfer Radical Polymerization of Styrene", *Journal of the American Chemical Society*, 119(4), (1997), 674-680.

\* cited by examiner

CATALYST FOR LIVING RADICAL POLYMERIZATION

This application is a nationalization under 35 U.S.C. 371 of PCT/JP2009/065694, filed Sep. 8, 2009 and published as WO 2010/027093 A1 on Mar. 11, 2010, which claimed priority under 35 U.S.C. 119 to Japanese Patent Application No. 2008-230334, filed Sep. 8, 2008; which applications and publication are incorporated herein by reference in their entirety.

TECHNICAL FIELD

The present invention is directed to a highly active catalyst, which is used in a living radical polymerization method, and a polymerization method using the catalyst. More specifically, the present invention uses a catalyst having carbon as a central element in a living radical polymerization method.

BACKGROUND ART

A radical polymerization method has been a well-known method for polymerizing vinyl monomers to obtain a vinyl polymer. Generally, a radical polymerization method has the disadvantage of the difficulty in controlling the molecular weight of the obtained vinyl polymer. Further, there is the disadvantage that the obtained vinyl polymer is a mixture of compounds having various molecular weights, and thus it is difficult to obtain a vinyl polymer having narrow molecular weight distribution. Specifically, even if the reaction is controlled, the ratio of weight-average molecular weight ($M_w$) and number-average molecular weight ($M_n$), ($M_w/M_n$), can be only reduced to about 2 to 3.

As a method for eliminating the aforementioned disadvantages, since around 1990, a living radical polymerization method has been developed. Specifically, according to the living radical polymerization method, it is possible to control the molecular weight. It is also possible to obtain a polymer having narrow molecular weight distribution. Specifically, a polymer having $M_w/M_n$ of 2 or less can easily be obtained. Therefore, this method has come into the limelight as a method for producing a polymer used in advanced technology such as nanotechnology.

Catalysts which are currently used in living radical polymerization methods include transition metal complex-type catalysts.

For transition metal complex-type catalysts, complexes in which a ligand is coordinated to a compound having a central metal of Cu, Ni, Re, Rh, Ru, or the like have been used. Such catalysts are described in the following documents for example.

Patent Document 1 (Japanese Laid-open Publication No. 2002-249505) discloses that a complex, in which Cu, Ru, Fe, Ni or the like is a central metal, is used as a catalyst.

It should be noted that Patent Document 1 describes in its claim 1 that an organic halide is used as a polymerization initiator. This description is not intended to mean that a halogenated hydrocarbon acts as a catalyst for living radical polymerization. According to the invention of Patent Document 1, a metal complex having a transition metal as the central metal is used as the catalyst for living radical polymerization. According to the invention of Patent Document 1, an organic halide is used as a dormant species that will be described later in the present specification.

Patent Document 2 (Japanese Laid-open Publication No. 11-322822) discloses that a hydrido rhenium complex is used as a catalyst.

It should be noted that Patent Document 2 describes a "catalyst for radical living polymerization comprising a combination of a hydrido rhenium complex and a halogenated hydrocarbon" in claim 1. This description is not intended to mean that a halogenated hydrocarbon acts as a catalyst for living radical polymerization. According to the invention of Patent Document 2, the hydrido rhenium complex is used as the catalyst for living radical polymerization. According to the invention of Patent Document 2, the halogenated hydrocarbon is used as a dormant species that will be described later in the present specification. The combination of the catalyst and the dormant species is described as a catalyst in Patent Document 2, and this does not describe that the halogenated hydrocarbon serves as the catalyst for living radical polymerization.

Non-Patent Document 1 (*Journal of The American Chemical Society* 119, 674-680 (1997)) discloses that a compound in which 4,4'-di-(5-nonyl)-2,2'-bipyridine is coordinated with copper bromide, is used as a catalyst.

It should be noted that Non-Patent Document 1 describes that 1-phenylethyl bromide is used at the time of polymerization of styrene. That is, according to the invention of Patent Document 2, a copper bromide complex is used as a catalyst for living radical polymerization, and 1-phenylethyl bromide is used as a dormant species that will be described later in the present specification.

However, when such a transition metal complex catalyst is used, it is necessary to use a large amount of the catalyst. This is disadvantageous as it is not easy to completely remove the large amount of the catalyst used, from the products after the reaction. Another disadvantage is environmental problems which may occur by the disposal of the catalyst. The transition metal for the living radical polymerization method includes many toxic metals. The disposal of a large amount of such toxic metals causes environmental problems. Furthermore, there are cases where toxicities of catalysts remaining in products cause environmental problems. Due to the toxicity, it is difficult to use the transition metal catalysts for the production of food packages, material for living body, and medical material. Additionally, there is a problem associated with a high electroconductivity of the transition metal remaining in polymer, rendering the polymer conductive and hence unsuitable for use in electronic material such as resist material. Furthermore, the transition metal-type catalysts do not dissolve in a reaction solution unless they form a complex. Therefore, it is necessary to use a ligand as an additive to form a complex. This causes problems, i.e., an increase of the cost of production and also an increase of the total weight of the catalyst used. Further, a ligand is usually expensive and requires a complicated synthesis method. Furthermore, the polymerization reaction requires a high temperature (for example, 110° C. or higher), (For example, in aforementioned Non-patent document 1, the polymerization reaction is performed at 110° C.).

It is noted that a living radical polymerization methods, which do not require a catalyst, have also been known. For example, a nitroxyl-type method and dithioester-type method have been known. However, these methods have the following disadvantages. A special protecting group (i.e., a certain nitroxide or dithioester group) must be introduced to the polymer growing chain. The protecting group is very expensive. Further, the polymerization reaction requires a high temperature (for example, 110° C. or higher). Further, the produced polymer is likely to have undesirable properties. For example, the produced polymer is likely to be colored differently from the natural color of the polymer. Further, the produced polymer is likely to have an odor.

On the other hand, Non-Patent Document 2 (*Polymer Preprints* 2005, 46(2), 245-246) and Patent Document 3 (Japanese Laid-open Patent Publication No. 2007-92014) disclose that compounds having Ge, Sn, or the like as a central metal are used as catalysts.

In regard to the copper complex catalyst described in Non-Patent Document 1, the cost for the catalyst required to polymerize 1 kg of a polymer sums up to approximately several thousand yen. On the other hand, in regard to a germanium catalyst, the cost is cut down to about one thousand yen. Thus, the invention of Non-Patent Document 2 markedly decreases the cost for the catalyst. However, in order to apply living radical polymerization to general-purpose resin products and the like, a further less expensive catalyst is demanded.

In general, it is known that transition metals or compounds of transition metal elements are preferable as catalysts for various chemical reactions. For example, the following is described on page 311 of "*Inorganic Chemistry*" by J. D. LEE (Tokyo Kagaku Dojin, 1$^{st}$ edition published on Apr. 15, 1982): "Many transition metals and the compounds of the transition metals have catalytic action ... in some cases, a transition metal may adopt various valences and form unstable intermediate compounds, while in other cases, a transition metal provides good reaction surfaces, and these serve as catalytic actions." That is, it has been widely understood by those skilled in the art that the properties characteristic to transition metals, such as the ability to form various unstable intermediate compounds, are indispensable in connection with the function of a catalyst.

Furthermore, Ge, Sn, and Sb described in aforementioned Non-Patent Document 2 are not transition metals, but are elements that belong to the 4$^{th}$ period or the 5$^{th}$ period of the Periodic Table and have large atomic numbers, a large number of electrons and a large number of electron orbitals, Therefore, it is surmised in regard to Ge, Sn, and Sb that the fact that these atoms have a large number of electrons and a large number of electron orbitals works advantageously in terms of their action as catalysts.

According to such a common technological knowledge in connection with various catalysts of the prior art, it is believed that the typical elements which belong to the 2$^{nd}$ period and the 3$^{rd}$ period of the Periodic Table, merely have a small number of electrons and a smaller number of electron orbitals, and thus it is disadvantageous to use them in a catalyst compound, and a catalytic action cannot be expected from compounds utilizing these typical elements.

Furthermore, Non-Patent Document 3 discloses a catalyst using a phosphorus compound, but does not describe the use of carbon, which has a different electron configuration and significantly different characteristics from phosphorus, as a central element.

PRIOR ART REFERENCES

Patent Document

[Patent Document 1] Japanese Laid-open Patent Publication No. 2002-249505
[Patent Document 2] Japanese Laid-open Patent Publication No. 11-322822
[Patent Document 3] Japanese Laid-open Patent Publication No. 2007-92014

Non-Patent Document

[Non-Patent Document 1] *Journal of the American Chemical Society* 119, 674-680 (1997)
[Non-Patent Document 2] *Polymer Preprints* 2005, 46(2), 245-246, "Germanium- and Tin-Catalyzed Living Radical Polymerizations of Styrene", American Chemical Society, Division of Polymer Chemistry
[Non-Patent Document 3] *Polymer Preprints* 2007, 56(2), 2452, "A Novel Living Radical Polymerization using Germanium and Phosphorus Compound," The Society of Polymer Science, Japan, 56th Symposium on Macromolecules

SUMMARY OF THE INVENTION

Problems to be Solved by the Invention

The present invention aims to solve the aforementioned problems. It is an objective of the present invention to provide catalysts having high activity for living radical polymerization, and polymerization methods using the catalysts.

Means for Solving Problem

The present inventors earnestly conducted research to solve the above-mentioned problems and, have accomplished the present invention as a result. Specifically, according to the present invention, the following catalyst and polymerization methods are provided, and thereby the aforementioned problems are solved.

(1) A catalyst for a living radical polymerization method, the catalyst comprising:
at least one central element consisting of carbon and
a halogen atom binding to the central element,
wherein the central element is further bound to two or three substituents which are electron-withdrawing substituents or substituents forming a resonance structure together with the central element,
wherein when the number of substituents is two, the two substituents may be linked to each other such that the central element and the two substituents form a ring structure,
when the number of substituents is three, two of the three substituents may be linked to each other such that the two linked substituents and the central element form a ring structure, or the three substituents may be linked to one another to form a ring structure, and
the substituent binding to the central element stabilizes a carbon radical that is generated by elimination of a halogen atom from the central element.

(2) A catalyst for a living radical polymerization method, the catalyst consisting of a compound comprising
at least one central element consisting of carbon and
a halogen atom binding to the central element,
wherein the compound is represented by the following general formula (Ia):

[Formula 3]

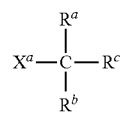

(Ia)

wherein $R^a$ is halogen, or an organic group having a double or triple bond;

when $R^a$ has a double or triple bond, one of the atoms constituting the double or triple bond is bound to the carbon of the central element in the aforementioned formula Ia;

$R^b$ is halogen, or an organic group having a double or triple bond;

when $R^b$ has a double or triple bond, one of the atoms constituting the double or triple bond is bound to the carbon of the central element in the aforementioned formula Ia;

$R^c$ is halogen, hydrogen, or an organic group having a double or triple bond;

when $R^c$ has a double or triple bond, one of the atoms constituting the double or triple bond is bound to the carbon of the central element in formula Ia;

$R^a$ and $R^b$ may be linked to each other such that $R^a$, $R^b$, and the central element form a ring;

$R^a$ and $R^c$ may be linked to each other such that $R^a$, $R^c$, and the central element form a ring;

$R^b$ and $R^c$ may be linked to each other such that $R^b$, $R^c$, and the central element form a ring;

$R^a$, $R^b$, and $R^c$ may be linked to one another such that $R^a$, $R^b$, and $R^c$ form a ring;

$X^a$ is halogen;

$R^a$ and $R^b$ may be taken together with the carbon atom of the central element to form an unsaturated aliphatic ring structure; and $R^a$, $R^b$, and $R^c$ may be taken together with the carbon atom of the central element to form an aromatic ring structure.

(3) The catalyst according to the above item 1, consisting of a compound represented by the following general formula (Ib):

$$R^1 X^1_h \quad\quad (Ib)$$

wherein $R^1$ is aryl, heteroaryl, substituted aryl, or substituted heteroaryl;

the substituent in the substituted aryl or substituted heteroaryl is lower alkyl, lower alkoxy, or cyano;

$X^1$ is halogen, and bound to a carbon atom in an aromatic ring structure of $R^1$; and h is an arbitrary positive integer which is not more than the number of carbon atoms in the aromatic ring structure of $R^1$.

(4) The catalyst according to the above item 3, wherein $R^1$ is phenyl or substituted phenyl; the substituent in the substituted phenyl is lower alkyl, lower alkoxy, or cyano; and the number of substituents in the substituted phenyl is 1 to 5.

(5) The catalyst according to the above item 2, consisting of a compound represented by the following general formula (Ic):

$$CX^2_m I_n \quad\quad (Ic)$$

wherein $X^2$ is halogen, m and n are each integer from 1 to 3, and m+n=4.

(6) The catalyst according to any one of the above items 1 to 4, wherein the halogen binding to the central element is iodine or bromine.

(7) The catalyst according to any one of the above items 1 to 4, wherein the halogen binding to the central element is iodine.

(8) A catalyst for a living radical polymerization method, the catalyst comprising:

at least one central element consisting of carbon and
a halogen atom binding to the central element,
wherein the central element is further bound to two or three electron-donating substituents capable of stabilizing a carbon radical that is generated by elimination of the halogen atom from the central element;

wherein when the number of substituents is two, the two substituents may be linked to each other such that the central element and the two substituents form a ring structure, and when the number of substituents is three, two of the three substituents may be linked to each other such that the two linked substituents and the central element form a ring structure, or the three substituents may be linked to one another to form a ring structure.

(9) A polymerization method comprising a step of conducting a living radical polymerization, wherein the living radical polymerization step is conducted in the presence of the catalyst according to any one of the above items 5 to 8.

(10) A method of conducting a living radical polymerization, the method comprising:

reacting a radical generated from a radical initiator with a catalyst precursor compound to generate an activated radical; and polymerizing a monomer having a radical-reactive unsaturated bond using the activated radical to obtain a polymer, wherein the precursor compound has a carbon atom which becomes a central element, and the carbon atom which becomes the central element is bound to one or two hydrogen atoms, and bound to two or three substituents that are taken together with the central element to form a resonance structure;

wherein when the number of substituents is two, the two substituents may be linked to each other such that the central element and the two substituents form a ring structure, when the number of substituents is three, two of the three substituents may be linked to each other such that the central element and the two linked substituents form a ring structure, or the three substituents may be linked to one another to form a ring structure;

a radical generated from the radical initiator abstracts a hydrogen atom from the carbon atom of the central element in the precursor compound to generate the activated radical;

the activated radical acts as a catalyst for a living radical polymerization in the polymerization reaction of the monomer;

the activated radical, which is generated after the abstraction of the hydrogen atom, is stabilized by a resonance structure formed by the central element and the substituents which are taken together.

(11) The method according to the above item 10, wherein the catalyst precursor compound is a hydrocarbon compound represented by the following formula (Id):

[Formula 4]

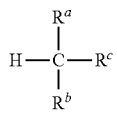

(Id)

wherein $R^a$ is an organic group having a double or triple bond, and one of atoms constituting the double or triple bond is bound to the carbon of the central element in the aforementioned formula Id;

$R^b$ is an organic group having a double or triple bond, and one of the atoms constituting the double or triple bond is bound to the carbon of the central element in the aforementioned formula Id;

$R^c$ is hydrogen, or an organic group having a double or triple bond;

when $R^c$ has a double or triple bond, one of the atoms constituting the double or triple bond is bound to the carbon of the central element in the aforementioned formula Id;

$R^a$ and $R^b$ may be linked to each other such that $R^a$, $R^b$, and the central element form a ring;

$R^a$ and $R^c$ may be linked to each other such that $R^a$, $R^c$, and the central element form a ring;

$R^b$ and $R^c$ may be linked to each other such that $R^b$, $R^c$, and the central element form a ring;

$R^a$, $R^b$, and $R^c$ may be linked to one another such that $R^a$, $R^b$, and $R^c$ form a ring; $R^a$ and $R^b$ may be taken together with the carbon atom of the central element to form an unsaturated aliphatic ring structure; and $R^a$, $R^b$, and $R^c$ may be taken together with the carbon atom of the central element to form an aromatic ring structure.

(12) The method according to the above item 11, wherein $R^a$ is phenyl or substituted phenyl, the substituent in the substituted phenyl is lower alkyl, lower alkoxy, or cyano, and the number of substituents in the substituted phenyl is 1 to 5;

$R^b$ is phenyl or substituted phenyl, the substituent in the substituted phenyl is lower alkyl, lower alkoxy, or cyano, and the number of substituents in the substituted phenyl is 1 to 5; and $R^c$ is hydrogen, phenyl, or substituted phenyl, the substituent in the substituted phenyl is lower alkyl, lower alkoxy, or cyano, and the number of substituents in the substituted phenyl is 1 to 5.

(13) The method according to the above item 11, wherein $R^a$ and $R^b$ are taken together with the carbon atom of the central element to form 1,4-cyclohexanediene or substituted 1,4-cyclohexanediene, and $R^c$ is hydrogen, phenyl, or substituted phenyl, the substituent in the substituted phenyl is lower alkyl, lower alkoxy, or cyano, the number of substituents in the substituted phenyl is 1 to 5.

(14) The method according to any one of the above items 9 to 13, wherein an organic halide having a carbon-halogen bond is used in the living radical polymerization, and a halogen provided from the organic halide is used as a protecting group of a growing chain.

(15) The method according to the above item 14, wherein the carbon atom of the central element which is bound to a halogen in the organic halide, is bound to two methyl groups, or is bound to one methyl group and one hydrogen.

(16) The method according to the above item 14 or 15, wherein a halogen in the organic halide is iodine or bromine.

(17) The method according to any one of the above items 14 to 16, wherein a halogen in the organic halide is iodine.

(18) The method according to any one of the above items 14 to 17, which comprises mixing an azo-type radical initiator with a halogen molecule in a reaction solution, and decomposing the azo-type radical initiator in the reaction solution to produce an organic halide.

(19) The method according to any one of the above items 9 to 18, wherein a concentration of the catalyst in a reaction solution is 0.75 wt % or less.

(20) The method according to any one of the above items 9 to 19, wherein a reaction temperature is 20° C. to 100° C.

(21) The catalyst according to any one of the above items 1 to 8, which is selected from the group consisting of:
iodobenzene;
2,4,6-trimethyliodobenzene;
4-iodoanisole;
3-cyanoiodobenzene;
tetraiodomethane; and
difluorodiiodomethane.

(22) The method according to the above item 11, wherein, in the catalyst precursor compound, $R^a$ is an organic group having a double bond, one of the atoms constituting the double bond is bound to the carbon of the central element in the aforementioned formula Id, and an atom binding to the central element is carbon;

$R^b$ is an organic group having a double bond, one of the atoms constituting the double bond is bound to the carbon of the central element in the aforementioned formula Id, and the atom binding to the central element is carbon; and $R^c$ is hydrogen.

(23) The method according to any one of the above items 10 to 13, wherein the catalyst precursor is selected from the group consisting of:
1,4-cyclohexadiene;
diphenylmethane;
dimesitylmethane;
fluorene;
xanthene;
thioxanthene; and
diethyl malonate.

(24) The method according to the above item 14, wherein a catalyst is used in the living radical polymerization reaction wherein the catalyst is selected from the group consisting of:
iodobenzene;
2,4,6-trimethyliodobenzene;
4-iodoanisole;
3-cyanoiodobenzene;
tetraiodomethane; and
difluorodiiodomethane,

(25) Use of the catalyst according to any one of the above items 1 to 8 and 21 in a living radical polymerization method.

According to the present invention, the following methods are further provided.

(26) The method according to any one of the above items 9 to 19, wherein the living radical polymerization reaction is conducted in the presence of an organic halide having a carbon-halogen bond, wherein the carbon binding to a halogen in the organic halide is bound to two or three carbons.

According to the method of the present invention, for example, in the method according to the above items 9 to 20, the radical polymerization reaction is conducted in the presence of an organic halide having a carbon-halogen bond in addition to the catalyst.

(27) The method according to the above item 14, wherein the organic halide having a carbon-halogen bond is a compound having the following general formula (II):

$$CR^2R^3R^4X^3 \qquad (II)$$

wherein $R^2$ and $R^3$ are each, independently, halogen, hydrogen, or alkyl;

$R^4$ is halogen, hydrogen, alkyl, aryl, heteroaryl, or cyano;

$X^3$ is halogen; and the monomer having a radical-reactive unsaturated bond is selected from the group consisting of:
(meth)acrylic acid ester monomers; aromatic unsaturated monomers (styrene-type monomers); carbonyl-group-containing unsaturated monomers; (meth)acrylonitriles; (meth)acrylamide-type monomers; diene-type monomers; vinyl ester monomers; N-vinyl monomers; (meth)acrylic acid monomer; vinyl halide monomers; and 1-olefin monomers.

Effect of the Invention

According to the present invention, a catalyst having high activity for use in a living radical polymerization and a polymerization method using the catalyst are provided. This catalyst has the advantage of having low toxicity. This catalyst has the advantage of having high solubility in a reaction solution. Therefore, it is not necessary to add a ligand to form a complex. As this catalyst has high activity, the polymerization reaction does not require a high temperature (for example, 110° C. or more). Further, the amount of the catalyst used can be reduced. Furthermore, the polymerization reaction does not require an expensive unique protecting group for protecting a polymer growing chain during a reaction. Additionally, molded products, which are obtained from the polymer obtained by the method of the present invention, have the advantage in which color or odor does not substantially occur during the molding process.

Moreover, the present invention has the following advantages.

(1) Economical Efficiency

A low-priced catalyst (catalyst precursor) is provided.

(2) Safety to the Human Body and Environment.

Most hydrocarbon compounds are non-toxic, and thus if they are taken into the human body, it will be harmless. Accordingly, from the viewpoint of safety, it is not necessary to remove them from a produced polymer. Even in the case of removing them for some reason, because of their characteristics including high water-solubility and the like, the operation for the removal is extremely easy.

(3) Recyclability

A variety of beads bearing a hydrocarbon compound are commercially available. These can be used as a catalyst (catalyst precursor). These beads can be recovered, and can be further used many times.

(4) Effective Utilization of Natural Products

A wide variety of natural hydrocarbon compounds can be utilized as catalysts or catalyst precursors.

(5) Versatility of Usable Monomers

For a variety of monomers, it is made possible to conduct a living radical polymerization. Particularly, in polymerization of a monomer having a highly-reactive functional group, a hydrocarbon compound is hardly affected by the functional group of the monomer, and thus is advantageous. Similarly, it is advantageous when using a solvent having a highly-reactive functional group.

As described above, according to the present invention, a living radical polymerization method, which is significantly more environment-friendly and economically advantageous than conventional methods, has been realized.

MODE FOR CARRYING OUT THE INVENTION

Figure 1:
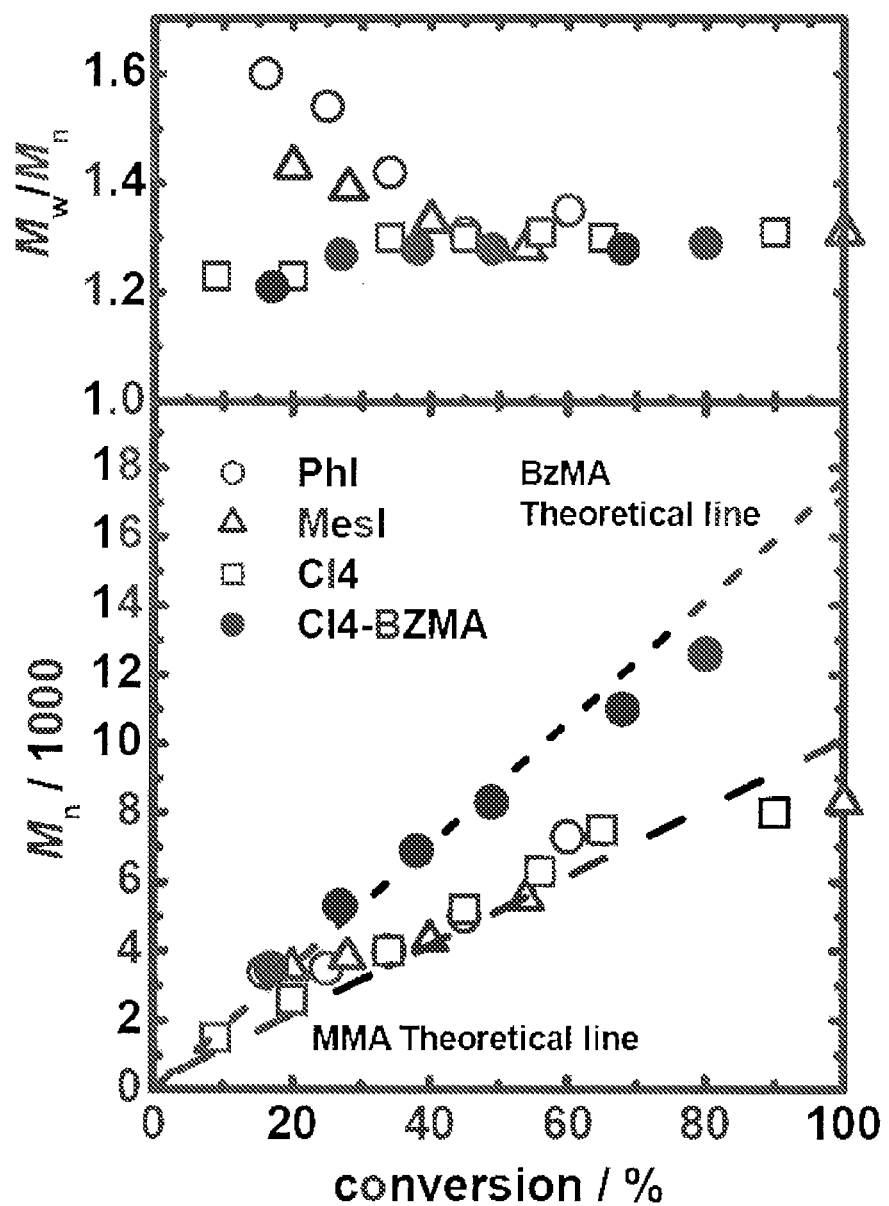
FIG. 1 is a graph plotting $M_n$ and $M_w/M_n$ vs. monomer conversion (ratio of polymerization) in the MMA polymerization (MMA/CP-I/AIBN/carbon iodide catalyst (80° C.)). White circles represent the values of entry 1 as given in Table 1. White triangles represent the values of entry 2 as given in Table 1. White squares represent the values of entry 5 as given in Table 1. Black circles represent the values of entry 6 as given in Table 1. The obtained results are consistent with the theoretical values, which are indicated as Theoretical line.

Hereinbelow, the present invention will be explained in detail.

(General Terms)

Hereinafter, the terms, which are particularly used in the present specification, will be explained.

In the present specification, an "alkyl" refers to a monovalent group which is generated after a chain or cyclic aliphatic hydrocarbon (alkane) loses a hydrogen atom. In the case of a chain alkyl group, the alkyl group is generally represented by $C_kH_{2k+1}$— (wherein k is a positive integer). A chain alkyl group may be a straight chain or branched chain. A cyclic alkyl group may consist only of a cyclic structure. A cyclic alkyl group may have a structure in which a chain alkyl group is linked to the cyclic structure. An alkyl group may have an arbitrary natural number of carbon atoms. Preferably, an alkyl group has 1 to 30 carbon atoms. More preferably, an alkyl group has 1 to 20 carbon atoms.

In the present specification, a "lower alkyl" refers to an alkyl group having a relatively small number of carbon atoms. Preferably, a lower alkyl is a $C_{1-10}$ alkyl group. More preferably, a lower alkyl is a $C_{1-5}$ alkyl group. Further preferably, a lower alkyl is a $C_{1-3}$ alkyl group. For instance, specific examples include methyl, ethyl, propyl, isopropyl, and the like.

In the present specification, an "alkenyl" refers to a monovalent group which is generated after a chain or cyclic aliphatic hydrocarbon (alkene) having a double bond loses a hydrogen atom. In the case of a chain alkene having one double bond, the alkene group is generally represented by $C_kH_{2k-1}$— (wherein k is a positive integer). The number of double bond may be one, alternatively, the number of double bond may be two or more. There is no particular upper limit in the number of double bonds, but the upper limit may be 10 or less, or 5 or less, Preferred is a structure in which double bonds and single bonds are alternately repeated. A chain alkenyl group may be a straight chain or branched chain. A cyclic alkenyl group may consist only of a cyclic structure. A cyclic alkenyl group may have a structure in which a chain structure is linked to the cyclic structure. Furthermore, a double bond may be present on a cyclic structure moiety or chain structure moiety. An alkenyl group may have an arbitrary natural number of carbon atoms. Preferably, an alkenyl group has 1 to 30 carbon atoms. More preferably, an alkenyl group has 1 to 20 carbon atoms.

An alkenyl group may be an alkenyl group having a relatively small number of carbon atoms, i.e., lower alkenyl group. In this case, the number of carbon atom is preferably $C_{2-10}$, more preferably, $C_{2-5}$, and further preferably, $C_{2-3}$. For instance, specific examples of alkenyl include vinyl and the like.

In a preferred embodiment, an alkenyl group has a double bond on the carbon at the end of the carbon chain. Preferably, the terminal carbon having the double bond is bound to a carbon that is a central element in the catalyst compound or the catalyst precursor compound. That is, it is preferable to select an alkenyl group such that a catalyst compound or a catalyst precursor compound has a structure in which a carbon of the double bond is bound to the carbon of the central element:

"C—C≡C".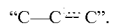

In the present invention, the introduction of such an alkenyl group to the central element can enhance the activity of a catalyst.

In a preferred embodiment, an alkenyl group is represented by the formula: —$CR^7$=$CR^8R^9$. $R^7$, $R^8$, and $R^9$ may be hydrogen, alkyl, or other substituents (for example, alkenyl, alkylcarboxyl, haloalkyl, alkylcarbonyl, amino, cyano, alkoxy, aryl, heteroaryl, or alkyl-substituted aryl). When all of $R^7$, $R^8$, and $R^9$ are hydrogen, this group is a vinyl group.

In the present specification, an "alkynyl" refers to a monovalent group which is generated after a chain or cyclic aliphatic hydrocarbon (alkyne) having a triple bond loses a hydrogen atom. In the cases of a chain alkyne having one triple bond, the alkene group is generally represented by $C_kH_{2k-3}$— (wherein k is a positive integer). The number of triple bond may be one, alternatively, the number of the triple bond may be two or more. There is no particular upper limit in the number of triple bond, but the upper limit may be 10 or less, or 5 or less. Preferred is a structure in which triple bonds and single bonds are alternately repeated. A chain alkynyl group may be a straight chain or branched chain. A cyclic alkynyl group may consist only of a cyclic structure. A cyclic alkynyl group may have a structure in which a chain structure is linked to the cyclic structure. Furthermore, a triple bond may be present on a cyclic or chain structure moiety. An alkynyl group may have an arbitrary natural number of carbon atoms. Preferably, an alkynyl group has 1 to 30 carbon atoms. More preferably, an alkynyl group has 1 to 20 carbon atoms.

An alkynyl group may be an alkynyl group having a relatively small number of carbon atoms, i.e., lower alkynyl group. In this case, the number of carbon atoms is preferably $C_{2-10}$, more preferably, $C_{2-5}$, and further preferably, $C_{2-3}$.

In a preferred embodiment, an alkynyl group has a triple bond on the carbon at the end of the carbon chain. Preferably, the terminal carbon having the triple bond is bound to a carbon that is a central element in the catalyst compound or the catalyst precursor compound. That is, it is preferable to select an alkynyl group such that a catalyst compound or a catalyst precursor compound has a structure in which the carbon of the triple bond is bound to the carbon of the central element:

"—C—C≡C".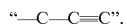

In the present invention, the introduction of such an alkynyl group to the central element can enhance the activity of a catalyst.

In a preferred embodiment, an alkynyl group is represented by the formula:

—C≡$CR^{10}$.

$R^{10}$ may be hydrogen, alkyl, or other substituents (for example, alkenyl, alkylcarboxyl, haloalkyl, alkylcarbonyl, amino, cyano, alkoxy, aryl, heteroaryl, alkyl-substituted aryl, or alkoxy-substituted heteroaryl).

In the present specification, an "alkoxy" refers to a group in which an oxygen atom is bound to the aforementioned alkyl group. That is, when the alkyl group is represented by R—, the alkoxy refers to a group represented by RO—. A chain alkoxy group may be a straight chain or branched chain. Cyclic alkoxy may consist only of a cyclic structure, or may have a structure in which a cyclic structure is further bound to a chain alkyl. The number of carbon atoms in the alkoxy may be any natural number. The number of carbon atoms is preferably from 1 to 30, and more preferably from 1 to 20.

In the present specification, a "lower alkoxy" refers to an alkoxy group having relatively fewer carbon atoms. The lower alkoxy is preferably $C_{1-10}$ alkoxy, more preferably $C_{1-5}$ alkoxy, and even more preferably $C_{1-3}$ alkoxy. Specific examples thereof include methoxy, ethoxy, butoxy, isopropoxy, and the like.

In the present specification, an "alkylcarboxyl" refers to a group in which a carboxyl group is bound to the aforementioned alkyl group. That is, when the alkyl group is represented by R—, the alkylcarboxyl refers to a group represented by RCOO—. A chain alkylcarboxyl group may be a straight chain or branched chain. A cyclic alkylcarboxyl group may be composed only of a cyclic structure, or may have a structure in which a cyclic structure is further linked to a chain alkyl. The number of carbon atoms in the alkylcarboxyl may be any natural number. The number of carbon atoms is preferably from 1 to 30, and more preferably from 1 to 20.

In the present specification, a "lower alkylcarboxyl" refers to an alkylcarboxyl group having relatively fewer carbon atoms. The lower alkylcarboxyl is preferably $C_{1-10}$ alkylcarboxyl, more preferably $C_{1-5}$ alkylcarboxyl, and even more preferably $C_{1-3}$ alkylcarboxyl.

In the present specification, an "alkylcarbonyl" refers to a group in which a carbonyl group is bound to the aforementioned alkyl group. That is, when the alkyl group is represented by R—, the alkylcarbonyl refers to a group represented by RCO—. A chain alkylcarbonyl group may be a straight chain or branched chain. Cyclic alkylcarbonyl may be composed only of a cyclic structure, or may have a structure in which a cyclic structure is further linked to a chain alkyl. The number of carbon atoms in the alkylcarbonyl may be any natural number. The number of carbon atoms is preferably from 1 to 30, and more preferably from 1 to 20.

In the present specification, a "lower alkylcarbonyl" refers to an alkylcarbonyl group having relatively fewer carbon atoms. The lower alkylcarbonyl is preferably $C_{1-10}$ alkylcarbonyl, more preferably $C_{1-5}$ alkylcarbonyl, and even more preferably $C_{1-3}$ alkylcarbonyl.

In the present specification, a "haloalkyl" refers to a group in which a hydrogen atom of the aforementioned alkyl group is substituted with a halogen atom. A chain haloalkyl group may be a straight chain or branched chain. A cyclic haloalkyl group may be composed only of a cyclic structure, or may have a structure in which a cyclic structure is further linked to chain alkyl. The number of carbon atoms in the haloalkyl may be any natural number. The number of carbon atoms is preferably from 1 to 30, and more preferably from 1 to 20. In the haloalkyl, all of the hydrogen atoms may be substituted with halogen, or only some of the hydrogen atoms may be substituted.

In the present specification, a "lower haloalkyl" refers to a haloalkyl group having relatively fewer carbon atoms. The lower haloalkyl is preferably $C_{1-10}$ haloalkyl, more preferably $C_{1-5}$ haloalkyl, and even more preferably $C_{1-3}$ haloalkyl. Specific examples of a preferable lower haloalkyl group include a trifluoromethyl group, and the like.

In the present specification, a "substituted alkyl" refers to a group in which a hydrogen atom of an alkyl group is substituted with a substituent. Examples of such a substituent include aryl, heteroaryl, cyano, and the like.

In the present specification, a "halogenated substituted alkyl" refers to a compound in which a hydrogen of an alkyl group is substituted with a halogen, and another hydrogen of the alkyl group is substituted with another substituent. Examples of such other substituent include aryl, heteroaryl, cyano, and the like.

In the present specification, an "aryl" refers to a group which is generated after one hydrogen atom bound to a ring of an aromatic hydrocarbon is removed. The number of aromatic hydrocarbon ring constituting an aryl may be one, alternatively, may be two or more. Preferred number of aromatic hydrocarbon ring is one to three. When there are a plurality of aromatic hydrocarbon rings in a molecule, the plurality of rings may be fused or may not be fused. Specifically, for example, an aryl includes phenyl, naphthyl, anthracenyl, biphenyl, and the like.

In the present specification, a "heteroaryl" refers to a group in which elements constituting the ring skeleton of an aromatic ring of aryl contain a heteroatom other than carbon. Examples of heteroatoms include, specifically, oxygen, nitrogen, sulfur, and the like. The number of heteroatom in the aromatic ring is not particularly limited. The aromatic ring may contain, for example, only one heteroatom, or may contain two, three, or four or more heteroatoms.

In the present specification, a "substituted aryl" refers to a group which is generated after a substituent binds to an aryl group. In the present specification, a "substituted heteroaryl" refers to a group which is generated after a substituent binds to a heteroaryl group.

In the present specification, a "halogen" refers to a monovalent radical of an element, which belongs to the 7B group of the periodic table, such as a fluorine (F), chlorine (Cl), bromine (Br) and iodine (I). Preferred is bromine or iodine, and more preferred is iodine.

In the present specification, a "living radical polymerization" refers to a polymerization reaction, in which a chain transfer reaction does not substantially occur in a radical polymerization reaction and a termination reaction does not substantially occur in the radical polymerization reaction, and the growing chain end maintains the activity even after the monomers have been exhaustively reacted. According to this polymerization reaction, after completion of a polymerization reaction, a terminal of the generated polymer maintains the polymerization activity. When a monomer is added, it is possible to start the polymerization reaction again.

A living radical polymerization is characterized in that, for example, a polymer having an arbitrary average molecular weight can be synthesized by adjusting the ratio of concentrations of a monomer and polymerization initiator, and the generated polymer has very narrow molecular weight distribution, and can be applied to a block copolymer. It is noted that a living radical polymerization is sometimes abbreviated as "LRP".

In the present specification, a "central element" refers to an atom which is bound to a halogen atom and contributes mainly to a catalytic action among atoms constituting a compound that becomes a catalyst. The "central element" has the same meaning as the term "central metal", which is used in the prior art. However, carbon, which is used in the present invention, is generally not classified as metal. Therefore, in order to avoid misunderstanding, the term "central element" is used in place of the term "central metal" in the prior art.

Hereinafter, the present invention will be explained in detail.

(Catalyst)

According to the present invention, a compound of which the central element is carbon is used as a catalyst for a living radical polymerization method.

An atom bound to a central element preferably has a double bond or triple bond between the atom and an adjacent atom (for example, carbon). That is to say, the atom bound to the carbon which is the central element is preferably carbon having an unsaturated bond in any group of an alkenyl group (e.g., vinyl group), alkynyl group, aryl group (e.g., phenyl group), or heteroaryl group. Furthermore, in the case of an alkenyl group or alkynyl group, preferably, a double bond or triple bond is present at the terminal thereof, and particularly preferably, the terminal carbon thereof is bound to the carbon of the central element. It should be noted the fact that such a structure is preferable and similarly also applies to a catalyst precursor compound described later. It should be noted that the double bond may be a double bond between two carbon atoms (carbon-carbon double bond), or may be another double bond. For example, it may be a double bond between a carbon atom and an oxygen atom. Preferably, at least one of the two atoms constituting a double bond is carbon, more preferably, both two atoms are carbon. In addition, preferably, at least one of the two atoms constituting a double bond is a carbon atom, which is bound to the central element. Further, a triple bond may be a triple bond between two carbon atoms (carbon-carbon triple bond), or may be another triple bond. For example, it may be a triple bond between a carbon atom and a nitrogen atom. Preferably, at least one of the two atoms constituting a triple bond is carbon, and more preferably, both atoms are carbon. Furthermore, preferably, at least one of the two atoms constituting a triple bond is a carbon atom, which is bound to the central element.

It is believed that in the case where oxygen of a catalyst or catalyst precursor compound in which the carbon as a central element is bound to a carbon of a double bond or triple bond as described above becomes an oxygen radical, resonance stabilization causes the oxygen radical to be stable and thus the performance as a living radical polymerization catalyst becomes well.

According to the present invention, the catalyst can be used in combination with an organic halide having a carbon-halogen bond, which is used as a kind of dormant species. The catalyst abstracts the halogen from this organic halide at the time of the living radical polymerization, and generates a radical. Therefore, according to the present invention, the catalyst detaches a group of the compound used as a dormant species, which suppresses a growing reaction, and converts the compound into an active species, thereby controlling the growing reaction. It should be noted that the dormant species is not limited to organic halogen.

It is noted that Patent Document 2 describes in its claim 1 that a combination of a hydrido rhenium complex and a halogenated hydrocarbon is a catalyst for radical living polymerization. However, since the halogenated hydrocarbon described in Patent Document 2 is not a catalyst for living radical polymerization but corresponds to a dormant species, the halogenated hydrocarbon described in Patent Document 2 is distinguished from catalysts.

The catalyst compound has at least one central element. In one preferred embodiment, the catalyst compound has one central element. However, a catalyst compound may have two or more central elements. For example, the catalyst compound can be a compound in which a plurality of molecules of the compounds of the above formula (Ia) are connected with each other. Furthermore, for example, in the compound of the above formula (Ib), a plurality of carbon atoms present in the ring structures can be bound to a halogen, and consequently each carbon atom can become a central element.

Many catalyst compounds using carbon as the central element do not have electroconductivity. Thus, for example, when a polymer is used for an application where it is not desirable that a conductive material remains in the polymer (for example, electronic material such as materials for resistor or organic electroluminescence material), it is preferable to use a carbon compound, which has no electroconductivity, as a catalyst.

Further, carbon is also advantageous in terms of toxicity to the human body and influence to the environment. Therefore, even if some conductive materials are permitted to remain, it is much more advantageous to use a catalyst containing carbon than a transition metal complex catalyst, which is used in prior art.

Furthermore, the catalyst of the present invention has the characteristic that a small amount of the catalyst can exert its catalytic action. Therefore, as described above, it was made possible that material having little toxicity to the human body and little influence to the environment is used in a small amount. The catalyst of the present invention is much superior to a conventional catalyst.

(Halogen Atom in the Catalyst)

In the aforementioned compound of the catalyst, at least one halogen atom is bound to the central element. If the aforementioned compound of the catalyst has two or more central elements, at least one halogen atom is bound to each of the central elements. The halogen atom is preferably, chlorine, bromine or iodine. More preferably, the halogen atom is iodine. Two or more halogen atoms may exist in one molecule. For example, two atoms, three atoms, or four atoms may exist in one molecule. Further, more than four atoms may exist in one molecule. Preferably, two to four halogen atoms exist in one molecule. When there are two or more halogen atoms in one molecule, the plurality of halogen atoms may be the same or different.

(Groups Other than Halogen in the Catalyst)

If necessary, the compound of the catalyst may have a group other than halogen. For example, it is possible that an arbitrary organic group or inorganic group is bound to the central element.

Such a group may be an organic group or an inorganic group. An organic group includes an aryl, heteroaryl group, substituted aryl, substituted heteroaryl group, alkenyl group (e.g., vinyl group), alkynyl group, alkoxy group (such as methoxy group, ethoxy group, propoxy group, butoxy group, and the like), ester group (aliphatic carboxylic acid ester and the like), alkylcarbonyl group (methylcarbonyl group and the like), haloalkyl group (trifluoromethyl group and the like) and the like. In one preferred embodiment, an organic group is an aryl, heteroaryl group, substituted aryl, substituted heteroaryl group, alkenyl group (e.g., vinyl group), or alkynyl group.

Further, the inorganic group includes a hydroxyl group, amino group, cyano group and the like.

Regarding a catalyst compound having aryl, heteroaryl, substituted aryl, or substituted heteroaryl as an organic group, its radical tends to have higher activity, and thus it is preferable.

In a substituted aryl or substituted heteroaryl group, substituents bound to the aryl or the heteroaryl group include, for example, an alkyl group, alkyloxy group, cyano group, amino group, and the like. The alkyl group is preferably a lower alkyl group, more preferably, a $C_1$ to $C_5$ alkyl group. The alkyl is further preferably a $C_1$ to $C_3$ alkyl group, and particularly preferably a methyl group. The alkyl group in the alkyloxy group is preferably a lower alkyl group, more preferably a $C_1$ to $C_5$ alkyl group, further preferably a $C_1$ to $C_3$ alkyl group, and particularly preferably a methyl group. Thus, in one embodiment, an organic group bound to the central element is a phenyl group, lower alkyl phenyl group, or lower alkyloxy phenyl group.

There is no particular limitation for the number of the aforementioned organic groups and inorganic groups. However, the number of the aforementioned organic groups or inorganic groups is preferably three or less, and more preferably one.

It is noted that there is no particular limitation for the number of the substituents in the substituted aryl or substituted heteroaryl group. However, the number of the substituents in the substituted aryl or substituted heteroaryl group is preferably 1 to 3, more preferably 1 to 2, and further preferably 1.

Regarding the position of the substituent in the substituted aryl or substituted heteroaryl, an arbitrary position may be selected. When the aryl group is a phenyl group (that is, when the substituted aryl group is a substituted phenyl group), the position of the substituent may be ortho, meta, or para with respect to the central element. Preferably, the position is at para.

(Catalyst Compound Having Carbon as a Central Element)

As catalyst compounds having carbon as a central element, any known compounds falling under the above-described definition can be used. Preferred are compounds in which the carbon of the central element is not bound to hydrogen or methyl. Preferred specific examples of catalyst compounds having carbon as a central element include, for example, compounds as used in Examples described later.

The central element is further bound to one to three, preferably, two or three substituents which are electron-withdrawing substituents or substituents forming a resonance structure together with the central element. That is, preferably, two to three electron-withdrawing substituents are bound; two to three substituents that are taken together with the central element to form a resonance structure are bound; or two to three in total of the electron-withdrawing substituent and the substituent that is taken together with the central element to form a resonance structure, are bound. It is more preferable that two to three electron-withdrawing substituents are bound, or two to three substituents that are taken together with the central element to form a resonance structure are bound.

It should be noted that in the present specification, "radical-stabilizing substituent" is given as a general name to the above electron-withdrawing substituent and the above substituent that is taken together with the central element to form a resonance structure, and the electron-donating substituent.

The radical-stabilizing substituent binding to the central element stabilizes a carbon radical which is generated by elimination of a halogen atom from the central element. The stabilization of a carbon radical highly increases catalytic activity, and consequently it is made possible to control a living radical polymerization using a small amount of catalyst.

It should be noted that the carbon of the central element may be bound to one or two substituents other than the aforementioned halogen and radical-stabilizing substituents. An example of substituents other than the halogen and radical-stabilizing substituents is hydrogen. With regard to the substituent other than halogen and radical-stabilizing substituents, the number thereof is preferably 1 or less, and more preferably the substituent is absent.

In one embodiment, a compound in which an electron-donating substituent is not bound to the central element, can be used.

In another embodiment, an electron-donating substituent that can stabilize a carbon radical which is generated by elimination of a halogen atom from the central element, can be used in the present invention. As a catalyst compound, for example, a compound in which one to three, preferably, two to three electron-donating substituents are bound to the central element wherein the electron-donating substituents can stabilize a carbon radical which is generated by elimination of a halogen atom from the central element, may be used.

In a compound having the electron-withdrawing substituent; the substituent that is taken together with a central element to form a resonance structure; or the electron-donating substituent, when two radical-stabilizing substituents binding to the central element are present, the two radical-stabilizing substituents may be linked to each other. That is, the two radical-stabilizing substituents and the central element may form a ring structure. Further, when three radical-stabilizing substituents are present, two of the three radical-stabilizing substituents may be linked to each other, or the three radical-stabilizing substituents may be linked to one another. That is, two radical-stabilizing substituents and the central element may form a ring structure, or the three radical-stabilizing substituents may form a ring structure.

It should be noted that it is possible that a structure in which two radical-stabilizing substituents are linked to each other is considered as one divalent large radical-stabilizing substituent as a whole. However, for convenience, in the present specification, it is described that two radical-stabilizing substituents are present and linked. That is, when the mechanism of the present invention is discussed, it is not important to consider one divalent large radical-stabilizing substituent as a whole. Rather, it is important that two atoms thereof are bound to the carbon atom of the central element and affect the electronic state of the carbon atom.

For example, fluorene, which is used in Examples described later, has a structure in which two positions of biphenyl are bound to a methylene group. However, in the present specification, it is described to have a structure in which the two phenyl groups are bound to a methylene group, and the phenyl groups are linked to each other. Moreover, in fluorene, the two phenyl groups affect the electronic state of the central element.

Furthermore, it is possible that the structure in which three radical-stabilizing substituents are linked to one another is considered as one trivalent large radical-stabilizing substituent as a whole. However, for convenience, in the present specification, it is described that three radical-stabilizing substituents are present and linked.

(Electron-Withdrawing Substituent)

An electron-withdrawing substituent refers to a substituent that is bound to a carbon of a central element and withdraws an electron from the carbon of the central element. Preferred electron-withdrawing substituent is halogen, specifically, fluorine, chlorine, bromine, or iodine. Even when an electron-withdrawing substituent is not halogen, a substituent that withdraws an electron from carbon of a central element at the same level as halogen (e.g., fluorine, chlorine, bromine, or iodine), can be preferably used. Examples of such substituents include oxygen in a carbonyl (=O), cyano group, nitro group, and the like.

(Electron-Donating Substituent)

An electron-donating substituent refers to a substituent that is bound to a carbon of a central element and donates an electron to the carbon of the central element. Examples of such substituents include alkoxy group and the like.

(Substituent that Forms a Resonance Structure)

A substituent that is taken together with a central element to form a resonance structure refers to a substituent having a double or triple bond, and a structure in which an atom constituting the double or triple bond is bound to the central element. That is, three atoms consisting of the central element and the atoms constituting a double or triple bond are bound so as to have the structure:

$$\text{"C-M}^1\text{=M}^2\text{"} \quad \text{(formula IIIa) or}$$

$$\text{"C-M}^3\text{≡M}^4\text{"} \quad \text{(formula IIIb).}$$

That is, in the structures, the central element is adjacent to the double or triple bond.

In the above formulas IIIa and IIIb, $M^1$ is an atom that constitutes the double bond and is bound to the central element. $M^2$ is an atom constituting the double bond. $M^3$ is an atom that constitutes the triple bond and is bound to the central element. $M^4$ is an atom constituting the triple bond. Since those have such structures, when the central element becomes a carbon radical, the resonance effect from the carbon radical and electron of the double or triple bond stabilizes the carbon radical, which consequently exhibits high activity as a catalyst.

Specific examples of $M^1$ include, for example, carbon, silicon, phosphorus, nitrogen, and the like. Preferably, $M^1$ is carbon. When $M^1$ is a tetravalent atom, $M^1$ further has one monovalent group. Such a group can be hydrogen, alkyl, or the like. When $M^1$ is a pentavalent atom, $M^1$ further has one divalent group, or two monovalent groups. Such a group can be hydrogen, alkyl, or the like.

Specific examples of $M^2$ include, for example, carbon, silicon, phosphorus, nitrogen, oxygen, and the like. Preferably, $M^2$ is carbon. When $M^2$ is a trivalent atom, $M^2$ further has one monovalent group. Such a group can be hydrogen, alkyl, or the like. When $M^2$ is a tetravalent atom, $M^2$ further has one divalent group, or two monovalent groups. Such a group can be hydrogen, alkyl, or the like. When $M^2$ is a pentavalent atom, $M^2$ further has one trivalent group, $M^2$ further has one divalent group and one monovalent group, or $M^2$ further has three monovalent groups. Such a group can be hydrogen, alkyl, or the like.

Specific examples of $M^3$ include, for example, carbon, silicon, phosphorus, and the like. Preferably, $M^3$ is carbon. When $M^3$ is a pentavalent atom, $M^3$ further has one monovalent group. Such a group can be hydrogen, alkyl, or the like.

Specific examples of $M^4$ include, for example, carbon, silicon, phosphorus, nitrogen, and the like. Preferably, $M^4$ is carbon. When $M^4$ is a tetravalent atom, $M^4$ further has one monovalent group. Such a group can be hydrogen, alkyl, or the like. When $M^4$ is a pentavalent atom, $M^4$ further has one divalent group or two monovalent groups. Such a group can be hydrogen, alkyl, or the like.

In one preferred embodiment, $M^1$ and $M^2$ are both carbon. When the central element has a substituent having a double bond between two carbon atoms, that is, when $M^1$ and $M^2$ are carbon, the double bond between the carbon atoms may be an aromatic double bond, or an ethylenic double bond. For example, preferred is a structure in which the central element is bound to alkenyl or alkynyl, or a structure in which the central element is bound to aryl, heteroaryl, substituted aryl, or substituted heteroaryl. In addition, since it is preferable that the catalyst is not polymerized during a radical reaction, significantly preferred is a structure in which the central element is bound to aryl, heteroaryl, substituted aryl, or heteroaryl. In the case of an ethylenic double bond, it is preferable that radical polymerization reactivity thereof is low.

Preferably, the central element has two or three substituents having the above-described double or triple bond. That is, preferred is the structure in which the central element intervenes between two or three double or triple bonds.

For example, the structure in which the central element intervenes between two double bonds, is as shown below:

"$M^6=M^5-C-M^7=M^8$"  (formula IIIc)

wherein $M^5$ and $M^7$ are the same atoms as the aforementioned $M^1$, and $M^6$ and $M^8$ are the same atoms as the above $M^2$. In the case of a compound having such a structure, during a living radical polymerization, the carbon atom of the central element becomes a stable carbon radical, the compound exhibits high activity as a catalyst.

When two substituents that are taken together with the central element to form a resonance structure are present, it is preferable that the two substituents and the central element constitute one resonance structure as a whole. For example, it is preferable that the two substituents and the central element constitute an aromatic ring structure as a whole. As a more specific example, for example, iodobenzene can be considered to have a structure in which a substituent consisting of hydrocarbon at the 2-, 3-, and 4-positions, and a substituent consisting of hydrocarbon at the 5- and 6-positions are bound to the carbon atom at the 1-position; and the two substituents are linked between the 4-position carbon and the 5-position carbon. Further, a benzene ring that is constituted as a whole of the two substituents and the central element, constitutes one resonance structure. The resonance structure stabilizes a radical on the central element.

In one preferred embodiment, a catalyst compound is represented by the following general formula Ie below:

[Formula 5]

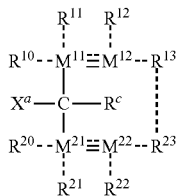

(Ie)

wherein $M^{11}$ is an atom binding to the central element, and is preferably carbon, silicon, phosphorus, or nitrogen, more preferably, carbon. $M^{12}$ is an atom binding to $M^{11}$, and is preferably carbon, silicon, phosphorus, nitrogen, or oxygen, more preferably, carbon or oxygen. The bond between $M^{11}$ and $M^{12}$ is a double or triple bond. $R^{10}$ and $R^{11}$ are any substituents present depending on the valence of $M^{11}$, and are, for example, hydrogen, alkyl, alkoxy, or the like. $R^{12}$ and $R^{13}$ are any substituents present depending on the valence of $M^{12}$, and are, for example, hydrogen, alkyl, alkoxy, or the like.

$M^{21}$ is an atom binding to the central element, and is preferably carbon, silicon, phosphorus, or nitrogen, more preferably, carbon. $M^{22}$ is an atom binding to $M^{21}$, and is preferably carbon, silicon, phosphorus, nitrogen, or oxygen, more preferably, carbon or oxygen. The bond between $M^{21}$ and $M^{22}$ is a double or triple bond. $R^{20}$ and $R^{21}$ are any substituents present depending on the valence of $M^{21}$, and are, for example, hydrogen, alkyl, alkoxy, or the like. $R^{22}$ and $R^{23}$ are any substituents present depending on the valence of $M^2$, and are, for example, hydrogen, alkyl, alkoxy, or the like. In addition, $R^{13}$ may be linked with $R^{23}$.

In one preferred embodiment, a catalyst compound is represented by the following general formula If:

[Formula 6]

(If)

wherein $M^{41}$ is an atom binding to the central element, and is preferably carbon, silicon, phosphorus, or nitrogen, more preferably, carbon. $M^{42}$ is an atom binding to $M^{41}$, and is preferably carbon, silicon, phosphorus, nitrogen, or oxygen, more preferably, carbon or oxygen. $R^{40}$ and $R^{41}$ are any substituents present depending on the valence of $M^{41}$, and are, for example, hydrogen, alkyl, alkoxy, or the like. $R^{42}$ and $R^{43}$ are any substituents present depending on the valence of $M^{42}$, and are, for example, hydrogen, alkyl, alkoxy, or the like.

$M^{51}$ is an atom binding to the central element, and preferably carbon, silicon, phosphorus, or nitrogen, more preferably, carbon. $M^{52}$ is an atom binding to $M^{51}$, and preferably carbon, silicon, phosphorus, nitrogen, or oxygen, more preferably, carbon or oxygen. $R^{50}$ and $R^{51}$ are any substituents present depending on the valence of $M^{51}$, and are, for example, hydrogen, alkyl, alkoxy, or the like. $R^{52}$ and $R^{53}$ are any substituents present depending on the valence of $M^{52}$, and are, for example, hydrogen, alkyl, alkoxy, or the like.

In addition, $R^{43}$ may be linked with $R^{53}$. Moreover, when $R^{53}$ is absent, $R^{43}$ may be directly linked to $M^{52}$. The structural formula in this case is shown below:

[Formula 7]

(Ig)

In this case, when one of the atoms constituting $R^{43}$ is bound to $M^{42}$ and is also bound to $M^{52}$, a stable 6-membered ring can be formed, and thus it is preferred. In one preferred embodiment, $R^{43}$ is CH or N; the bond between $M^{42}$ and $R^{43}$ is a single bond; $R^{53}$ is absent; $R^{43}$ is directly bound to $M^{52}$; and the bond between $R^{43}$ and $M^{52}$ is a double bond. In this case, a highly stable resonance structure is formed with the 6-membered ring.

Moreover, when $R^{43}$ and $R^{53}$ are both absent, $M^{42}$ may be directly bound to $M^{52}$. In this case, the carbon atom of the central element together with $M^{41}$, $M^{42}$, $M^{51}$, and $M^{52}$ form a 5-membered ring.

It should be noted that a substituent which is taken together with the central element to form a resonance structure, may be an electron-withdrawing substituent or an electron-donating substituent.

(Specific Examples of Catalyst Compounds Having Carbon as a Central Element)

Further, preferred examples of catalyst compounds having carbon as a central element include carbon-halide (e.g., CI$_4$), alkyl halide and aryl halide (e.g., R$^1$$_3$CX, R$^1$$_2$CX$_2$, and R$^1$CX$_3$, such as diiododiphenylmethane (Ph$_2$CI$_2$)), and heteroaryl halide, and the like. PE-I, CP-I, and the like, which are described later, act only as dormant species, and do not act as catalyst. Similarly to PE-I and CP-I, compounds in which a carbon binding to a halogen is bound to one or more hydrogens and one or more methyl groups, or compounds in which a carbon binding to a halogen is bound to two or more methyl groups do not act as catalyst.

It has previously been known that organic halide is used as dormant species, which is described later. A dormant species is used in combination with a catalyst for a living radical polymerization. A halogen is eliminated from a dormant species by an action of the catalyst, and thereby a radical (the growing species in polymerization) is generated and then a polymerization proceeds. In the present invention, alkyl halide (such as PE-I, CP-I, or the like) is always used as dormant species regardless of the type of the catalyst. In the present invention, when a compound having carbon as a central element is used as a catalyst, an alkyl halide differing from a dormant species in the structure and reactivity is used as a catalyst in combination with an alkyl halide that becomes a dormant species, such as PE-I, CP-I, and the like. It is necessary that an alkyl halide which becomes a catalyst has strong affinity for halogen (the strength to abstract a halogen from a dormant species is high), and is not reacted with a monomer (the alkyl halide does not become the growing species in polymerization). In general, preferred is an alkyl halide that is slightly more electronically unstable (more reactive) and slightly bulkier than PE-I and CP-I in order to avoid a reaction with a monomer. That is, it is preferable that a catalyst has a weak carbon-halogen bond and thus easily becomes a carbon radical by releasing a halogen; and the carbon radical has high strength to abstract a halogen from a dormant species.

Previously, it was not believed that organic halide including these alkyl halides and the like can act as catalyst. Thus, there is no prior art in which alkyl halide was used as a catalyst.

However, through the inventors' research, it was found that there is an error in the conventional common general knowledge that all organic halides can act only as dormant species. That is, it was found that a radical based on electron in a p-orbital or a hybrid orbital of s- and p-orbitals (e.g., sp$^3$ hybrid orbital) can be effective as a catalyst. Thus, it was found that a radical based on electrons in a p-orbital or a hybrid orbital of s- and p-orbitals in organic halides including the aforementioned organic alkyl halides and the like can also act as catalyst.

Such organic halides that can act as catalyst can easily be confirmed by conducting an experiment of a radical reaction. Specifically, an organic halide is combined with a typical dormant species (e.g., PE-I); then an experiment of a living radical polymerization reaction is carried out; and if narrow molecular weight distribution is obtained, it is confirmed that the organic halide acts as a catalyst.

A catalyst compound which does not have a radically reactive double bond is preferred.

Preferred specific examples of catalyst compounds having carbon as a central element are described below:

(1) Compounds in which a halogen (preferably iodine) is directly bound to an aromatic ring, can be used. For example, compounds having the following structures can be used:

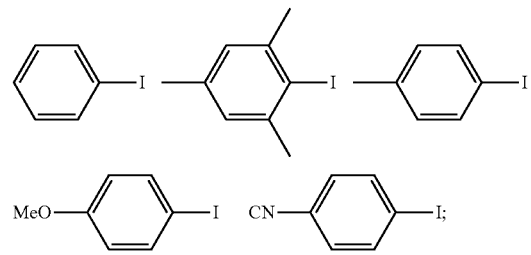

[Formula 8]

(2) Compounds in which a halogen (preferably iodine) is bound to a carbon adjacent to a conjugated aliphatic double bond, can be used. Particularly, compounds in which iodine is bound to the carbon intervening between two double bonds, can be used. For example, compounds having the following structures can be used:

[Formula 9]

(3) Compounds in which a halogen (preferably iodine) is bound to a carbon adjacent to an aromatic double bond, can be used. Particularly, compounds in which a halogen (preferably iodine) is bound to a carbon intervening between two or more aromatic rings, can be used. For example, compounds having the following structures can be used:

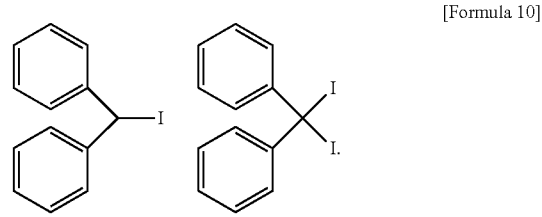

[Formula 10]

Further, compounds in which a halogen (preferably iodine) is bound to a carbon intervening between three aromatic rings, can be used. For example, halogenated triphenylmethane and the like can be used;

(4) Compounds in which a halogen (preferably iodine) is bound to a carbon adjacent to a double bond in an ester linkage or the like, can be used. Particularly, compounds in which a halogen (preferably iodine) is bound to a carbon intervening between two double bonds, can be used. For example, compounds having the following the structures can be used:

[Formula 11]

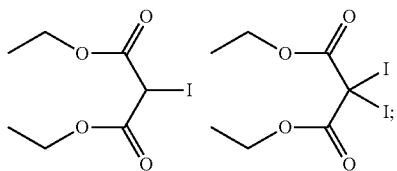

(5) Compound which has the structure C—I (carbon-iodine) or structure C—Br (carbon-bromine) wherein the carbon is further bound to three halogen atoms, can be used. That is, methyl tetrahalide having at least one iodine or bromine can be used. Preferred are compounds having an iodine. For example, compounds having the following structures can be used:

$CI_4CF_3ICF_2I_2$.

However, when methyl tetrahalide has neither I nor Br (e.g., $CCl_4$), it has very low catalytic activity, and thus is not preferred.

(Catalyst Precursor Compound Having Carbon as a Central Element)

A compound that is a precursor of a catalyst having carbon as a central element is a compound in which a halogen bound to a carbon atom in the aforementioned catalyst compound is replaced with a hydrogen. Except for the replacement of a halogen with hydrogen, the above description concerning a catalyst compound, basically as it is, applies to a catalyst precursor compound.

Thus, compounds, for example, in which the carbon atom of the central element is bound to one or two hydrogen atoms and two or three radical-stabilizing substituents, can preferably be used. In this regard, a preferred radical-stabilizing substituent is a substituent that is taken together with a central element to form a resonance structure. The carbon of the central element may be bound to one substituent other than a hydrogen atom(s) and a stabilized radical-stabilizing substituent(s). However, it is preferable that the carbon of the central element is not bound to a substituent other than a hydrogen atom(s) and a stabilized radical-stabilizing substituent(s).

With regard to the aforementioned catalyst compound, it is described above that compounds in which a halogen is directly bound to an aromatic ring can be used. However, compounds of which a halogen is replaced with a hydrogen (i.e., aromatic cyclic hydrocarbon (e.g., benzene)) have very low catalytic activity, and thus are not preferred.

Furthermore, with regard to the aforementioned catalyst compound, it is described above that tetra-halogenated methane can be used. However, a compound whose all halogens are replaced with hydrogens (e.g., methane) is a gas. Therefore, the compound is not easily used as a catalyst, and has low activity, and thus is not preferred.

Examples of compounds in which a halogen binding to a carbon atom in the aforementioned catalyst compound is replaced with a hydrogen include, for example, compounds having a structure in which a C—H group is bound to carbon, silicon, nitrogen, or phosphorus.

Catalyst precursor compounds are preferably compounds having a structure in which a methylene group is bound to two aromatic rings, or the like.

An atom bound to carbon of a central element in a precursor compound (hereinafter referred to as "1-position atom" for convenience) is preferably carbon, nitrogen, or phosphorus, more preferably, carbon. The 1-position atom is preferably bound to only atoms selected from carbon and hydrogen, except for the carbon of the central atom. An atom adjacent to the 1-position atom (hereinafter referred to as "2-position atom" for convenience) is preferably carbon. The 2-position atom is preferably bound only to atoms selected from carbon, oxygen, and hydrogen. Furthermore, it is preferable that a double bond is present between the 1-position atom and the 2-position atom. In a preferred embodiment, a compound in which there are two 2-position atoms and a compound in which a double bond is present between one of the two 2-position atoms and the 1-position atom can be used as a catalyst precursor compound. For example, a compound in which the 1-position atom is carbon; two carbon atoms are present as 2-position atoms; and a double bond is present between one of the two carbons and the carbon which is the 1-position atom, can be used as a catalyst precursor compound. Furthermore, it is preferable that two or more 2-position atoms are present. It is preferable that a double bond between one 2-position atom and a 1-position atom; and a single bond between another 2-position carbon atom and the 1-position carbon atom constitutes part of a conjugated system. For example, it is preferable that the 1-position atom is carbon; two carbon atoms are present as 2-position atoms; and a double bond between one 2-position atom and the 1-position atom, and a single bond between another 2-position atom and the 1-position atom constitutes part of a conjugated system.

Thus, as a precursor compound, preferred is a hydrocarbon compound having a structure in which a hydrocarbon group is bound to an aromatic ring. For example, preferred is a compound in which a hydrocarbon group is bound to aryl, heteroaryl, substituted aryl, or substituted heteroaryl. Preferred is, for example, a compound in which two aromatic substituents are bound to a methylene group. Here, aryl, phenyl or biphenyl is preferred. Here, a substituent in the substituted aryl or substituted heteroaryl is preferably alkyl, alkoxyl, cyano, or the like, and more preferably, lower alkyl or lower alkoxyl.

A catalyst precursor compound is preferably a compound that does not have a radically reactive double bond. A catalyst precursor compound may have a double bond having low reactivity with a radical, such as an aromatic double bond (e.g., a double bond of a benzene ring). Even in the case of an aliphatic double bond, a double bond having low reactivity with a radical can be used as a catalyst precursor without hindrance.

On the other hand, regarding a compound having a double bond or triple bond only at a position distant from a hydrocarbon group (i.e., a compound of which the 1-position carbon does not have a double bond or triple bond and the 2-position carbon or carbon that is more distant therefrom has a double bond or triple bond), the performance as a catalyst precursor compound tends not to be relatively high. Thus, it is preferable that a compound other than the compound having a double bond or triple bond only at a position distant from a hydrocarbon group is selected as a catalyst precursor compound.

Furthermore, in one embodiment of the present invention, as a precursor compound, also, a compound having a hydrocarbon group binding to silicon, nitrogen, or phosphorus (i.e., Si—CH, N—CH, or P—CH) can be used.

Structures of compounds preferred as precursor compounds used in the present invention are illustrated bellow:

(1) Compounds in which a hydrogen is bound to a carbon adjacent to an aliphatic double bond, can be used. Particularly, compounds in which a hydrogen is bound to a carbon intervening between two aliphatic double bonds, can be used. For example, compounds having methylene intervening between two aliphatic double bonds can be used. For example, the compound having the following structure (1,4-cyclohexadiene) can be used:

[Formula 12]

It should be noted that a compound having a similar structure to 1,4-cyclohexadiene is 1,3-cyclohexadiene. However, 1,3-cyclohexadiene does not have a structure in which one methylene group intervenes between two double bonds thereof. Thus, the effect of stabilizing the carbon radical of methylene group is low. 1,3-cyclohexadiene is not suitable as a catalyst.

(2) Compounds in which a hydrogen is bound to a carbon adjacent to an aromatic ring, can be used. Particularly, compounds in which a hydrogen is bound to a carbon intervening between two or more aromatic rings, can be used. For example, compounds having a methylene group intervening between two aromatic rings can be used. For example, compounds having the following structures can be used:

[Formula 13]

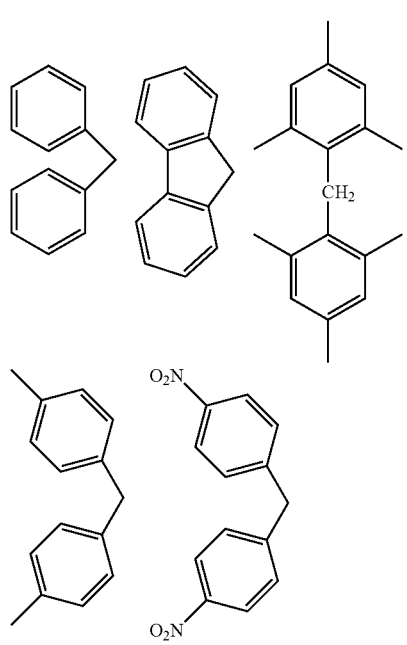

In one embodiment, compounds in which a hydrogen is bound to a carbon intervening between three aromatic rings, can be used. For example, triphenylmethane can be used.

[Formula 14]

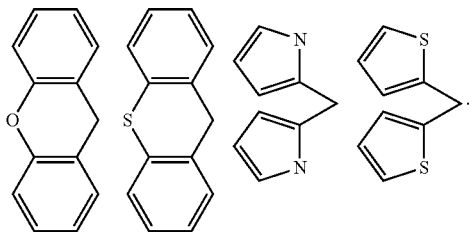

(3) Compounds in which a hydrogen is bound to a carbon adjacent to a double bond in an ester linkage or the like, can be used. Particularly, compounds in which a hydrogen is bound to the carbon intervening between two double bonds, can be used. For example, compounds having the methylene group intervening between two double bonds can be used. For example, the compound having the following structure can be used:

[Formula 15]

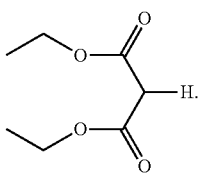

(Production Method of the Catalyst)

Most compounds used as a catalyst of the present invention are publicly known. The compounds, which are commercially available from reagents sales company or the like, can be directly used. Alternatively, the compounds can be synthesized by using publicly known methods. Furthermore, compounds existing in natural products can be obtained by using a method of extracting the natural products, or the like.

When a compound in which a carbon is bound to organic group $R^1$ (e.g., alkyl, alkoxy, aryl, heteroaryl, substituted aryl, or substituted heteroaryl) is used as a catalyst, a commercially available compound can be used as such a compound. Alternatively, such a compound can be synthesized by a publicly known method. Compounds in which a carbon is bound to a halogen and organic group $R^1$ can be synthesized using a method, for example, $R^1{}_3Cl$ is synthesized using a method of reacting $R^1{}_3CH$ with N-iodosuccinimide, or a method of reacting $R^1{}_3COH$ with iodine or $P_2I_4$. Alternatively, a compound in which a carbon is bound to a halogen and organic group $R^1$ can be synthesized using a method described in *Tetrahedron Letters* 36, 609-612 (1995) or *Tetrahedron Letters* 20, 1801-1804 (1979).

(Amount of the Catalyst Used)

The catalyst of the present invention has very high activity and can catalyze a living radical polymerization in a small amount. Hereinafter, the amount of use of the catalyst will be described. The amount employed in the case of using a catalyst precursor is similar to the amount of the catalyst.

In the method of the present invention, a compound used as a catalyst or a catalyst precursor may be in some cases a liquid compound that can be used as a solvent in theory. However, under the circumstance that such a compound is used as a catalyst or a catalyst precursor, there is no need to use the compound in such a large amount so as to achieve an effect as a solvent. Therefore, the amount of a catalyst or catalyst precursor used can be limited to an amount smaller than the so-called "solvent amount" (that is, an amount needed to achieve an effect as a solvent). According to the method of the present invention, a catalyst or catalyst precursor may be used in an amount that is sufficient to catalyze a living radical polymerization, as described above, and there is no need to add more than that.

Specifically, for example, in a preferred embodiment, it is possible that the catalyst in an amount of 10 millimoles (mM) or less is used to one liter of reaction solution. In a further preferred embodiment, it is possible that the catalyst in an amount of 5 millimoles (mM) or less is used to one liter of reaction solution. It is also possible that the catalyst in an amount of 2 millimoles (mM) or less is used to one liter of reaction solution. Further, it is possible that the catalyst in an amount of 1 millimole (mM) or less is used to one liter of reaction solution. It is also possible that the catalyst in an amount of 0.5 millimoles (mM) or less is used to one liter of reaction solution. Regarding the weight of the catalyst, the amount of the used catalyst can be 1% by weight or less in a reaction solution. In a preferred embodiment, it is possible to limit the amount to 0.75% by weight or less, and it is also possible to limit the amount to 0.70% by weight or less. In a more preferred embodiment, it is possible to limit the amount to 0.5% by weight or less, and is also possible to limit the amount to 0.2% by weight or less. It is further possible to limit the amount to 0.1% by weight or less, and is possible to limit the amount to 0.05% by weight or less. For example, in the case of a phosphorus catalyst, the amount can be limited to 0.75% by weight or less, and can be also limited to 0.70% by weight or less. In an even more preferred embodiment, the amount can be limited to 0.5% by weight or less, can be limited to 0.2% by weight or less, can be further limited to 0.1% by weight or less, and can be also limited to 0.05% by weight or less. In other words, the amount can be limited to a "remarkably" smaller amount than an amount needed to achieve the effect as a solvent.

Further, the amount of the catalyst used is preferably 0.02 millimoles or more to one liter of a reaction solution. More preferably, the amount is 0.1 millimoles or more to one liter of a reaction solution. Further preferably, the amount is 0.5 millimoles or more to one liter of a reaction solution. Regarding the weight of the catalyst, preferably, an amount of the catalyst used is 0.001% by weight or more in a reaction solution. More preferably, the amount is 0.005% by weight or more in a reaction solution. Further preferably, the amount is 0.02% by weight or more in a reaction solution. If the amount of the catalyst used is too small, then the molecular weight distribution is likely to be broad.

According to one embodiment, in the method of living radical polymerization of the present invention, it is possible to carry out the living radical polymerization satisfactorily, even without using a catalyst for living radical polymerization or catalyst precursor compound other than the catalyst or catalyst precursor compound having a carbon atom as the central element (hereinafter referred to as "other-type catalyst or other-type catalyst precursor compound") in combination. However, if necessary, it is also possible to use an other-type catalyst or other-type catalyst precursor compound in combination. In that case, it is preferable to use a larger amount of the catalyst or catalyst precursor compound that has a carbon atom as the central element, and to use a smaller amount of the other-type catalyst or other-type catalyst precursor compound, in order to make the best possible use of the advantages of the catalyst or catalyst precursor compound that has a carbon atom as the central element. Under such circumstances, the amount of the other-type catalyst or other-type catalyst precursor compound used can be limited to 100 parts by weight or less per 100 parts by weight of the catalyst or catalyst precursor compound that has a carbon atom as the central element. The amount can be limited to 50 parts by weight or less, can be limited to 20 parts by weight or less, 10 parts by weight or less, 5 parts by weight or less, 2 parts by weight or less, 1 part by weight or less, 0.5 parts by weight or less, 0.2 parts by weight or less, or 0.1 parts by weight or less relative to 100 parts by weight of the catalyst or catalyst precursor compound that has a carbon atom as the central element. That is, a living radical reaction can be carried out in a reaction solution that does not substantially contain a catalyst other than the catalyst having a carbon atom as a central element.

(Protecting Group)

The method of the present invention uses a protecting group for protecting a growing chain during the living radical polymerization reaction. Regarding the protecting group, various known protecting groups, which are conventionally used as protecting groups in a living radical polymerization, can be used. In this regard, it is preferable to use halogen as a protecting group. As described above regarding prior art, when a special protecting group is used, there are disadvantages such as the disadvantage in that the protecting group is very expensive.

(Organic Halide (Dormant Species))

According to the method of the present invention, preferably, an organic halide, which has a carbon-halogen bond, is added to the reaction material. Halogen, which is provided to the growing chain by the organic halide, is used as a protecting group. Such organic halides are relatively inexpensive. Therefore, it is more advantageous than other known compounds which are used as protecting groups in a living radical polymerization. Further, if necessary, dormant species in which a halogen is bound to an element other than carbon can be used.

An organic halide used as a dormant species is a compound having at least one carbon-halogen bond in the molecule which acts as a dormant species. There is no other particular limitation. However, generally, the organic halides preferably have one or two halogen atoms in the molecule.

Here, with regard to an organic halide used as a dormant species, it is preferable that when a carbon radical is generated by elimination of a halogen, the carbon radical is unstable. Thus, regarding an organic halide to be used as a dormant species, the organic halide, in which a carbon atom that would become a carbon radical is bound to two or more substituents that stabilize the carbon radical when the carbon radical is generated by elimination of a halogen, is not suitable. However, in many cases, the organic halide, in which a carbon atom that would become a carbon radical is bound to one substituent that stabilizes the carbon radical, exhibits appropriate radical stability, and can be used as dormant species.

That is to say, in the living radical polymerization method of the present invention, it is preferable to combine a catalyst compound in which the carbon radical is rendered stable, and a dormant species in which the carbon radical is not rendered too stable but is rendered appropriately stable. Due to such a combination, a living radical polymerization reaction can be performed in high efficiency. For example, a compound in which a carbon atom that would become a carbon radical is bound to two or more substituents that stabilize the carbon radical, is used as a catalyst; a compound in which the carbon atom that would become the carbon radical is bound to one substituent that stabilizes the carbon radical, is used as a dormant species; and thereby, due to the combination of the catalyst and the dormant species, high reactivity is exhibited in the living radical polymerization.

The number of hydrogen atoms carried by the carbon to which the halogen atom of the organic halide used as a dormant species is bound (hereinafter referred to as "the 1-position carbon of the organic halide" for convenience), is preferably two or less, and more preferably one or less, and it is even more preferable that the carbon does not have any hydrogen atom. Further, the number of halogen atoms bound to the 1-position carbon of the organic halide is preferably three or less, more preferably two or less, and even more preferably one. Particularly, when the halogen atom bound to the 1-position carbon of the organic halide is chlorine atom, the number of the chlorine atoms is very preferably three or less, more preferably two or less, and particularly preferably one.

It is preferable that one or more carbon atoms are bound to the 1-position carbon of the organic halide used as a dormant species, and it is particularly preferable that two or three carbon atoms are bound thereto.

The halogen atom in the organic halide used as a dormant species may be the same as the halogen atom in the catalyst. The halogen atom in the organic halide used as a dormant species may be different from the halogen atom in the catalyst, since even if the halogen atom in the organic halide and the halogen atom in the catalyst are different, it is possible that the halogen atom in the organic halide and the halogen atom in the catalyst are exchanged. However, if the halogen atom in the organic halide used as a dormant species and the halogen atom in the catalyst are the same, it is easier to exchange the halogen atoms between the organic halide used as a dormant species and the compound of the catalyst. Therefore, preferably, the halogen atom in the organic halide and the halogen atom in the catalyst are the same.

In one embodiment, the organic halide used as a dormant species has the following general formula (II):

$$CR^2R^3R^4X^3 \quad (II)$$

wherein $R^2$ is halogen, hydrogen or alkyl. Preferably, $R^2$ is hydrogen or lower alkyl. More preferably, $R^2$ is hydrogen or methyl.

$R^3$ may be the same as $R^2$, or may be different from $R^2$. $R^3$ is halogen, hydrogen, or alkyl. Preferably, $R^3$ is hydrogen or lower alkyl. More preferably, $R^3$ is hydrogen or methyl.

$R^4$ is halogen, hydrogen, alkyl, aryl, heteroaryl or cyano. Preferably, $R^4$ is aryl, heteroaryl, or cyano. When $R^4$ is halogen, hydrogen, or alkyl, $R^4$ may be the same as $R^2$ or $R^3$, or may be different from $R^2$ or $R^3$.

$X^3$ is halogen. Preferably, $X^3$ is chlorine, bromine, or iodine. When there is halogen in $R^2$ to $R^4$, $X^3$ may be the same as the halogen in $R^2$ to $R^4$ or may be different from the halogen in $R^2$ to $R^4$. In one embodiment, $X^3$ may be the same halogen as that contained in the compound of the catalyst. $X^3$ may be different from the halogen contained in the catalyst compound.

The aforementioned $R^2$ to $R^4$ and $X^3$ are selected independently from one another. However, preferably, there is no halogen atom or one halogen atom in $R^2$ to $R^4$ (that is, the organic halide contains one or two halogen atoms in the compound).

In one preferable embodiment, the organic halide used as a dormant species is an alkyl halide or substituted alkyl halide. More preferably, the organic halide used as a dormant species is a substituted alkyl halide. In this regard, preferably, the alkyl is a secondary alkyl. More preferably, the alkyl is a tertiary alkyl.

In the alkyl halide or substituted alkyl halide used as a dormant species, the number of carbon atoms in the alkyl is preferably 2 or 3. Therefore, further preferably, the organic halide used as a dormant species is a substituted ethyl halide or substituted isopropyl halide. The substituent in the substituted alkyl halide used as a dormant species includes, for example, phenyl, cyano, and the like.

Preferable specific examples of the organic halide used as a dormant species include, for example, $CH(CH_3)(Ph)I$ and $C(CH_3)_2(CN)I$, as shown in the following chemical formulas:

[Formula 16]

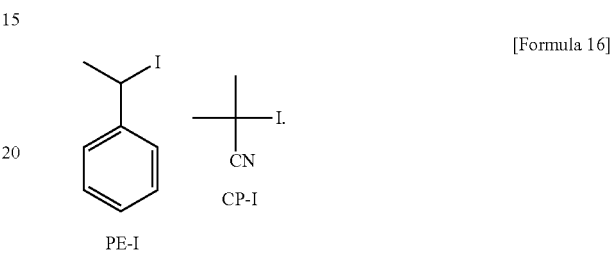

Other specific examples of the organic halide used as dormant species include, for example, methyl chloride, methylene chloride, chloroform, chloroethane, dichloroethane, trichloroethane, bromomethyl, dibromomethane, bromoform, bromoethane, dibromoethane, tribromoethane, tetrabromoethane, bromotrichloromethane, dichlorodibromomethane, chlorotribromomethane, iodotrichloromethane, dichlorodiiodomethane, iodotribromomethane, dibromodiiodomethane, bromotriiodomethane, iodoform, diiodomethane, methyl iodide, isopropyl chloride, t-butyl chloride, isopropyl bromide, t-butyl bromide, triiodoethane, ethyl iodide, diiodopropane, isopropyl iodide, t-butyl iodide, bromodichloroethane, chlorodibromoethane, bromochloroethane, iododichloroethane, chlorodiiodoethane, diiodopropane, chloroiodopropane, iododibromoethane, bromoiodopropane, 2-iodo-2-polyethyleneglycosylpropane, 2-iodo-2-amidinopropane, 2-iodo-2-cyanobutane, 2-iodo-2-cyano-4-methylpentane, 2-iodo-2-cyano-4-methyl-4-methoxypentane, 4-iodo-4-cyano-pentanoic acid, methyl 2-iodo-isobutylate, 2-iodo-2-methylpropanamide, 2-iodo-2,4-dimethylpentane, 2-iodo-2-cyanobutanol, 4-methylpentane, cyano-4-methylpentane, 2-iodo-2-methyl-N-(2-hydroxyethyl)propionamide 4-methylpentane, 2-iodo-2-methyl-N-(1,1-bis(hydroxymethyl)-2-hydroxyethyl)propionamide 4-methylpentane, 2-iodo-2-(2-imidazolin-2-yl)propane, 2-iodo-2-(2-(5-methyl-2-imidazolin-2-yl)propane, and the like. One of these halide compounds may be used alone, or a combination of two or more of the halide compounds may be used.

According to the method of the present invention, since the organic halide used as a dormant species is not to be used as a solvent, it is not necessary to use the organic halide in such a large amount so as to provide an effect as a solvent. Thus, the amount of the organic halide used as a dormant species can be limited to an amount smaller than the so-called "solvent amount" (that is, an amount needed to achieve the effect as a solvent). In the method of the present invention, since the organic halide used as a dormant species is used to provide a halogen as a protecting group to a growing chain as described above, it is sufficient so long as a sufficient amount of halogen can be provided to the growing chains in the reaction system. Specifically, for example, in the method of the present invention, the amount of the organic halide used as a dormant species is preferably 0.05 moles or more relative to 1 mole of the radical polymerization initiator in the polymerization reaction system. More preferably, the amount is 0.5 moles or more relative to 1 mole of the radical polymerization initiator in the polymerization reaction system. Further preferably, the amount is 1 mole or more relative to 1 mole of the radical polymerization initiator in the polymerization reaction system. Further, preferably, the amount is 100 moles or less relative to 1 mole of the radical polymerization initiator in the polymerization system. More preferably, the amount is 30 moles or less relative to 1 mole of the radical polymerization initiator in the polymerization reaction system. Further preferably, the amount is 5 moles or less relative to 1 mole of a radical polymerization initiator in the polymerization reaction system. Additionally, the amount is preferably 0.001 moles or more relative to 1 mole of the vinyl-type monomer. More preferably, the amount is 0.005 moles or more relative to 1 mole of the vinyl-type monomer. Further, the amount is preferably 0.5 moles or less relative to 1 mole of the vinyl-type monomer. More preferably, the amount is 0.4 moles or less relative to 1 mole of the vinyl-type monomer. Further preferably, the amount is 0.3 moles or less relative to 1 mole of the vinyl-type monomer. Particularly preferably, the amount is 0.2 moles or less relative to 1 mole of the vinyl-type monomer. Most preferably, the amount is 0.1 mole or less relative to 1 mole of the vinyl-type monomer. Further, if necessary, the amount can be 0.07 moles or less, 0.05 moles or less, 0.03 moles or less, 0.02 moles or less, or 0.01 moles or less relative to 1 mole of the vinyl-type monomer.

Most of the aforementioned organic halides used as dormant species are known compounds. Reagents and the like, which are sold from reagent sellers or the like, can directly be used. Alternatively, the compounds may be synthesized using conventionally known synthesizing methods.

In regard to an organic halide used as a dormant species, it is also possible that raw materials thereof are introduced so as to generate the organic halide in situ, i.e. in the reaction solution, during the polymerization, such that the product can be used as the organic halide for this polymerization method. For example, an azo-type radical initiator (e.g., azobis(isobutyronitrile)) and a molecule as a simple substance of halogen (e.g., iodine ($I_2$)) can be introduced as raw materials, the reaction of the two can generates an organic halide (e.g., CP-I (the chemical formula is as described above), which is an alkyl iodide) in situ during the polymerization, and this product can be used as a dormant species for this polymerization method.

As for the organic halide used as a dormant species, it is also possible to use a compound that is immobilized at a surface such as an inorganic or organic solid surface, or an inorganic or organic molecular surface. For example, an organic halide immobilized on a silicon substrate surface, a polymer film surface, an inorganic or organic microparticle surface, a pigment surface, or the like, can be used. The immobilization can be achieved utilizing, for example, chemical binding, physical binding or the like.

(Monomer)

As a monomer, the polymerization method of the present invention uses a radical polymerizable monomer. A radical polymerizable monomer refers to a monomer having an unsaturated bond which may be subjected to a radical polymerization under the presence of an organic radical. Such an unsaturated bond may be a double bond or triple bond. That is, the polymerization method of the present invention can use an arbitrary monomer, which is conventionally known as a monomer for performing a living radical polymerization.

More specifically, the so-called vinyl monomers can be used. Vinyl monomer is a general name for monomers which are represented by the general formula "$CH_2=CR^5R^6$."

A monomer having the general formula in which $R^5$ is methyl, and $R^6$ is carboxylate, is referred to as a methacrylate-type monomer, and can preferably be used in the present invention.

Specific examples of the methacrylate-type monomer include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, glycidyl methacrylate, cyclohexyl methacrylate, lauryl methacrylate, n-octyl methacrylate, 2-methoxyethyl methacrylate, butoxyethyl methacrylate, methoxytetraethyleneglycol methacrylate, 2-hydroxyethylmethacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethyleneglycol methacrylate, polyethylene glycol methacrylate, 2-(dimethylamino)ethyl methacrylate, phenyl methacrylate, and the like. Further, methacrylic acid can be used.

The aforementioned vinyl monomers having the aforementioned general formula in which $R^5$ is hydrogen and $R^6$ is carboxylate, are generally referred to as acrylic type monomers and can preferably be used in the present invention.

Specific examples of the acrylate-type monomer include methyl acrylate, ethyl acrylate, propyl acrylate, n-butyl acrylate, t-butyl acrylate, hexyl acrylate, 2-ethylhexyl acrylate, nonylacrylate, benzylacrylate, glycidyl acrylate, cyclohexyl acrylate, lauryl acrylate, n-octyl acrylate, 2-methoxyethyl acrylate, butoxyethyl acrylate, methoxytetraethyleneglycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethyleneglycol acrylate, polyethylene glycol acrylate, 2-(dimethylamino) ethyl acrylate, phenyl acrylate, and the like. Further, an acrylic acid can be used.

A monomer having the aforementioned general formula of a vinyl monomer, in which $R^5$ is hydrogen and $R^6$ is phenyl, is styrene, can be suitably used in the present invention. A monomer, in which $R^6$ is phenyl or a phenyl derivative, is referred to as a styrene derivative, can be suitably used in the present invention. Specifically, such a monomer includes o-, m-, or p-methoxystyrene, o-, m-, or p-t-butoxystyrene, o-, m-, or p-chloromethylstyrene, o-, m-, or p-chlorostyrene, o-, m-, or p-hydroxystyrene, o-, m-, or p-styrenesulfonic acid and the like. Further, a monomer in which $R^6$ is aromatic, (for example, vinylnaphthalene) can be used.

A monomer having the aforementioned general formula of a vinyl monomer, in which $R^5$ is hydrogen and $R^6$ is alkyl, is alkylene, can be suitably used in the present invention.

In the present invention, monomers having two or more vinyl groups can be also used. Specifically, for example, a diene-type compounds (e.g., butadiene, isoprene, and the like), a compound having two allyl groups (for example, diallyl phthalate and the like), a dimethacrylate having two methacryl groups (e.g., ethylene glycol dimethacrylate), a diacrylate having two acryl groups (e.g., ethylene glycol diacrylate), and the like, can be used.

Vinyl monomers other than those described above can also be used in the present invention. Specifically, for example, vinyl esters (for example, vinyl acetate, vinyl propionate, vinyl benzoate, vinyl acetate), styrene derivatives other than the aforementioned styrene derivatives (for example, α-methylstyrene), vinyl ketones (for example, vinyl methyl ketone, vinyl hexyl ketone, methyl isopropenyl ketone), N-vinyl compounds (for example, N-vinylpyrrolidone, N-vinyl pyrrole, N-vinyl carbazole, N-vinyl indole), (meth)acrylamide and its derivatives (for example, N-isopropyl acrylamide, N-isopropylmethacrylamide, N,N-dimethylacrylamide, N,N-dimethylmethacrylamide, N-methylolacrylamide, N-methylolmethacrylamide), acrylonitrile, methacrylonitrile, maleic acid and its derivatives (for example, maleic anhydride), halogenated vinyls (for example, vinyl chloride, vinylidene chloride, tetrachloroethylene, hexachloropropylene, vinyl fluoride), olefins (for example, ethylene, propylene, 1-hexene, cyclohexene), and the like.

One of these monomers may be used alone, or a combination of two or more of the monomers may be used.

It should be noted that the double bonds of 1,4-cyclohexadiene are not bound to a stabilizing group and thus has low reactivity with a radical (low reactivity as a monomer). On the other hand, the methylene moieties ($CH_2$) of 1,4-cyclohexadiene are bound to two stabilizing groups (double bonds), and have high reactivity with a radical (high reactivity as a catalyst). Thus, with regard to 1,4-cyclohexadiene, the reactivity between the methylene moieties and a radical is significantly higher than the reactivity between the double bond and a radical. Accordingly, in the present invention, it is classified into the catalyst precursor and not the monomer.

However, when a catalyst having a much higher activity than 1,4-cyclohexadiene is used, 1,4-cyclohexadiene can be used as a monomer. For example, 1,4-cyclohexadiene can be used as one ingredient in a random copolymerization. Specifically, in order to provide strength or heat-resistance, it can be used as one ingredient in copolymerization.

There is no particular limitation to the combinations of the aforementioned monomer and the catalyst of the present invention. A catalyst of the present invention, which is arbitrarily selected, may be used for a monomer, which is arbitrarily selected.

(Radical Reaction Initiator)

In the living radical polymerization method of the present invention, if necessary, an adequate amount of a radical reaction initiator is used. Initiators, which are known as initiators to be used for a radical reaction, can be used as the radical reaction initiator. For example, azo-type radical reaction initiators and peroxide-type radical reaction initiators can be used. Specific examples of azo-type radical reaction initiators include, for example, azobis(isobutyronitrile). Specific examples of peroxide-type radical reaction initiators include, for example, benzoylperoxide, dicumyl peroxide, t-butyl peroxybenzoate (BPB), di(4-tert-butylcyclohexyl)peroxydicarbonate (PERKADOX16), and potassium peroxodisulfate.

The amount of the radical initiator used is not particularly limited. However, preferably, the amount is 1 millimole or more to 1 liter of the reaction solution. More preferably, the amount is 5 millimoles or more to 1 liter of the reaction solution. Further preferably, the amount is 10 millimoles or more to 1 liter of the reaction solution. Additionally, the amount is preferably 500 millimoles or less to 1 liter of the reaction solution. More preferably, the amount is 100 millimoles or less to 1 liter of the reaction solution. Further preferably, the amount is 50 millimoles or less to 1 liter of the reaction solution.

(Solvents)

When a reaction mixture of a monomer and other ingredients is liquid at the reaction temperature, it is not always necessary to use a solvent. If necessary, a solvent may be used. Solvents, which were conventionally used for a living radical polymerization, can be used in the method of the present invention. When a solvent is to be used, the amount of use is not particularly limited as long as the polymerization reaction is appropriately carried out; however, it is preferable to use a solvent in an amount of 1 part by weight or more relative to 100 parts by weight of the monomer, more preferable to use 10 parts by weight or more, and even more preferable to use 50 parts by weight or more relative to 100 parts by weight of the monomer. When the amount of use of the solvent is too small, the viscosity of the reaction solution may be excessively high. Furthermore, it is preferable to limit the amount to 2000 parts by weight or less, more preferable to limit the amount to 1000 parts by weight or less, and even more preferable to limit the amount to 500 parts by weight or less relative to 100 parts by weight of the monomer. When the amount of use of the solvent is too large, the monomer concentration in the reaction solution may be excessively low.

Emulsion polymerization, dispersion polymerization or suspension polymerization can also be carried out by using a solvent that is not miscible with the monomer. For example, in the case of using styrene or methacrylate as the monomer, water can be used as the solvent, such that emulsion polymerization, dispersion polymerization or suspension polymerization can be carried out.

(Other Additives and the Like)

To the various aforementioned materials used for the living radical polymerization, known additives may be added as necessary, in their required amounts. Examples of such additives include, for example, a polymerization suppressant and the like.

(Raw Material Composition)

By mixing the various raw materials described above, a raw material composition that is appropriate as a material for the living radical polymerization, is obtained. The obtained composition can be used in the conventionally known methods for a living radical polymerization.

According to one embodiment, the raw material composition does not include any raw material other than the various raw materials mentioned above. For example, it is preferable, from the viewpoint of environmental problems and the like, that the raw material composition does not substantially include a raw material containing a transition metal. According to a preferred embodiment, the raw material composition does not substantially include any raw material other than an initiator, a catalyst, a catalyst precursor compound, a monomer having a radical-reactive unsaturated bond, a solvent, and an organic halide having a carbon-halogen bond used as a dormant species. It is also preferable that the raw material composition does not substantially include any material irrelevant to a living radical polymerization (for example, an episulfide compound or the like). Furthermore, if it is desired to make the best possible use of the advantage of the catalyst or catalyst precursor that has carbon as the central element, the raw material composition can be prepared as a composition that does not substantially include any catalyst or catalyst precursor for a living radical polymerization other than the catalyst and catalyst precursor that have carbon as the central element.

According to one embodiment, the raw material composition includes an initiator, a catalyst or a catalyst precursor, a monomer having a radical-reactive unsaturated bond, and an organic halide having a carbon-halogen bond used as a dormant species, and may further include a solvent.

(Raw Material Composition Including Catalyst)

In one embodiment that makes use of a catalyst compound, the raw material composition includes an initiator, a catalyst, a monomer having a radical-reactive unsaturated bond, and an organic halide having a carbon-halogen bond used as a dormant species. The raw material composition may further include a solvent, in addition to these.

According to one embodiment, the raw material composition is a composition substantially consisting of an initiator, a catalyst, a monomer having a radical-reactive unsaturated bond, an organic halide having a carbon-halogen bond used as a dormant species, and a solvent. Here, if not needed, the solvent may not be contained. The raw material composition is, for example, a composition that does not substantially include any component participating in the radical polymerization reaction, other than an initiator, a catalyst, a monomer having a radical-reactive unsaturated bond, an organic halide having a carbon-halogen bond used as a dormant species, and a solvent. Also, the composition may consist of only an initiator, a catalyst, a monomer having a radical-reactive unsaturated bond, an organic halide having a carbon-halogen bond used as a dormant species, and a solvent. It should be noted that, in this case as well, if not needed, the solvent may not be contained.

(Raw Material Composition Including Catalyst Precursor Compound)

In one embodiment that makes use of a catalyst precursor compound, the raw material composition includes a peroxide, a catalyst precursor compound, a monomer having a radical-reactive unsaturated bond, and an organic halide having a carbon-halogen bond used as a dormant species. The raw material composition may further include a solvent, in addition to these.

According to one embodiment, the raw material composition is a composition substantially consisting of a peroxide, a catalyst precursor compound, a monomer having a radical-reactive unsaturated bond, an organic halide having a carbon-halogen bond used as a dormant species, and a solvent. Here, if not needed, the solvent may not be contained. For example, the raw material composition is a composition that does not include any component participating in the radical polymerization reaction, other than a peroxide, a catalyst precursor compound, a monomer having a radical-reactive unsaturated bond, an organic halide having a carbon-halogen bond used as a dormant species, and a solvent. Also, the composition may consist of only a peroxide, a catalyst precursor compound, a monomer having a radical-reactive unsaturated bond, an organic halide having a carbon-halogen bond used as a dormant species, and a solvent. It should be noted that, in this case as well, if not needed, the solvent may not be contained.

(Reaction Temperature)

A reaction temperature in the method of the present invention is not particularly limited. Preferably, the reaction temperature is 10° C. or more. More preferably, the reaction temperature is 20° C. or more. Further preferably, the reaction temperature is 30° C. or more. Still preferably, the reaction temperature is 40° C. or more, Particularly preferably, the reaction temperature is 50° C. or more. Additionally, the reaction temperature is preferably 130° C. or less. More preferably, the reaction temperature is 120° C. or less. Further preferably, the reaction temperature is 110° C. or less. Still preferably, the reaction temperature is 105° C. or less. Particularly preferably, the reaction temperature is 100° C. or less.

When the temperature is too high, there is a disadvantage in that heating facilities and the like may be expensive. When the temperature is at room temperature or lower, there is a disadvantage that cooling facilities and the like may be expensive. Additionally, if a reaction mixture is prepared such that polymerization occurs at room temperature or lower, the reaction mixture is unstable at room temperature and may react. Therefore, there is the disadvantage that it is difficult to store the reaction mixture. Therefore, the aforementioned range of the temperature, which is slightly higher than room temperature but is not too high (for example, 50° C. to 100° C.) is very preferable in terms of practical sense.

(Reaction Period of Time)

The reaction time period in the method of the present invention is not particularly limited. Preferably, the reaction time period is 15 minutes or more. More preferably, the reaction time period is 30 minutes or more. Further preferably, the reaction time period is 1 hour or more. Additionally, the reaction time period is preferably 3 days or less. More preferably, the reaction time period is 2 days or less. Further preferably, the reaction time period is 1 day or less.

If the reaction time period is too short, it is difficult to obtain a sufficient molecular weight (or a ratio of polymerization (conversion ratio of monomer)). If the reaction time period is too long, the efficiency of the entire process would be unsatisfactory. Advantageous results (an adequate monomer conversion and reduction of a side reaction) may be achieved by selecting a suitable reaction time period.

(Atmosphere)

The polymerization reaction in the method of the present invention may be carried out under a condition where air is present in the reaction vessel. Further, if necessary, the air may be replaced with an inert gas such as nitrogen or argon.

(Precursor)

In the polymerization method of the present invention, the reaction may be carried out by directly using the above-described catalyst (that is, by introducing the catalyst into the polymerization vessel), but the reaction may also be carried out using a precursor of the catalyst, without directly using the catalyst. Here, the precursor of the catalyst refers to a compound that does not conform to the definition of the catalyst as described above at the time of being introduced into the reaction vessel, but undergoes a chemical change in the reaction vessel to be brought to a state of being capable of acting as a catalyst. Here, the phrase "brought to a state of being capable of acting as a catalyst" preferably means that the precursor is converted into the catalyst compound.

A compound that is capable of producing an activated radical similar to an activated radical generated from the catalyst compound at the time of the polymerization reaction corresponds to the precursor. For example, a carbon-hydride corresponds to the precursor. That is, when a radical generated after a radical initiator is decomposed, or a polymer radical derived therefrom abstracts hydrogen of a carbon-hydride, an activated radical of the carbon compound can be generated, and living radical polymerization can be carried out.

Therefore, according to one embodiment of the polymerization method of the present invention, the reaction can be carried out by directly using the catalyst described above, but in another embodiment, a precursor of the catalyst compound can be used without directly using the catalyst described above. In this case, a step of chemically changing the precursor is carried out before the step of carrying out the polymerization reaction. The step of chemically changing the precursor may be carried out within the vessel for carrying out the polymerization reaction, or may be carried out in a vessel different from the polymerization reaction vessel. It is advantageous to carry out the step of chemically changing the precursor simultaneously with the polymerization reaction step in the vessel for performing the polymerization reaction, from the viewpoint that the overall process is simplified.

In regard to the amount of the precursor used, an amount similar to the aforementioned amount of use of the catalyst can be used. It is preferable to use an amount of the precursor such that the amount of the activated radical obtained from the precursor is similar to the amount of the activated radical in the case of using the catalyst in the above-described amount.

The method for living radical polymerization of the present invention can be applied to homopolymerization, that is, production of a homopolymer, and it is also possible to produce a copolymer using the method of the present invention in copolymerization. The copolymerization may be random copolymerization, or may also be block copolymerization.

The block copolymer may be a copolymer having two or more types of blocks linked together, or may be a copolymer having three or more types of blocks linked together.

In the case of block copolymerization using two types of blocks, for example, a block copolymer can be obtained by a method including a step of polymerizing a first block and a step of polymerizing a second block. In this case, the method of the present invention may be used in the step of polymerizing the first block, or the method of the present invention may be used in the step of polymerizing the second block. It is preferable to use the method of the present invention in both of the process of polymerizing the first block and the process of polymerizing the second block.

More specifically, for example, a block copolymer can be obtained by polymerizing the first block, and then carrying out the polymerization of the second block in the presence of the obtained first polymer. The first polymer can be supplied to the polymerization of the second block after isolation and purification, or the polymerization of blocks can also be carried out by adding the second monomer to the first polymerization in the middle of or at the completion of the polymerization of the first polymer, without isolation and purification of the first polymer.

Also in the case of producing a block copolymer having three types of blocks, the steps of polymerizing the respective blocks are carried out in the same manner as in the instance of producing a copolymer having two or more types of blocks linked together, and thereby a desired copolymer can be obtained. It is also preferable to use the method of the present invention in all of the block polymerization steps.

(Reaction Mechanism)

Although the present invention is not particularly bound to a theory, an inferred mechanism will be explained.

The basic concept of a living radical polymerization method is a reversible activating reaction of a dormant species (polymer-X) to a growing chain radical (polymer.). A method, which uses a halogen as protecting group X and uses a transition metal complex as an activating catalyst, is one of the useful living radical polymerization methods. According to the present invention, a carbon compound is used. It is possible to abstract a halogen from an organic halide with high reactivity. It is possible to produce a radical reversibly (Scheme 1).

It has been recognized that, generally, a transition metal can have electrons in various transition states and therefore, a transition metal is superior in the catalytic activity for various chemical reactions. Therefore, regarding catalysts suitable for a living radical polymerization, it is considered that a transition metal is superior. On the contrary, a typical element is considered disadvantageous for such a catalyst.

Figure 3:
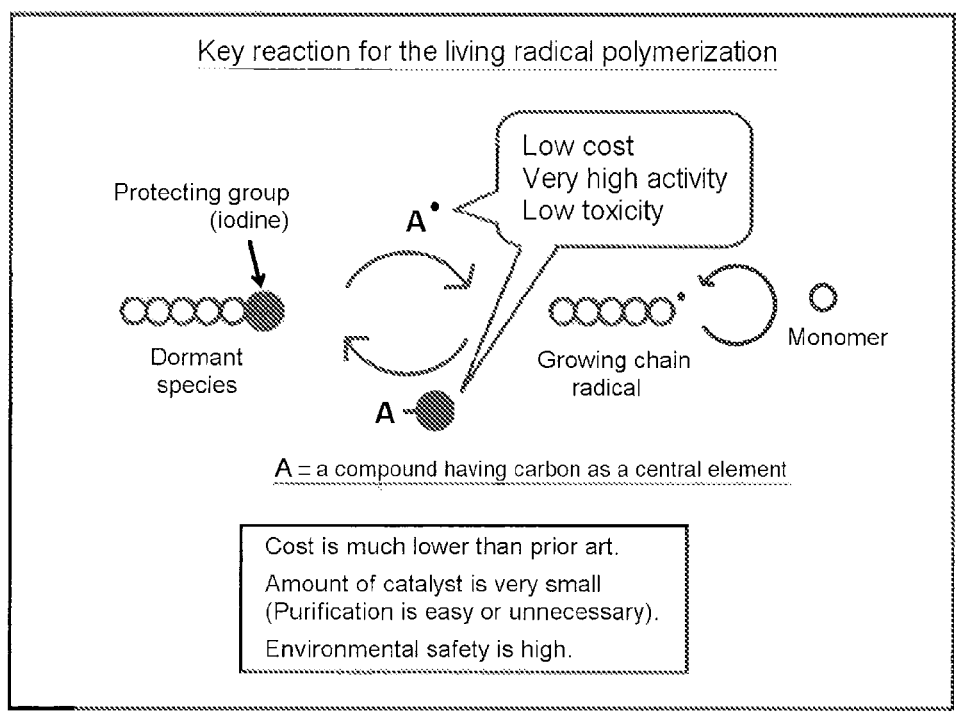
FIG. 3 is a scheme showing the concept of the present invention, and shows the key reaction for the living radical polymerization of the present invention. In this scheme, the radical of the catalyst is indicated by A', and a compound in which iodine is bound to the radical is indicated by a symbol of A bound to a black circle. This catalyst is characterized in that the catalyst is more inexpensive by several orders of magnitude as compared with catalysts of prior art; since the catalyst is ultra-highly active, the catalyst can be used in an extremely small amount; purification is unnecessary at the time of production of the catalyst, or even if purification is needed, the purification is easy; and since the catalyst is low in toxicity or non-toxic, the catalyst is highly safe to the human body and the environment.
Figure 4:
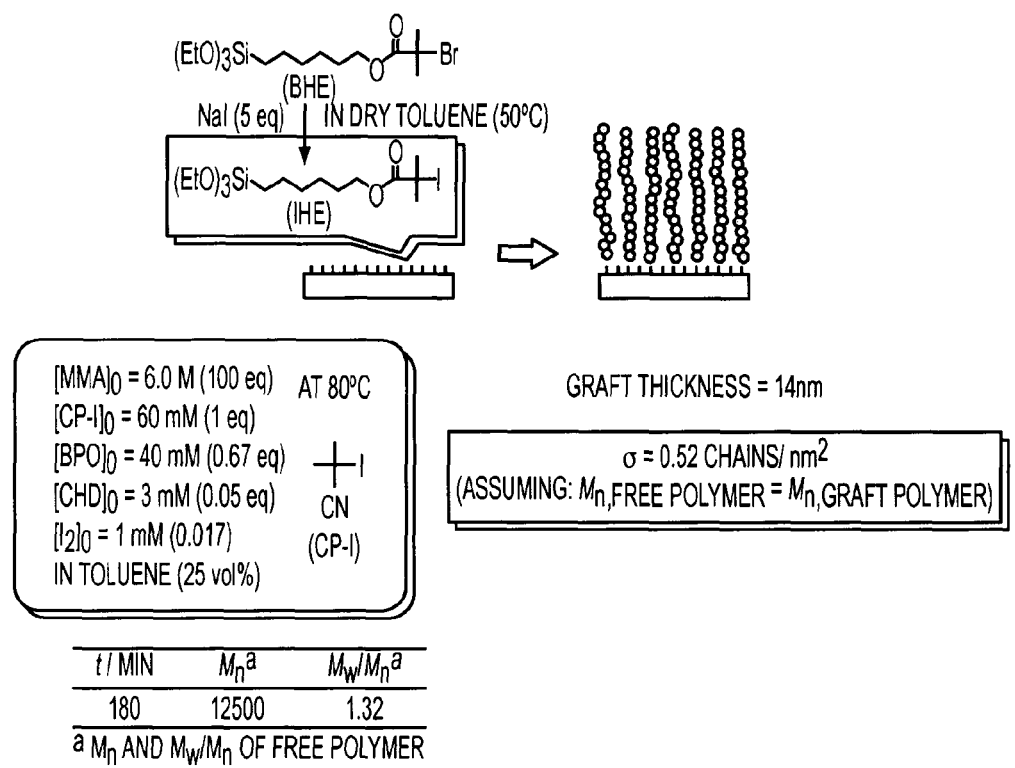
FIG. 4 is scheme showing the surface graft polymerization of benzylmethacrylate (BzMA) with hydrocarbon (precursor-type catalyst) on the surface of a silicon substrate.

However, unexpectedly, according to the present invention, a catalyst having carbon as a central element is used, and thereby, as shown in the scheme of FIG. 3, the halogen is exchanged between the catalyst compound and the reaction intermediate, and the polymerization reaction proceeds with very high efficiency. It is considered that this is because the bond between the central element and the halogen is suitable for performing the exchange of the halogen with the reaction intermediate. Accordingly, it is basically considered that a compound having a bond between the central element and the halogen can catalyze the living radical polymerization satisfactorily even if the compound has a substituent other than the central element and halogen.

The following Scheme 1 shows the reaction formula in the case of using the catalyst of the present invention.

(Scheme 1)

[Formula 17]

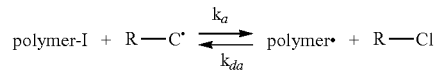

Furthermore, in the case of using a precursor (R—CH (hydrocarbon)), a step of generating an activated radical (R—C.) from the precursor is carried out before the reaction based on the mechanism described above or at the same time as the reaction. Specifically, a radical generated by decomposition of a radical initiator (e.g., peroxide), or a growing chain radical produced therefrom (both are represented by R'.) abstracts a hydrogen atom of the precursor, and thereby an activated radical can be obtained (Scheme 2(a)).

(Scheme 2)

[Formula 18]

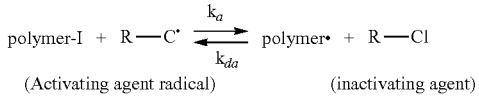

(Removal of Halogen Bound to an End of Produced Polymer)

The produced polymer that is obtained by the method of the present invention has halogen (for example, iodine) at the chain end. When this polymer is to be used in products, if needed, the polymer can be used after removing the halogen at the end. It is also possible to positively utilize the halogen at the end and to convert this into a different functional group, so as to bring out a new function. The reactivity of the halogen at the end is generally high, and the removal or conversion of the halogen can be carried out by a wide variety of reactions. For example, examples of methods of treating the polymer end when the halogen is iodine, will be shown in the following scheme. The polymer end can be utilized by the reactions shown in these schemes or the like. Even when the halogen is other than iodine, the polymer end can be converted into functional group in the same manner.

(Scheme 3)

Conversion of terminal iodine

[Formula 19]

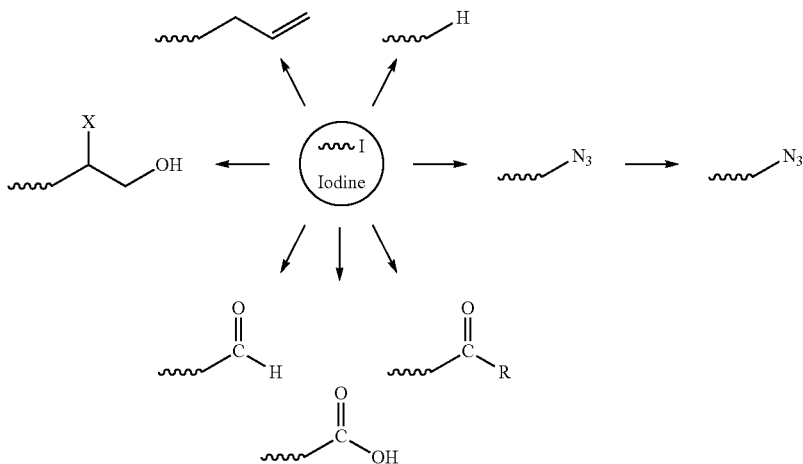

(Reference) Matjaszewski, K., Davis, T. P., Eds: Handbook of Radical Polymerization; Wiley & Sons; New York, 2002.

Simple removal/conversion of terminal iodine

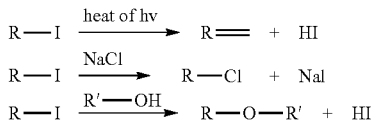
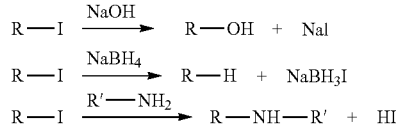

(Use of the Polymer)

According to the aforementioned living radical polymerization method of the present invention, a polymer having narrow molecular weight distribution is obtained. For example, it is possible to select a suitable formulation of reaction material, reaction conditions and the like, such that a polymer having the $M_w/M_n$ ratio, which is the ratio of the weight average molecular weight Mw to the number average molecular weight $M_n$, is 1.5 or less. It is also possible to select a further suitable formulation of the reaction material and reaction conditions such that a polymer having the $M_w/M_n$ ratio of 1.4 or less, a polymer having the $M_w/M_n$ ratio of 1.3 or less, a polymer having the $M_w/M_n$ ratio of 1.2 or less, or a polymer having the $M_w/M_n$ ratio of 1.1 or less is obtained.

The polymer obtained by the living radical polymerization method of the present invention can be applied for various uses. For example, the polymer can be used for manufacturing materials for resistor, adhesives, lubricants, paint, ink, dispersants, packaging materials, pharmaceuticals, personal care products (such as hairdressing material, cosmetics, and the like), elastomers (such as material for automobiles, industrial articles, sports article, materials for coating electrical wire, materials for buildings, and the like), coating materials (such as materials for powder coating, and the like), and the like. Furthermore, it can be used for creating a new electronic material, optical material, dynamic material, crystal material, separation material, lubricant material, and medical material.

The polymer obtained by the living radical polymerization method of the present invention can also be advantageously used in various applications from the viewpoint that the amount of catalyst remaining in the polymer is low. That is, since the amount of catalyst can be decreased relative to the conventional transition metal-based catalysts and the like, the obtained resins acquire high purity, and the polymer can be suitably used in the applications where a high purity resin is required. The catalyst residue may be removed from the produced polymer, or may not be removed, depending on the application. The polymer may be molded, or dissolved or dispersed in a solvent or a dispersion medium depending on the various applications. However, the molded polymer, or the dissolved or dispersed polymer also maintains the advantages of the present invention, and thus these polymers still belong to the scope of the polymer obtained by the polymerization method of the present invention.

The polymer synthesized using the polymerization method of the present invention has advantages such as the advantage that the molecular weight distribution is narrow, the advantage that the amount of catalyst remaining in the polymer is low, and the advantage that the cost is low, and thus the polymer can be utilized in various applications by making the best use of these advantages.

For example, a homopolymer, a random copolymer and a block copolymer formed from benzyl methacrylate and having narrow molecular weight distribution, can be used as high performance materials for resistor.

Further, for example, a polymer of methacrylate (for example, dimethylaminomethacrylate or 2-hydroxyethyl methacrylate), methacrylic acid, acrylate, acrylic acid or the like can be used in applications such as adhesives, paints, inks and pigment dispersants.

Further, when a polybranched polymer is synthesized by the method of the present invention, the polymer is useful as a lubricant.

Further, polymers obtained by the method of the present invention (for example, hydroxyethyl methacrylate, polyethylene glycol methacrylate, and the like) are also useful as drug sustained-release materials or medical materials.

Further, polymers obtained by the method of the present invention (for example, dimethylaminomethacrylate, methacrylic acid, 2-hydroxyethyl methacrylate, polyethylene glycol methacrylate, and the like) are also useful for personal care products (for example, hairdressing materials or cosmetic products).

Further, polymers obtained by the method of the present invention (for example, acrylate, methacrylate, styrene, diene and the like) are also useful in applications such as elastomer or coating.

Further, polymers obtained by the method of the present invention are also useful in the creation and production of non-conventional new electronic materials, optical materials, mechanical materials, crystalline materials, separation materials, lubricant materials, medical materials and the like.

Furthermore, the method of the present invention can be, for example, applied to surface graft polymerization, and can produce high density polymer brushes that can be used in various applications.

Further, when a compound that does not have electroconductivity is used as a catalyst, a polymer that can be suitably used even in applications where the absence of any residual electroconductive impurities in the polymer is required (for example, resist materials, organic electroluminescence materials and the like), may be obtained.

The catalyst of the present invention is characterized in that a central element of the catalyst is carbon. Regarding carbon, the electrons (radicals) located in the p-orbital (or a hybrid orbital of the p-orbital and the s-orbital) contribute to the reaction. They are completely different from transition metals, in which the electrons of the d-orbital contribute to the reaction. It was found as a result of the research of the inventors of the present invention that the radicals located in the p-orbital or a hybrid orbital of the p-orbital and the s-orbital of carbon have very high power for abstracting halogen from alkyl halides (dormant species) during a living radical polymerization. Further, it was found that the radicals of the p-orbital or a hybrid orbital of the p-orbital and the s-orbital generally have remarkably high power in abstracting a halogen from a dormant species, even if compared with the radicals of transition metals. Therefore, carbon that is capable of producing such powerful radicals of the p-orbital or a hybrid orbital of the p-orbital and the s-orbital, can serve as potent catalysts.

EXAMPLES

Hereinafter, Examples of the present invention will be explained. However, the present invention is not limited by these Examples.

The monomers, alkyl halides to be used as dormant species, and catalysts used in the following examples are shown as follows.

(Compounds Used)

First, the structures of the main compounds used in the Examples are described below:

(Monomers)

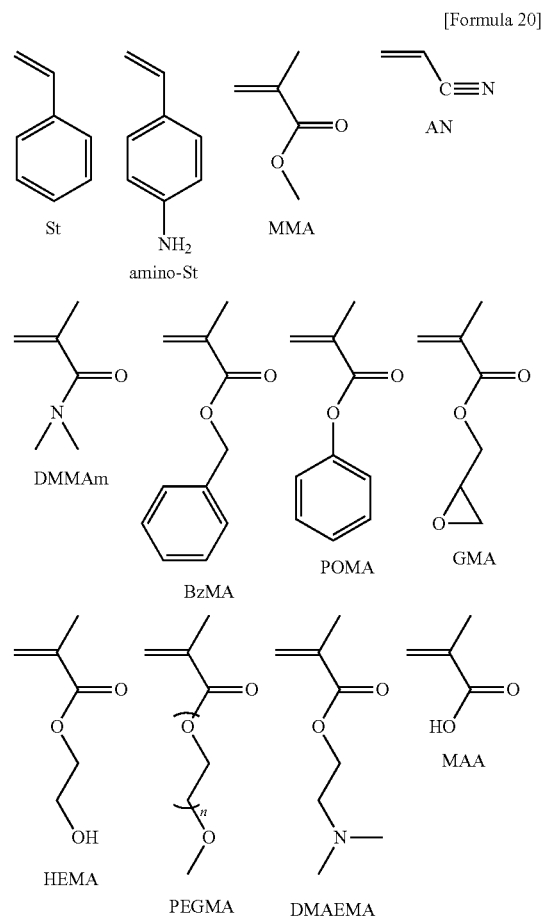

[Formula 20]

(Catalysts and Organic Halide Compounds to be Used as Dormant Species)

The structural formulas of the catalysts or catalyst precursor compounds and the organic halide compounds to be used as dormant species (CPI) used in the Examples are shown below:

[Formula 21]

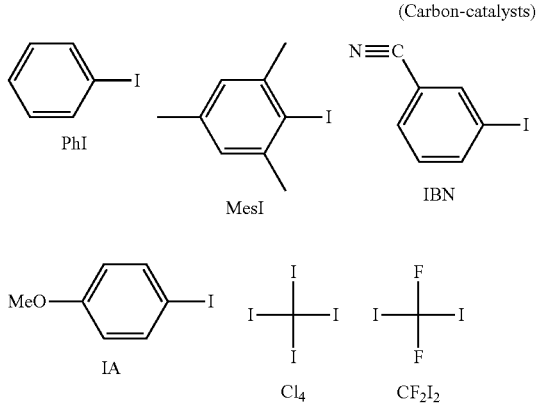

(Carbon-catalysts)

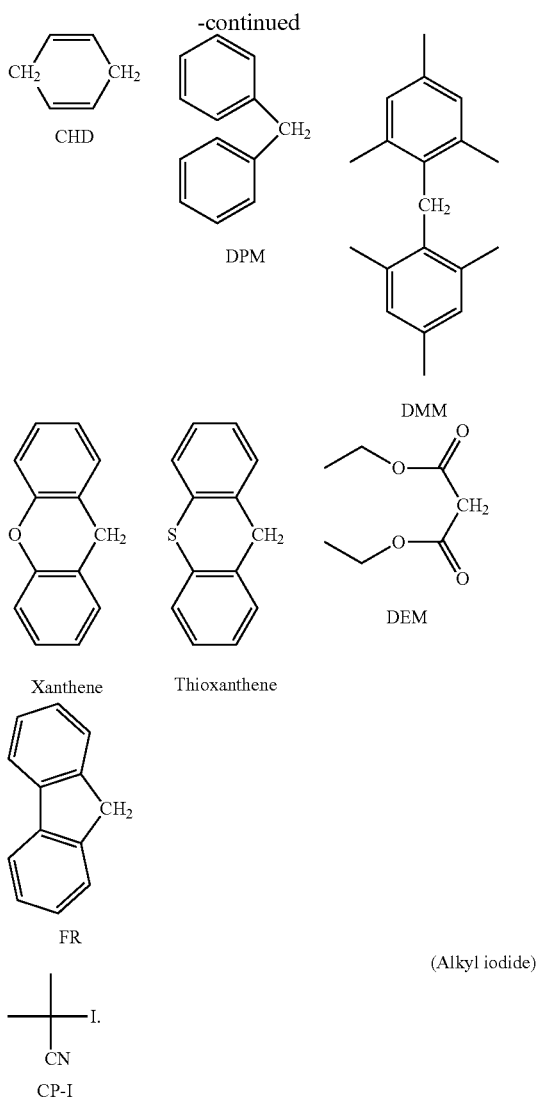

Example 1

Polymerization of Methyl Methacrylate (MMA) or Benzyl Methacrylate (BzMA) Using a Carbon-Iodide as Catalyst 80 mM of 2-cyanopropyl iodide (CP-I: the chemical structural formula is as described above) was used as an alkyl halide that is to be used as a dormant species. 1 mM of iodobenzene (PhI: the chemical structural formula is as described above) was used as a catalyst. 10 mM of 2,2'-azobis (isobutylonitrile) (AIBN) was used as a radical initiator. These materials were dissolved in 2 g of methyl methacrylate (MMA) to obtain a reaction solution having the aforementioned concentrations. The monomer concentration was about 8 M. The solubilities of these materials were satisfactory, and a homogenous solution was formed. The remaining oxygen was replaced with argon. The reaction solution was heated to 80° C. to perform the polymerization reaction.

It is noted that regarding concentrations, "mM" refers to the number of millimoles relative to 1 liter of a monomer. For example, 80 mM means that 80 millimoles of a solute is dissolved in 1 liter of a monomer. Regarding concentrations, "M" refers to the number of moles relative to 1 liter of a monomer. For example, 8 M means that 8 moles of a solute is dissolved in 1 liter of a monomer. It is noted that in the case of MMA, 1 liter of a monomer (bulk) is 8 moles at room temperature.

The experiments of entries 1 to 8 were performed using the reaction materials and reaction conditions as shown in Table 1. In the following tables, PDI denotes the ratio of $M_w/M_n$. Further, $M_n$ is a number average molecular weight of the obtained polymer.

$M_{n,theo}$ denotes a theoretical value calculated according to the following formula:

$$M_{n,theo}=([M]_0/[RS\text{—}I]_0)\times(\text{molecular weight of the monomer})\times(\text{conv})/100 \quad \text{[Numerical formula 1]}$$

wherein $[M]_0$ and $[R\text{—}I]_0$ are the initial concentrations (charge concentration) of a monomer and an alkyl iodide that is to be used as a dormant species, respectively; and cony is the monomer conversion ratio (polymerization ratio).

In this polymerization, a growing chain radical (polymer.), which was generated by cleavage of AIBN abstracts an iodine from an inactivating agent PhI to produce a phenyl radical (carbon radical C.), which is an activated radical, in situ (with a polymer-iodine adduct (polymer-I)) (Scheme 1). The activation reaction is based on the action of a carbon radical. The results are shown in Table 1 (entry 1) and FIG. 1 (white circle, o). For example, at 1.5 hours, the conversion ratio became 45%, and $M_n$ and PDI were 5,000 and 1.31, respectively. $M_n$ was approximately in proportion to conversion ratio, and PDI was low from the early stage of the polymerization, and it can be said that the activation frequency is sufficiently high.

In view of the molecular weight of PhI (about 209), the amount of 1 mM used in the experiment of entry 1 in Table 1 corresponds to about 0.026% by weight in the MMA monomer solution. This amount is about one three-hundred-and-fiftieth (about 1/350) in comparison with the amount of the catalyst (8.9% by weight) used in the experimental example described in Non-Patent Document 1 which is described later. As described above, the living radical polymerization reaction can be conducted with a quite small amount of the catalyst. Therefore, it was confirmed that the activity of the catalyst is very high.

With regard to dormant species, in entry 2 of this Example, iodine ($I_2$) was used in place of isolated CP-I as a starting compound. Iodine was reacted with an azo compound (AIBN) to produce CP-I, which is to be used as a dormant species, in the reaction solution. In the Example of entry 2 where PhI was used as catalyst, $M_n$ and PDI were controlled similarly to the Example of entry 1 where the same catalyst and isolated CP-I were used. A method of using $I_2$ as a starting compound is effective for carbon catalysts.

Further, in the case where different carbon compound (MesI (entry 3, and white triangle Δ in FIG. 1), IA (entry 4), IBN (entry 5), $CI_4$ (entry 6, and white square □ in FIG. 1), or $CF_2I_4$ (entry 7)) was used as a catalyst, $M_n$ and PDI were successfully controlled.

Furthermore, in the case of benzyl methacrylate (BzMA) (entry 8, and black circle ● in FIG. 1), which is a different monomer, $M_n$ and PDI were successfully controlled.

When any catalyst is used, the polymerization can proceed at high rate. For example, the rate of polymerization reached 54 to 100% in 1.5 to 3.5 hours. As described above, the polymerizations of MMA and BzMA were both successfully controlled by using 6 kinds of carbon-iodides as catalyst. It should be noted that carbon-iodides suitable for the polymerization are not limited to these 6 kinds.

From the tacticity of the produced polymers, it was confirmed that the present polymerizations were radical polymerizations.

TABLE 1

Polymerization with carbon-iodide (catalyst)

| entry | monomer (equiv to [R-I]) | catalyst | R-I | In | $[R-I]_0/[In]_0/[cat]_0$ | T (°C.) | t (h) | conv (%) | $M_n$ ($M_{n, theo}$) | PDI |
|---|---|---|---|---|---|---|---|---|---|---|
| 1 | MMA (100) | PhI | CP-I | AIBN | 80/10/1 | 80 | 1.5 | 45 | 5000 (4500) | 1.31 |
| 2 | MMA (100) | PhI | $I_2$ | AIBN | 40/80/1 | 80 | 2.83 | 17 | 3600 (1700) | 1.38 |
|   |   |   |   |   |   |   | 3.08 | 35 | 4700 (3500) | 1.38 |
|   |   |   |   |   |   |   | 3.25 | 46 | 5400 (4600) | 1.38 |
|   |   |   |   |   |   |   | 3.42 | 58 | 6200 (5800) | 1.37 |
|   |   |   |   |   |   |   | 3.5 | 100 | 7000 (10000) | 1.37 |
| 3 | MMA (100) | MesI | CP-I | AIBN | 80/10/10 | 80 | 0.58 | 20 | 3500 (2000) | 1.43 |
|   |   |   |   |   |   |   | 0.83 | 28 | 3800 (2800) | 1.39 |
|   |   |   |   |   |   |   | 1.08 | 40 | 4300 (4000) | 1.33 |
|   |   |   |   |   |   |   | 1.50 | 54 | 5500 (5400) | 1.28 |
|   |   |   |   |   |   |   | 1.83 | 100 | 8300 (10000) | 1.31 |
| 4 | MMA (100) | IA | CP-I | AIBN | 80/10/1 | 80 | 2.3 | 60 | 5800 (6000) | 1.45 |
| 5 | MMA (100) | IBN | CP-I | AIBN | 80/10/1 | 80 | 2 | 90 | 7500 (9000) | 1.49 |
| 6 | MMA (100) | $CI_4$ | CP-I | AIBN | 80/10/1 | 80 | 0.33 | 9 | 1500 (900) | 1.23 |
|   |   |   |   |   |   |   | 0.67 | 20 | 2600 (2000) | 1.23 |
|   |   |   |   |   |   |   | 1 | 34 | 4000 (3400) | 1.30 |
|   |   |   |   |   |   |   | 1.33 | 45 | 5200 (4500) | 1.30 |
|   |   |   |   |   |   |   | 1.67 | 56 | 6300 (5600) | 1.31 |
|   |   |   |   |   |   |   | 2 | 65 | 7500 (6500) | 1.30 |
|   |   |   |   |   |   |   | 2.33 | 90 | 8000 (9000) | 1.31 |
| 7 | MMA (100) | $CF_2I_2$ | CP-I | AIBN | 80/10/1 | 80 | 2 | 90 | 9000 (9000) | 1.49 |
| 8 | BzMA (100) | $CI_4$ | CP-I | AIBN | 80/10/1 | 80 | 0.33 | 17 | 3500 (3000) | 1.21 |
|   |   |   |   |   |   |   | 0.5 | 27 | 5300 (4800) | 1.27 |
|   |   |   |   |   |   |   | 0.67 | 38 | 6900 (6700) | 1.28 |
|   |   |   |   |   |   |   | 0.83 | 49 | 8300 (8600) | 1.28 |
|   |   |   |   |   |   |   | 1.33 | 68 | 11000 (12000) | 1.28 |
|   |   |   |   |   |   |   | 2 | 80 | 12600 (14000) | 1.29 |

Monomer: methyl methacrylate (MMA) or benzyl methacrylate (BzMA)
Monomer concentration: 8M (bulk)
Alkyl halide to be used as a dormant species (R—I): 2-cyanopropyl iodide (CP-I), or a substance produced from $I_2$ and AIBN in the reaction solution
Radical initiator (In): 2,2'-azobis(isobutylonitrile) (AIBN)
Catalyst (XA): iodobenzene (PhI), 2,4,6-trimethyliodobenzene (MesI), 4-iodoanisole (IA), 3-cyanoiodobenzene (IBN), tetraiodomethane ($CI_4$), difluorodiiodomethane ($CF_2I_2$)
$M_n$ and PDI: in the case of the polymerization of MMA, molecular weight and polydispersity obtained by gel permeation chromatography (GPC) with tetrahydrofuran (THF) as an eluent calibrated by poly(methyl methacrylate) (PMMA) standard; and in the case of BzMA polymerization, molecular weight and polydispersity determined by multi-angle laser light scattering (MALLS) detector with gel permeation chromatography (GPC) with tetrahydrofuran (THF) as an eluent.

Example 2

Homopolymerization of Methyl Methacrylate (MMA) or N,N-dimethylaminoethyl Methacrylate (DMAEMA) with Hydrocarbon Precursor-Type Catalyst Polymerization of methyl methacrylate (MMA) or N,N-dimethylaminoethyl methacrylate (DMAEMA) was carried out similarly to Example 1 except for the changes of the reaction materials and reaction conditions, as shown in Table 2 (entries 9 to 20)

In a system similar to Example 1, a hydrocarbon compound was used as a precursor of a catalyst instead of a carbon-iodide (the aforementioned Scheme 2). In this polymerization, a radical generated by cleavage of a radical initiator, or a growing chain radical (polymer.) derived therefrom abstracts a hydrogen of a hydrocarbon to generate an activated radical R—C. (Scheme 2(a)) Based on the action of the carbon radical, the reversible activation is conducted (aforementioned Scheme 2(b)).

In this Example, as catalysts (the chemical formulas are as shown above), 1,4-cyclohexadiene (CHD), diphenylmethane (DPM), dimesitylmethane (DMM), fluorene (FR), xanthene, thioxanthene, and diethyl malonate (DEM) were used. These hydrocarbon compounds have higher functional-group-tolerance and higher stability to water and light than iodides (such as PhI). Further, the compounds may allow easy and simple operation at the time of preparing a solution for the polymerization. Furthermore, the compounds are very inexpensive.

Figure 2:
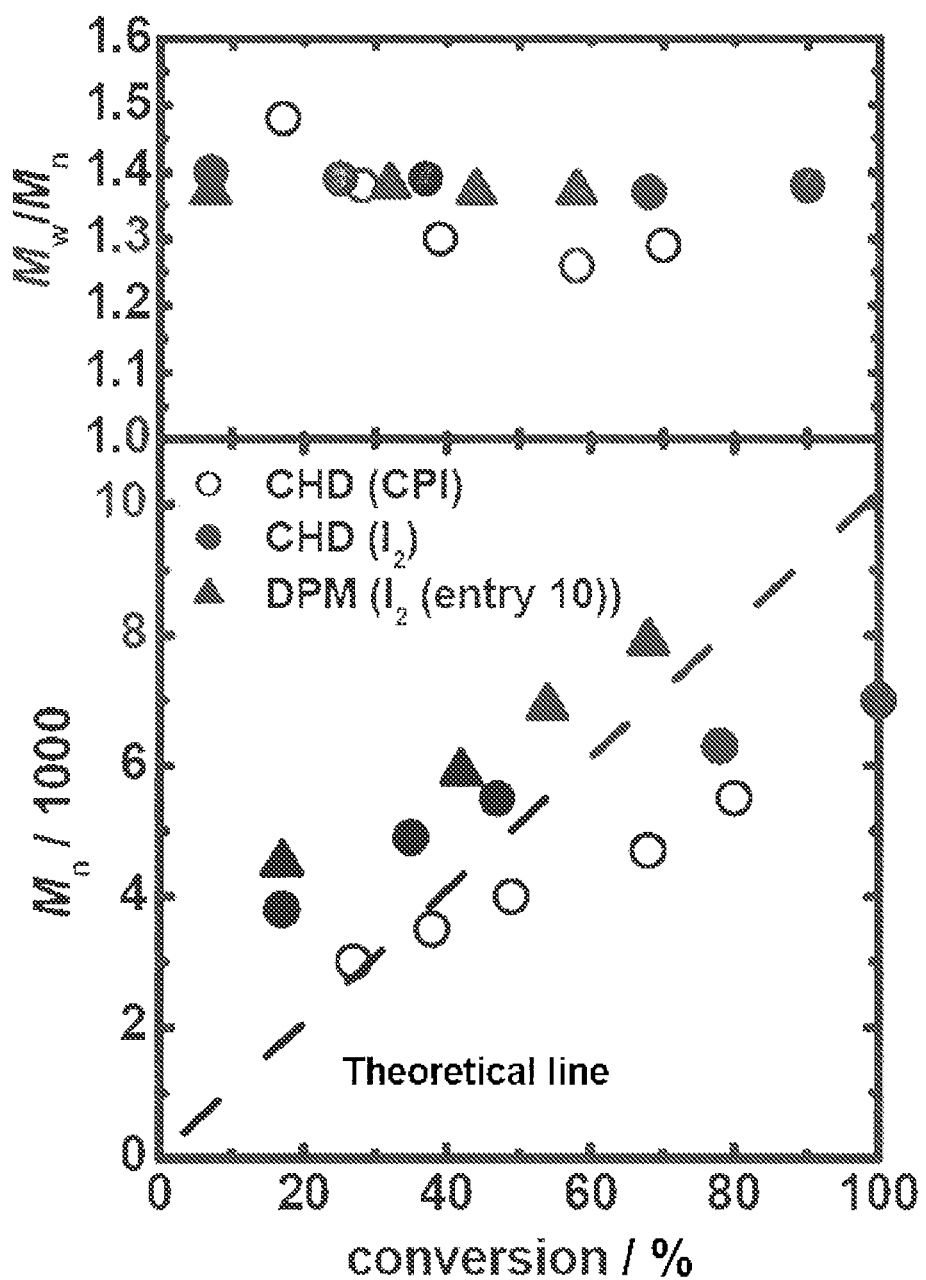
FIG. 2 is a graph plotting $M_n$ and $M_w/M_n$ vs. monomer conversion (ratio of polymerization) in the MMA polymerization (MMA/CP-I/AIBN or BPO/hydrocarbon compound catalyst precursor (80° C.)). White circles represent the values of entry 7 as given in Table 2. Black circles represent the values of entry 8 as given in Table 2. Black triangles represent the values of entry 10 as given in Table 2. The obtained results are consistent with the theoretical values, which are indicated as Theoretical line.

Table 2 (entries 9-19) and FIG. 2 show the results of the polymerization of MMA using a hydrocarbon compound as a catalyst. $M_n$ was approximately proportional to the rate of polymerization, and PDI was low from the early stage of the polymerization. The polymerization was well controlled.

As a radical initiator, BPO was used alone in entry 9, and AIBN was used alone in entries 10, 11, and 19. AIBN and BPO were used in entries 12-18. A radical having an oxygen center derived from BPO has a strong force for abstracting a hydrogen from the hydrocarbon of the catalyst. A lower PDI was successfully obtained when AIBN was combined with BPO than when AIBN was used alone (e.g., entry 11 vs. entry 12).

With regard to dormant species, in entries 10-20 of the present Example, iodine ($I_2$) was used in place of CP-I. Iodine was reacted with an azo compound (AIBN) to form a dormant species in the reaction solution. In all of the above entries, $M_n$ and PDI were controlled. The method using $I_2$ as a starting compound was effective also for a precursor-type catalyst.

Further, as shown in entry 20, polymerization of DMAEMA was carried out similarly to entry 11 except for the changes of the reaction materials and reaction conditions. Since DMAEMA has an amino group, the homopolymerization of DMAEMA cannot be controlled by catalysts in the prior art (e.g., germanium catalysts). However, in the experiment of entry 20, the polymerization was successfully well controlled. This result indicates that the functional-group-tolerance of a hydrocarbon compound catalyst is very high. That is, it is understood that even polymerization of a monomer having a highly-reactive functional group can be successfully well controlled when a hydrocarbon compound is used as a catalyst. Other examples of the homopolymerization of DMAEMA are shown in Example 9.

When any catalyst is used, the polymerization can be performed at high rate. For example, the rate of polymerization reached 49-100% in 1.83 to 4 hours. As described above, the polymerizations of MMA and DMAEMA are both successfully controlled by using 8 kinds of hydrocarbon compounds as catalyst. It should be noted that hydrocarbon compounds suitable for the polymerization are not limited to these 8 kinds.

$M_n$ and PDI: in the case of MMA polymerization, molecular weight and polydispersity obtained by gel permeation chromatography (GPC) with tetrahydrofuran (THF) as an eluent calibrated by poly(methyl methacrylate) (PMMA) standard; and in the case of DMAEMA polymerization, molecular weight and polydispersity determined by multi-angle laser light scattering (MALLS) detector with gel permeation chromatography (GPC) with dimethylformamide (DMF) as an eluent.

In view of the molecular weight of CHD (about 80), the amount of 2 mM used in the experiment of entry 10 in Table 2 corresponds to about 0.02% by weight in the MMA monomer solution. This amount is about one four-hundred-and-fiftieth (about 1/450) in comparison with the amount of the catalyst (8.9% by weight) used in the experimental example described in Non-Patent Document 1 which is described later. As described above, the living radical polymerization reac-

TABLE 2

Polymerization with hydrocarbon (precursor-type catalyst)

| entry | monomer (equiv to [R-I]) | catalyst | R-I | In | $[R-I]_0/[In]_0/[cat]_0$ (mM) | T (° C.) | t (h) | conv (%) | $M_n$ ($M_{n.theo}$) | PDI |
|---|---|---|---|---|---|---|---|---|---|---|
| 9 | MMA (100) | CHD | CP-I | BPO | 80/20/3 | 80 | 0.67 | 24 | 3000 (2400) | 1.48 |
|   |           |     |      |     |         |    | 1    | 34 | 3500 (3400) | 1.38 |
|   |           |     |      |     |         |    | 1.33 | 41 | 4000 (4100) | 1.3  |
|   |           |     |      |     |         |    | 1.83 | 49 | 4700 (4900) | 1.26 |
|   |           |     |      |     |         |    | 2.33 | 60 | 5500 (6000) | 1.29 |
| 10 | MMA (100) | CHD | $I_2$ | AIBN | 40/80/2 | 80 | 3.5 | 17 | 3800 (1700) | 1.39 |
|   |           |     |       |      |         |    | 3.75 | 35 | 4900 (3500) | 1.39 |
|   |           |     |       |      |         |    | 3.92 | 47 | 5500 (4700) | 1.39 |
|   |           |     |       |      |         |    | 245  | 78 | 6300 (7800) | 1.37 |
|   |           |     |       |      |         |    | 260  | 100 | 7000 (10000) | 1.38 |
| 11 | MMA (100) | DPM | $I_2$ | AIBN | 40/80/150 | 80 | 3.75 | 66 | 7200 (6600) | 1.38 |
|   |           |     |       |      |           |    | 3.92 | 100 | 8000 (10000) | 1.40 |
| 12 | MMA (100) | DPM | $I_2$ | AIBN/BPO | 40/(80/5)/150 | 80 | 2.58 | 88 | 10000 (8800) | 1.31 |
| 13 | MMA (100) | DPM | $I_2$ | AIBN/BPO | 40/(80/5)/30 | 80 | 2.08 | 17 | 4500 (1700) | 1.37 |
|   |           |     |       |          |              |    | 2.25 | 42 | 5900 (4200) | 1.38 |
|   |           |     |       |          |              |    | 2.42 | 54 | 6900 (5400) | 1.37 |
|   |           |     |       |          |              |    | 2.5  | 68 | 7900 (6800) | 1.47 |
| 14 | MMA (100) | DMM | $I_2$ | AIBN/BPO | 40/(80/5)/150 | 80 | 3 | 80 | 8500 (8000) | 1.45 |
| 15 | MMA (100) | FR | $I_2$ | AIBN/BPO | 40/(80/5)/150 | 80 | 3.3 | 100 | 10100 (10000) | 1.45 |
| 16 | MMA (100) (in 50% anisole) | Xanthene | $I_2$ | AIBN/BPO | 20/(40/2.5)/5 | 80 | 3.25 | 27 | 4000 (2700) | 1.36 |
|   |           |          |       |          |               |    | 4.08 | 38 | 4800 (3800) | 1.36 |
|   |           |          |       |          |               |    | 4.75 | 54 | 5700 (5400) | 1.35 |
| 17 | MMA (100) (in 50% anisole) | Thioxanthene | $I_2$ | AIBN/BPO | 20/(40/2.5)/15 | 80 | 3.08 | 13 | 2300 (1300) | 1.18 |
|   |           |              |       |          |                |    | 3.5  | 30 | 3600 (3000) | 1.18 |
|   |           |              |       |          |                |    | 3.92 | 45 | 4700 (4500) | 1.18 |
|   |           |              |       |          |                |    | 4.5  | 57 | 5800 (5700) | 1.20 |
| 18 | MMA (100) (in 50% anisole) | Thioxanthene | $I_2$ | AIBN/BPO | 20/(50/2.5)/15 | 80 | 3.17 | 63 | 6900 (6300) | 1.43 |
|   |           |              |       |          |                |    | 4    | 89 | 7600 (8900) | 1.42 |
| 19 | MMA (100) | DEM | $I_2$ | AIBN | 40/80/30 | 80 | 3.33 | 61 | 7800 (6100) | 1.48 |
| 20 | DMAEMA(100) | DPM | $I_2$ | AIBN | 40/80/150 | 80 | 3.3 | 49 | 7700 (7700) | 1.35 |

Monomer: methylmethacrylate (MMA), N,N-dimethylaminoethyl-methacrylate (DMAEMA)
Monomer concentration: 8 M (bulk), 4 M (50% anisole solution)
Alkyl halide to be used as a dormant species (R—I): 2-cyanopropyl iodide (CP-I), or a substance produced from $I_2$ and AIBN in the reaction solution
Radical initiator (In): 2,2'-azobis(isobutylonitrile) (AIBN), benzoyl peroxide (BPO)
Catalyst (XA): 1,4-cyclohexadiene (CHD), diphenylmethane (DPM), dimesitylmethane (DMM), fluorene (FR), xanthene, thioxanthene, diethyl malonate (DEM)

tion can be conducted with a quite small amount of the catalyst. Accordingly, it was confirmed that the activity of the catalyst is very high.

Example 3

Homopolymerization of Styrene (St) with a Precursor-Type Carbon Catalyst

In a system similar to Example 2, experiments were conducted. However, the materials and conditions were changed as shown in Table 3 below. The results are shown in Table 3 below.

TABLE 3

| entry | monomer | R-X | In | XA | [R-X]0/[In]0/[XA]0 (mM) | T (°C.) | t (min) | conv (%) | Mn | Mn, theo | PDI |
|---|---|---|---|---|---|---|---|---|---|---|---|
| 1 | St | CPI | BPO | CHD | 80/20/3 | 80 | 7 | 42 | 6000 | 4400 | 1.48 |
|   |    |     |     |     |         |    | 9 | 53 | 6800 | 5500 | 1.45 |
|   |    |     |     |     |         |    | 22 | 100 | 10300 | 10400 | 1.32 |
| 2 | St | CPI | BPB | CHD | 80/40/10 | 100 | 4 | 56 | 7600 | 5800 | 1.43 |
|   |    |     |     |     |         |    | 6 | 100 | 10500 | 10400 | 1.31 |
| 3 | St | CPI | BPB | DPM | 80/40/150 | 100 | 2 | 28 | 4400 | 2900 | 1.44 |
|   |    |     |     |     |         |    | 3 | 47 | 5500 | 4800 | 1.4 |
|   |    |     |     |     |         |    | 5 | 65 | 8000 | 6800 | 1.26 |
| 4 | St | CPI | BPB | Thioxanthene | 80/40/30 | 100 | 2 | 26 | 4300 | 2700 | 1.44 |
|   |    |     |     |     |         |    | 3 | 43 | 5200 | 4500 | 1.42 |
|   |    |     |     |     |         |    | 5 | 62 | 7400 | 6500 | 1.32 |

Monomer: styrene
Monomer concentration: 8 M (bulk)
Alkyl halide to be use as a dormant species (R—I): CPI
Radical initiator (In): benzoyl peroxide (BPO), t-butyl peroxybenzoate (BPB)
Catalyst (XA): 1,4-cyclohexadiene (CHD), diphenylmethane (DPM), thioxanthene
$M_n$ and PDI: Molecular weight and polydispersity obtained by gel permeation chromatography (GPC) with tetrahydrofuran (THF) as an eluent calibrated by polystyrene (PSt) standard.

Example 4

Homopolymerization of Aminostyrene (AminoSt) with Precursor-Type Carbon Catalyst In a system similar to Example 2, experiments were conducted. However, the materials and conditions were changed as shown in Table 4 below. The results are shown in Table 4 below.

TABLE 4

| entry | monomer | R-X | In | XA | [R-X]0/[In]0/[XA]0 (mM) | T (°C.) | t (min) | conv (%) | Mn | Mn, theo | PDI |
|---|---|---|---|---|---|---|---|---|---|---|---|
| 1 | AminoSt | CPI | None | CHD | 80/0/30 | 50 | 30 | 28 | 4100 | 3300 | 1.08 |
|   |    |     |      |     |         |    | 40 | 65 | 5700 | 7800 | 1.27 |
|   |    |     |      |     |         |    | 50 | 78 | 8000 | 9300 | 1.32 |
| 2 | AminoSt | CPI | None | CHD | 80/0/10 | 50 | 45 | 49 | 5100 | 5800 | 1.18 |
|   |    |     |      |     |         |    | 50 | 67 | 6600 | 7900 | 1.29 |
|   |    |     |      |     |         |    | 60 | 74 | 8300 | 8900 | 1.38 |

Monomer: aminostyrene
Monomer concentration: 8 M (bulk)
Alkyl halide to be used as a dormant species (R—I): CPI
Radical initiator (In): none
Catalyst (XA): 1,4-cyclohexadiene (CHD),
$M_n$ and PDI: Molecular weight and polydispersity determined by multi-angle laser light scattering (MALLS) detector with gel permeation chromatography (GPC) with dimethylformamide (DMF) as an eluent.

Example 5

Homopolymerization of Phenyl Methacrylate (POMA) with Precursor-Type Carbon Catalyst $I_2$ and an azo initiator (AIBN) was dissolved in a solvent (MFDG), and then the solution was poured into a Schlenk tube (MFDG/$I_2$/AIBN (50 w %/20/50)). The tube was covered with a three-way cock, and the replacement with argon was performed. The Schlenk tube was heated in an oil bath at 80° C. for 2.5 hours, during which the color of the solution turned from red to pale lemon. Thereafter, the Schlenk tube was immersed in an oil bath at 40° C., then a monomer (POMA), an azo initiator (V70), and a catalyst (CHD) were simultaneously added thereto, and the mixture was reacted at 40° C. The result is shown in Table 5 below. The time (t) in the table represents the reaction time at 40° C.

TABLE 5

| entry | monomer | T (°C.) | t (min) | The type of GPC | conv (%) | Mn | Mn, theo | PDI |
|---|---|---|---|---|---|---|---|---|
| 1 | POMA (4000) | 80⇒40 | 120 | THF | 100 | 10000 | 16200 | 1.24 |

Monomer: phenyl methacrylate (POMA)
Solution polymerization (solvent (MFDG) 50%)
Solvent: Dipropylene glycol monomethyl ether (MFDG)
Monomer concentration: 4 M Radical initiator (In): $I_2$, AIBN, 2,2'-azobis(4-methoxy-2,4-dimethylvaleronitrile) (V70)
Catalyst (XA): 1,4-cyclohexadiene (CHD)
$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 6

Homopolymerization of Benzyl Methacrylate (BzMA) with Precursor-Type Carbon Catalyst In a system similar to Example 2, the experiments were conducted. However, the materials and conditions were changed as shown Table 6 below. In entries 2 and 3, $I_2$ was added as an additive to enhance the ability to control the polymerization. The results are shown in Table 6 below.

TABLE 6

| entry | monomer | R-X | In | XA | [R-X]0/[In]0/ [XA]0/[I2]0(mM) | T (°C.) | t (min) | conv (%) | Mn | Mn, theo | PDI |
|---|---|---|---|---|---|---|---|---|---|---|---|
| 1 | BzMA | CPI | AIBN | CI4 | 80/10/1/0 | 80 | 20 | 17 | 3500 | 3000 | 1.21 |
|   |      |     |      |     |            |    | 30 | 27 | 5300 | 4800 | 1.27 |
|   |      |     |      |     |            |    | 40 | 38 | 6900 | 6700 | 1.28 |
|   |      |     |      |     |            |    | 50 | 49 | 8300 | 8600 | 1.28 |
|   |      |     |      |     |            |    | 80 | 68 | 11000 | 12000 | 1.28 |
|   |      |     |      |     |            |    | 120 | 80 | 12600 | 14000 | 1.29 |
| 2 | BzMA | CPI | BPO | CHD | 80/40/3/1 | 70 | 120 | 45.9 | 6000 | 6400 | 1.12 |
|   |      |     |      |     |            |    | 180 | 78.7 | 11800 | 13900 | 1.2 |
| 3 | BzMA | CPI | BPO | CHD | 80/40/3/1 | 80 | 60 | 46.5 | 6800 | 8100 | 1.12 |
|   |      |     |      |     |            |    | 180 | 93.9 | 13300 | 16500 | 1.27 |

Monomer: benzyl methacrylate (BzMA)
Monomer concentration: 8 M (bulk polymerization)
In entries 2 and 3, $I_2$ was added.
Alkyl halide to be used as a dormant species (R—I): CPI
Radical initiator (In): AIBN, BPO
Catalyst (XA): tetraiodomethane, 1,4-cyclohexadiene (CHD)
$M_n$ and PDI: Molecular weight and polydispersity determined by multi-angle laser light scattering (MALLS) detector with gel permeation chromatography (GPC) with tetrahydrofuran (THF) as an eluent.

Example 7

Homopolymerization of Glycidyl Methacrylate (GMA) with Precursor-Type Carbon Catalyst In a system similar to Example 2, the experiment was conducted. However, the materials and condition were changed as shown in Table 7 below. The result was shown in Table 7 below.

TABLE 7

| entry | monomer | R-X | In | XA | [R-X]0/[In]0/ [XA]0/[I2]0(mM) | T (°C.) | t (min) | conv (%) | Mn | Mn, theo | PDI |
|---|---|---|---|---|---|---|---|---|---|---|---|
| 1 | GMA | CPI | V70 | CHD | 60/15/2.25/0.75 (toluene 25 wt %) | 50 | 40 | 90.2 | 7300 | 12800 | 1.36 |

Monomer: glycidyl methacrylate (GMA)
Solution polymerization (toluene 25%)
Monomer concentration: 6 M
$I_2$ was added.
Alkyl halide to be used as a dormant species (R—I): CPI
Radical initiator (In): AIBN, BPO
Catalyst (XA): 1,4-cyclohexadiene (CHD)
$M_n$ and PDI: Molecular weight and polydispersity determined by multi-angle laser light scattering (MALLS) detector with gel permeation chromatography (GPC) with tetrahydrofuran (THF) as an eluent.

Example 8

Homopolymerization of Poly(ethylene glycol)methacrylate (PEGMA) with Precursor-Type Carbon Catalyst In a system similar to Example 2, examples were conducted. However, the materials and conditions were changed as shown in Table 8 below. The results are shown in Table 8 below.

TABLE 8

| entry | monomer | R-X | In | XA | [R-X]0/[In]0/[XA]0/[I2]0(mM) | T (°C.) | t (min) | conv (%) | Mn | Mn, theo | PDI |
|---|---|---|---|---|---|---|---|---|---|---|---|
| 1 | PEGMA (n = 9) | CPI | V70 | CHD | 80/40/5/0 | 80 | 60 | 34.7 | 14000 | 16500 | 1.46 |
|  |  |  |  |  |  |  | 120 | 67.6 | 21200 | 32000 | 1.48 |
| 2 | PEGMA (n = 9) | CPI | V70 | CHD | 80/160/3/1 | 50 | 120 | 40.6 | 12500 | 18500 | 1.18 |
| 3 | PEGMA (n = 9) | CPI | V70 | CHD | 80/80/3/1 | 50 | 120 | 49.2 | 11500 | 22500 | 1.29 |

Monomer: poly(ethylene glycol) methacrylate (PEGMA)
The monomer has a molecular weight of 475.
Monomer concentration: 8 M (bulk polymerization)
In entries 2 and 3, $I_2$ was added.
Alkyl halide to be used as a dormant species (R—I): CPI
Radical initiator (In): V70
Catalyst (XA): 1,4-cyclohexadiene (CHD)
$M_n$ and PDI: Molecular weight and polydispersity determined by multi-angle laser light scattering (MALLS) detector with gel permeation chromatography (GPC) with dimethylformamide (DMF) as an eluent, Example 9

Homopolymerization of N,N-dimethylaminoethyl Methacrylate (DMAEMA) with a Carbon-Iodide (Catalyst) and a Precursor-Type Carbon Catalyst In a system similar to Example 2, experiments were conducted. However, the materials and conditions were changed as shown in Table 9 below. The results are shown in Table 9 below.

Monomer: N,N-dimethylaminoethyl methacrylate (DMAEMA)

Monomer concentration: 8 M (bulk)

Alkyl halide to be used as a dormant species (R—I): CPI

In entry 3, an alkyl halide was not used but $I_2$ was added.

Radical initiator (In): AIBN

Catalyst (XA): iodobenzene, mesityl iodide (MesI), diphenylmethane (DPM), 1,4-cyclohexadiene (CHD)

$M_n$ and PDI: Molecular weight and polydispersity determined by multi-angle laser light scattering (MALLS) detector with gel permeation chromatography (GPC) with dimethylformamide (DMF) as an eluent.

TABLE 9

| entry | monomer | R-X | In | XA | [R-X]0/[In]0/[XA]0(mM) | T (°C.) | t (min) | conv (%) | Mn | Mn, theo | PDI |
|---|---|---|---|---|---|---|---|---|---|---|---|
| 1 | DMAEMA | CPI | AIBN | Iodobenzene | 80/10/1 | 80 | 55 | 65 | 14300 | 10200 | 1.48 |
| 2 | DMAEMA | CPI | AIBN | MesI | 80/10/10 | 80 | 55 | 56 | 13100 | 8800 | 1.43 |
| 3 | DMAEMA | $I_2$ | AIBN | DPM | 40/80/150 | 80 | 195 | 49 | 7700 | 8600 | 1.35 |
|  |  |  |  |  |  |  | 205 | 69 | 12500 | 12100 | 1.43 |
| 4 | DMAEMA | CPI | AIBN | CHD | 80/40/10 | 80 | 30 | 37 | 8000 | 5800 | 1.37 |
|  |  |  |  |  |  |  | 40 | 55 | 9800 | 8600 | 1.35 |
|  |  |  |  |  |  |  | 60 | 90 | 11200 | 14000 | 1.4 |

Example 10

Homopolymerization of Acrylonitrile (AN) with Precursor-Type Carbon Catalyst

In a system similar to Example 2, experiments were conducted. However, the materials and conditions were changed as shown in Table 10 below. The results are shown in Table 10 below.

TABLE 10

| entry | monomer | R-X | In | XA | [R-X]0/[In]0/[XA]0(mM) | T (°C.) | t (min) | conv (%) | Mn | Mn, theo | PDI |
|---|---|---|---|---|---|---|---|---|---|---|---|
| 1 | AN | CPI | BPO | CHD | 80/40/5 ethylene carbonate 70 wt % | 80 | 30 | — | — | — | — |
|  |  |  |  |  |  |  | 120 | 71.3 | 15100 | 3800 | 1.39 |
| 2 | AN | CPI | BPO | CHD | 80/40/5 ethylene carbonate 50 wt % | 80 | 30 | — | — | — | — |
|  |  |  |  |  |  |  | 120 | 73.3 | 11800 | 3900 | 1.29 |

TABLE 10-continued

| entry | monomer | R-X | In | XA | [R-X]0/[In]0/[XA]0(mM) | T (°C.) | t (min) | conv (%) | Mn | Mn, theo | PDI |
|---|---|---|---|---|---|---|---|---|---|---|---|
| 3 | AN | CPI | BPO | CHD | 80/40/5 ethylene carbonate 50 wt % | 80 | 120 | 60.3 | 15900 | 3200 | 1.46 |

Monomer: acrylonitrile (AN)
Solution polymerization (containing 50% or 70% solvent (ethylene carbonate))
Monomer concentration: 4 M when the solvent is 50%; and 2.4 M when the solvent is 70%.
Alkyl halide to be used as a dormant species (R—I): CPI
Radical initiator (In): BPO
Catalyst (XA): 1,4-cyclohexadiene (CHD)
$M_n$ and PDI: Molecular weight and polydispersity obtained by gel permeation chromatography (GPC) with dimethylformamide (DMF) as an eluent calibrated by poly(methyl methacrylate) (PMMA) standard.

Solution polymerization (containing 50% solvent (35% methyl ethyl ketone (MEK) and 15% 1-propanol))
Monomer concentration: 4 M
Alkyl halide to be used as a dormant species (R—I): CPI
Radical initiator (XA): V70 or AIBN
In entries 2 and 3, $I_2$ was added.
Catalyst (XA): 1,4-cyclohexadiene (CHD)
$M_n$ and PDI: Molecular weight and polydispersity obtained by gel permeation chromatography (GPC) with dimethylformamide (DMF) as an eluent calibrated by poly(methyl methacrylate) (PMMA) standard.

Example 11

Random Copolymerization of Methyl Methacrylate (MMA) and Hydroxyethylmethacrylate (HEMA) with Precursor-Type Carbon Catalyst In a system similar to Example 2, experiments were conducted. However, the materials and conditions were changed as shown in Table 11 below. The results are shown in Table 11 below.

Example 12

Random Copolymerization of Methyl Methacrylate (MMA) and Hydroxyethylmethacrylate (HEMA) with Precursor-Type Carbon Catalyst (Entries 1 to 7)
In a system similar to Example 2, experiments were conducted. However, the materials and conditions were changed

TABLE 11

| entry | monomer | R-X | In | XA | [R-X]0/[In]0/[XA]0/[I$_2$]0(mM) | T (°C.) | t (min) | conv (%) | Mn | Mn, theo | PDI |
|---|---|---|---|---|---|---|---|---|---|---|---|
| 1 | MMA/HEMA (2000/2000) | CPI | BPO | CHD | 40/20/2.5/0 35 wt % MEK + 15 wt % 1-propanol | 70 | 90 | 45.4 | 5000 | 5200 | 1.48 |
| 2 | MMA/HEMA (2000/2000) | CPI | V70 | CHD | 40/10/10/1.5 35 wt % MEK + 15 wt % 1-propanol | 50 | 60 | 100 | 10300 | 11900 | 1.48 |
| 3 | MMA/HEMA (2000/2000) | CPI | AIBN | CHD | 40/40/10/1.5 35 wt % MEK + 15 wt % 1-propanol | 80 | 120 | 74.2 | 7300 | 7900 | 1.45 |

Monomer: methyl methacrylate (MMA) and hydroxyethyl methacrylate (HEMA)
Random copolymerization as shown in Table 12A below. All compounds were mixed and heated at the predetermined temperature to conduct the experiments. The results are shown in Table 12A below.

TABLE 12A

| entry | monomer | R-X | In | XA | [R-X]0/[In]0/[XA]0(mM) | T (°C.) | t (min) | conv (%) | Mn | Mn, theo | PDI |
|---|---|---|---|---|---|---|---|---|---|---|---|
| 1 | MMA/MAA (6000/2000) | CPI | PERKADOX 16 | CHD | 80/80/5 | 80 | 10 | 46.7 | 4600 | 4500 | 1.32 |
| 2 | MMA/MAA (6000/2000) | CPI | PERKADOX 16 | DPM | 80/80/30 | 80 | 10 | 31.8 | 3700 | 3100 | 1.27 |
| 4 | MMA/MAA (6000/2000) | CPI | V70 | CHD | 80/80/5 | 60 | 30 | 94.9 | 5800 | 9200 | 1.29 |
| 5 | MMA/MAA (4800/3200) | CPI | V70 | CHD | 80/80/10 | 40 | 100 | 80.8 | 8100 | 7600 | 1.21 |

TABLE 12A-continued

| entry | monomer | R-X | In | XA | [R-X]0/[In]0/[XA]0(mM) | T (°C.) | t (min) | conv (%) | Mn | Mn, theo | PDI |
|---|---|---|---|---|---|---|---|---|---|---|---|
| 6 | MMA/MAA (4800/3200) | CPI | V70 | CHD | 80/80/20 | 40 | 100 | 100 | 8300 | 9400 | 1.17 |
| 7 | MMA/MAA (4800/3200) | CPI | V70 | DPM | 80/80/150 | 40 | 100 | 59.5 | 9300 | 5600 | 1.17 |

Monomer: methyl methacrylate (MMA) and hydroxyethyl methacrylate (HEMA) (bulk polymerization)

the results are shown in Table 12B below. The time (t) in the table represents the reaction time at 40° C.

TABLE 12B

| entry | monomer | Initial mixture | Later-added material | T (°C.) | t (min) | conv (%) | Mn | Mn, theo | PDI |
|---|---|---|---|---|---|---|---|---|---|
| 8 | MMA/MAA (3600/2400) | 1,2-Diethoxy-ethane/I$_2$/AIBN (25 w %/30/75) | Monomer and V70/CHD (60/7.5) | 80⇒40 | 120 | 73 | 6700 | 6900 | 1.29 |
| 9 | MMA/MAA (3600/2400) | Butyl acetate/ I$_2$/AIBN (25 w %/30/75) | Monomer and V70/CHD (60/7.5) | 80⇒40 | 120 | 89.3 | 8000 | 8400 | 1.32 |
| 10 | MMA/MAA (3600/2400) | 1,2-Diethoxy-ethane/I$_2$/AIBN (25 w %/30/75) | Monomer and V70/CHD (60/3.75) | 80⇒50 | 60 | 92.7 | 7100 | 8700 | 1.41 |
| 11 | MMA/MAA (3600/2400) | Butyl acetate/ I$_2$/AIBN (25 w %/30/75) | Monomer and V70/CHD (60/3.75) | 80⇒50 | 60 | 97.1 | 8200 | 9200 | 1.39 |
| 12 | MMA/MAA (3600/2400) | Butyl acetate/ I$_2$/AIBN (25 w %/30/75) | Monomer and V70/CHD (30/3.75) | 80⇒50 | 120 | 76.4 | 6900 | 7200 | 1.27 |
| 13 | MMA/MAA (3600/2400) | MFDG/I$_2$/AIBN (25 w %/30/75) | Monomer and V70/CHD (60/3.75) | 80⇒50 | 60 | 95.8 | 8600 | 9000 | 1.44 |
| 14 | MMA/MAA (2400/1600) | MFDG/I$_2$/AIBN (50 w %/20/50) | Monomer and V70/CHD (40/5) | 80⇒50 | 40 | 61.8 | 5100 | 5800 | 1.38 |
|  |  |  |  |  | 180 | 85.4 | 6300 | 8100 | 1.39 |
| 15 | MMA/MAA (2400/1600) | MFDG/I$_2$/AIBN (50 w %/20/50) | Monomer and V70/CHD (40/5) | 80⇒40 | 120 | 51.9 | 4400 | 4900 | 1.27 |
|  |  |  |  |  | 210 | 75.5 | 5800 | 7100 | 1.29 |
| 16 | MMA/MAA (2400/1600) | MFDG/I$_2$/AIBN (50 w %/20/50) | Monomer and V70/CHD (40/2.5) | 80⇒40 | 60 | 35 | 3600 | 3300 | 1.24 |
|  |  |  |  |  | 120 | 54.6 | 4800 | 5200 | 1.28 |
|  |  |  |  |  | 210 | 76.4 | 6000 | 7200 | 1.3 |
|  |  |  |  |  | 240 | 87.9 | 6700 | 8300 | 1.31 |

Monomer concentration: 8 M
Alkyl halide to be used as a dormant species (R—I): CPI
Radical initiator (In): di(4-tert-butylcyclohexyl) peroxydicarbonate (PERKADOX16) or V70
Catalyst (XA): 1,4-cyclohexadiene (CHD) or DPM
$M_n$ and PDI: Molecular weight and polydispersity obtained by gel permeation chromatography (GPC) with tetrahydrofuran (THF) as an eluent calibrated by poly(methyl methacrylate) (PMMA) standard.
(Entries 8 to 16)

I$_2$ and an azo initiator (AIBN) were dissolved in a solvent (1,2-diethoxyethane, butyl acetate, or MFDG), and then the solution was poured into a Schlenk tube. The type and amount of the solvent used are shown in the column "Initial mixture" of Table 12B, below. The tube was covered with a three-way cock, and the replacement with argon was performed. The Schlenk tube was heated in an oil bath at 80° C. for 2.5 hours, during which the color of the solution turned from red to pale lemon. Thereafter, the Schlenk tube was immersed in an oil bath at designated temperature (40° C. or 50° C.), then a monomer, an azo initiator (V70), and a catalyst (CHD) were simultaneously added thereto, and the mixture was reacted at predetermined temperature (40° C. or 50° C.). The later-added materials are shown in the column "Later-added material" of Table 12B below. Moreover, the conditions used and the results are shown in Table 12B below.

Monomer: methyl methacrylate (MMA) and hydroxyethyl methacrylate (HEMA)
Solution polymerization
Solvent: 1,2-diethoxyethane, butyl acetate, or MFDG
Monomer concentration: 6 M when the solvent is 25%; 4 M when the solvent is 50%
Alkyl halide to be used as a dormant species (R—I): CPI
Radical initiator (In): AIBN, V70
Catalyst (XA): 1,4-cyclohexadiene (CHD)
$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 13

Random Copolymerization of Methyl Methacrylate (MMA) and N,N-dimethylmethacrylamide (DMMAm) with Precursor-Type Carbon Catalyst In a system similar to Example 2, experiments were conducted. However, the materials and conditions were changed as shown in Table 13 below. The results are shown in Table 13 below.

TABLE 13

| entry | monomer | R-X | In | XA | [R-X]0/[In]0/[XA]0(mM) | T (° C.) | t (min) | conv (%) | Mn | Mn, theo | PDI |
|---|---|---|---|---|---|---|---|---|---|---|---|
| 1 | MMA/DMMAm 4000/4000 | CPI | V70 | CHD | 80/80/10 | 40 | 240 | 32.1 | 2400 | 4100 | 1.46 |
| 2 | MMA/DMMAm 4000/4000 | CPI | AIBN | CHD | 80/120/10 | 80 | 60 | 32.4 | 2600 | 4200 | 1.45 |

Monomer: methyl methacrylate (MMA), N,N-dimethylmethacrylamide (DMMAm)
Monomer concentration: 8 M (bulk polymerization)
Alkyl halide to be used as a dormant species (R—I): CPI
Radical initiator (In): AIBN, V70
Catalyst (XA): 1,4-cyclohexadiene (CHD)
$M_n$ and PDI: Molecular weight and polydispersity obtained by gel permeation chromatography (GPC) with dimethylformamide (DMF) as an eluent calibrated by poly(methyl methacrylate) (PMMA) standard.

Example 14

Random Copolymerization of Methyl Methacrylate (MMA), Methacrylic Acid (MAA), and N,N-dimethylaminoethyl Methacrylate (DMAEMA) with Precursor-Type Carbon Catalyst In a system similar to Example 2, an experiment was conducted. However, the materials and condition were changed as shown in Table 14 below. The result is shown in Table 14 below.

TABLE 14

| entry | monomer | R-X | In | XA | [R-X]0/[In]0/[XA]0(mM) | T (° C.) | t (min) | conv (%) | Mn | Mn, theo | PDI |
|---|---|---|---|---|---|---|---|---|---|---|---|
| 1 | MMA/MAA/DMAEMA (2285/1143/571) | CPI | V70 | CHD | 40/60/5 (EtOH 50 wt %) | 40 | 120 | 53.8 | 5000 | 4900 | 1.47 |

Monomer: methylmethacrylate (MMA), methacrylic acid (MAA), N,N-dimethylaminoethyl methacrylate (DMAEMA)
Monomer concentration: 4 M
Solution polymerization (ethanol 50%)
Alkyl halide to be used as a dormant species (R—I): CPI
Radical initiator (In): V70
Catalyst (XA): 1,4-cyclohexadiene (CHD)
$M_n$ and PDI: Molecular weight and polydispersity obtained by gel permeation chromatography (GPC) with dimethylformamide (DMF) as an eluent calibrated by poly(methyl methacrylate) (PMMA) standard.

Example 15
Block Copolymerization of Methyl Methacrylate (MMA) and N,N-dimethylaminoethyl Methacrylate (DMAEMA) with Precursor-Type Carbon Catalyst A block copolymer, in which the first block is a homopolymer of MMA and the second block is a homopolymer of DMAEMA, was synthesized.

(The First Block)

In a system similar to Example 2, an experiment was conducted. However, the materials and conditions were changed as shown below. That is, as the first block, the bulk polymerization of MMA (8 M) was carried out at 80° C. for 1.5 hours using 2-cyanopropyl iodide (CP-I: 160 mM), azobis(isobutyronitrile) (AIBN: 40 mM), and 1,4-cyclohexadiene (CHD) (3 mM) as an alkyl iodide, a radical initiator, and catalyst, respectively. After the purification by reprecipitation with hexane, poly(methyl methacrylate)-iodide (PMMA-I) (Mn=2700, PDI=1.15) was obtained. Since the obtained polymer has an iodine at the terminal, this polymer (PMMA-I), as it was, was used as the first block in the reaction for synthesizing the second block.

(The Second Block)

In a system similar to Example 2, an experiment was conducted. However, as a starting material, the aforementioned PMMA-I was used in place of the alkyl halide. Further, the materials and condition were changed as shown in Table 15 below. The result was shown in Table 15 below.

TABLE 15

| entry | monomer | R-X | In | XA | [R-X]0/[In]0/[XA]0(mM) | T (° C.) | t (min) | conv (%) | Mn | Mn, theo | PDI |
|---|---|---|---|---|---|---|---|---|---|---|---|
| 1 | DMAEMA | PMMA-I | AIBN | CHD | 80/40/10 | 80 | 30 | 95.1 | 18700 | 15000 | 1.32 |

Monomer: N,N-dimethylaminoethyl methacrylate (DMAEMA)
Monomer concentration: 8 M (bulk polymerization)
The first block polymer: PMMA-I ($M_n$=2700, PDI=1.15)
Alkyl halide to be used as a dormant species (R—I): none
Radical initiator (In): AIBN
Catalyst (XA): 1,4-cyclohexadiene (CHD)
$M_n$ and PDT: Molecular weight and polydispersity obtained by gel permeation chromatography (GPC) with dimethylformamide (DMF) as an eluent calibrated by poly(N,N-dimethylaminoethyl methacrylate) (PDMAEMA) standard.

Example 16

Block Copolymerization with Precursor-Type Carbon Catalyst in which the First Block is a Homopolymer of Methyl Methacrylate (MMA) and the Second Block is a Random Copolymer of Methyl Methacrylate (MMA) and Methacrylic Acid (MAA)

A block copolymer in which the first block is a homopolymer of MMA and the second block is a random copolymer of MMA and MAA, was synthesized.

(The First Block)

PMMA-I (number average molecular weight: 2700, PDI=1.15) as it was, which was obtained by the synthesis of the first block in Example 17, was used as the first block in the reaction for synthesizing the second block.

(The Second Block)

In a system similar to Example 2, an experiment was conducted, with the proviso that as a starting material, the aforementioned PMMA-I was used in place of the alkyl halide. Further, the materials and conditions were changed as shown in Table 16 below. The result is shown in Table 16 below.

TABLE 16

| entry | monomer | R-X | In | XA | [R-X]0/[In]0/[XA]0(mM) | T (°C.) | t (min) | conv (%) | $M_n$ | $M_{n,theo}$ | PDI |
|---|---|---|---|---|---|---|---|---|---|---|---|
| 1 | MMA/MAA (4800/3200) | PMMA-I | V70 | CHD | 80/80/5 | 50 | 30 | 48.1 | 12500 | 7200 | 1.44 |

Monomer: N,N-dimethylaminoethyl methacrylate (DMAEMA)

Monomer concentration: 8 M (bulk polymerization)

The first block polymer: PMMA-I ($M_n$=2700, PDI=1.15)

Alkyl halide to be used as a dormant species (R—I): none

Radical initiator (In): V70

Catalyst (XA): 1,4-cyclohexadiene (CHD)

$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 17

Block Copolymerization of Methyl Methacrylate (MMA) (Homopolymerization: the First Block) and Benzyl Methacrylate (BzMA) (Homopolymerization: the Second Block) with Hydrocarbon (Precursor-Type Catalyst)

Successive Addition of MMA and BzMA

Block copolymerization in which homopolymerization of methyl methacrylate (MMA) is the first block and random copolymerization of MMA and benzyl methacrylate (BzMA) is the second block, was carried out using hydrocarbon (precursor-type catalyst). As the first block, the solution polymerization (toluene, 25 vol %) of MMA (6 M) was carried out at 80° C. for 2.5 hours in the presence of iodine ($I_2$) (30 mM), azobis(isobutyronitrile) (AIBN) (75 mM), and 1,4-cyclohexadiene (CHD) (5 mM) (catalyst), and consequently the rate of polymerization was 60% and a poly(methyl methacrylate)-iodine adduct (PMMA-I) ($M_n$=5,500, PDI=1.33) was produced. To the resulting solution (without isolation and purification of PMMA-I), BzMA and AIBN (0.005 equivalents to BzMA) were added, and then the polymerization was carried out at 80° C. As a result, as the second block, random copolymerization of MMA (unpolymerized monomer at the time of the first block) and BzMA occurred to produce PMMA-block-(PMMA-random-PBzMA) having narrow molecular weight distribution (Table 17 (entry 1)). It should be noted that PBzMA stands for poly benzyl methacrylate.

TABLE 17

Block copolymerization of methyl methacrylate (MMA) (homopolymerization: the first block) and benzyl methacrylate (BzMA) (homopolymerization: the second block) with hydrocarbon (precursor-type catalyst) - successive addition of MMA and BzMA

| entry | First monomer (equivalent to [R-I]$_0$) | Second monomer (equivalent to [R-I]$_0$) | R-I | In | catalyst | temperature (°C.) | [R-I]$_0$/[In]$_0$/[catalyst]$_0$ (mM) (first block) | time (min) | conv (%) | $M_n$ ($M_{n,theo}$) | PDI |
|---|---|---|---|---|---|---|---|---|---|---|---|
| 1 | MMA (100 equivalent) (25 vol % toluene) | BzMA (100 equivalent) | I2 | AIBN | CHD | 80 | 30/75/5 | 150 | 60 | 5500 (6000) | 1.33 |
| | | | | | | | | 60 | +54 | 15000 (18000) | 1.43 |

Monomer: methyl methacrylate (MMA), benzyl methacrylate (BzMA)

Monomer concentration: 6 M in the polymerization of the first monomer (Solution polymerization (75 vol % monomer))

Solvent: toluene (25 vol %) in the polymerization of the first monomer

Radical initiator (In): azobis(isobutyronitrile) (AIBN)

Catalyst (XA): 1,4-cyclohexadiene (CHD)
$M_n$ and PDI: Molecular weight and polydispersity obtained by gel permeation chromatography (GPC) with tetrahydrofuran (THF) as an eluent calibrated by poly(methyl methacrylate) (PMMA) standard.

Example 18

Surface Graft Polymerization of Benzylmethacrylate (BzMA) with Hydrocarbon (Precursor-Type Catalyst) from a Surface of a Silicon Substrate 6-(2-bromo-2-isobutyloxy)hexyltriethoxysilane (BHE: Scheme 4) (6.2 g: 15 mmol) and NaI (11.23 g: 75 mmol) were stirred in dry acetone (100 mL) at 50° C. for 2 days. Chloroform was added thereto. Precipitated NaI (which contained NaBr) was filtered. The filtrate was dried in vacuum. 6-(2-iodo-2-isobutyloxy)hexyltriethoxysilane (IHE: Scheme 4) was obtained with a yield of 98%.
(Scheme 4: Surface-initiated graft polymerization with 1,4-cyclohexadiene (CHD))

A silicon substrate was immersed in a solution of IHE (1 wt %) and $NH_3$ (1 wt %) in tetrahydrofuran (THF) for 12 hours to immobilize IHE on the surface of the silicone substrate.

In a solution containing benzyl methacrylate (BzMA) (3 g (6M)) as a monomer; toluene (1 g) as a solvent; 2-cyanopropyl iodide (CP-I) (0.0585 g (60 mM)) as an alkyl iodide; benzoyl peroxide (BPO) (0.048 g (40 mM)) as a radical initiator; 1,4-cyclohexadiene (CHD) (0.0012 g (3 mM)) as a catalyst; and $I_2$ (0.0013 g (1 mM)) as an additive for enhancing the ability to control the polymerization, the silicon substrate, on which IHE was immobilized, was immersed. It was heated at 80° C. for 3 hours (Table 18 (entry 1)). The free polymer (which was not immobilized on the substrate) produced in the solution had $M_n$ of 12,500, and PDI of 1.32. A polymer having narrow molecular weight distribution was obtained.

Film thickness of the graft polymer, which was grown from the surface of the substrate, was 14 nm. From previous cases, it has been understood that a molecular weight and molecular weight distribution of a free polymer and those of a graft polymer are approximately the same. Accordingly, the surface density of the graft polymer was calculated as 0.52 chains/nm². This surface density is very high and reaches a concentrated region. As described above, a concentrated polymer brush (graft polymer layer in the concentrated region), whose molecular weight distribution is controlled, was successfully produced.

TABLE 18

Surface graft polymerization of benzyl methacrylate (BzMA) with hydrocarbon (precursor-type catalyst) from a surface of a silicon substrate (A: Materials and conditions)

| entry | Monomer (equivalent to [R-I]₀) | solvent | R-I | In | catalyst | temperature (° C.) | [R-I]₀/[In]₀/ [catalyst]₀/ [I₂]₀ (mM) | time (min) |
|---|---|---|---|---|---|---|---|---|
| 1 | BzMA (100 eq) | toluene | CP-I and IHE immobilized on the silicon | BPO | CHD | 80 | 60/40/3/1 | 180 |

(B: Results)

| entry | conv (%) | $M_n$ ($M_{n, theo}$) | PDI | σ(chains/nm²) |
|---|---|---|---|---|
| 1 | 90 | 12500 (16000) | 1.32 | 0.52 |

Monomer: benzyl methacrylate (BzMA)
Monomer concentration: 6 M (Solution polymerization (monomer 75 vol %)
Solvent: toluene
Alkyl halide (R—I): 2-cyanopropyl iodide (CP-I) and 6-(2-iodo-2-isobutyloxy)hexyltriethoxysilane (IHE) immobilized on the silicon substrate
Radical initiator (In): benzoyl peroxide (BPO)
Catalyst (XA): 1,4-cyclohexadiene (CHD)
$M_n$ and PDI: Molecular weight and polydispersity determined by multi-angle laser light scattering (MALLS) detector with gel permeation chromatography (GPC) with tetrahydrofuran (THF) as an eluent.

Comparative Example 1

Polymerization experiments were performed similarly to Example 1, with the proviso that the following formulations were used:
Monomer: styrene, 8.0 M (1 g);
Alkyl halide: 1-phenylethyl bromide, 80 mM (0.016 g) (This is abbreviated as "PEB" in the following table);
Catalyst: CuBr 5 mM (0.00071 g); and
Ligand: 4,4'-di-(5-nonyl)-2,2'-bipyridine 10 mM (0.0035 g) (This is abbreviated as "dHbipy" in the following table)

A ligand is always required in order to dissolve CuBr (catalyst) in a monomer. In a case of dHbipy, two equivalents are required with respect to CuBr. The concentration of the catalyst in this experiment (CuBr complex concentration) was 5 mM. Please note that no peroxide was used in these experiments, since it is technical common knowledge of those skilled in the art that no peroxide is used in cases of copper complex catalysts. The reasons are as follows: (1) in the cases of copper complex catalysts, the radical reaction is initiated even if a peroxide is not used; and (2) if a peroxide is added to a copper complex catalyst, then an inactivation reaction of the growing species can occur significantly and as a result, the molecular weight distribution becomes broader. Specifically, for example, the aforementioned non-patent document 1 describes that a reaction material which contains no peroxide is used.

These materials were dissolved in a monomer to obtain a reaction solution. The reaction solution was heated to 80° C. The results are as follows.

TABLE 19

Result of polymerization with a copper complex

| No. | XA | [PEB]₀/[CuBr/2dHbipy]₀ (mM) | T (° C.) | t (h) | conv (%) | $M_n$ | PDI |
|---|---|---|---|---|---|---|---|
| 1 | CuBr | 80/5 | 80 | 2 | 1.8 | 1200 | 1.40 |
|   |      |      |    | 4 | 3.5 | 1300 | 1.40 |
|   |      |      |    | 8 | 6.0 | 1400 | 1.38 |

PEB: 1-phenylethyl bromide
dHbipy: a ligand for dissolving CuBr into a monomer (styrene)

As a result, the monomer conversion was much lower than those of MMA in Example 1. Further, the values of M after the reaction were 1200 to 1400, which are significantly low. Polystyrene having high molecular weight was not obtained. Furthermore, the values of $M_w/M_n$ (PDI) were much larger than the values in the experiments of Example 1 which uses the catalyst of the present invention. Therefore, the activity of the transition metal catalyst is significantly inferior than the activity of the catalyst of the present invention.

As can be seen from the comparison of the result of Comparative Example 1 and the results of Example 1, the catalyst of the present invention has a significantly higher activity than a transition metal complex catalyst used in the prior art.

The aforementioned Examples show that the present invention has superior properties in comparison with the catalysts in the prior art, which is disclosed in the prior art.

For example, according to the Example described in the aforementioned Non-Patent Document 1, the following reaction solution is subjected to a reaction:
styrene: 8.7 M (1 g);
1-phenylethyl bromide: 87 mM (0.016 g);
CuBr: 87 mM (0,013 g); and
4,4'-di-(5-nonyl)-2,2'-bipyridine: 174 mM (0.076 g).

This reaction solution was heated to 110° C. for 7 hours, and a polymer was obtained. 0.089 g of the complex compound was used with respect to 1 g of the monomer. That is, the catalyst was used in a large amount of 8.9 weight % based on the monomer.

In comparison with this example, the present invention can significantly reduce the amount of catalyst used, and can also reduce the reaction temperature by 10 to 40° C., without the need for a ligand.

As described above, the present invention has been illustrated using the preferred embodiments of the present invention. However, the present invention should not be construed to be limited to these embodiments. It is understood that the scope of the present invention should be construed solely on the basis of the claims. It is understood that those skilled in the art can carry out an invention within the scope equivalent to the description of the specification, based on the description of the specific preferred embodiments, the description of the present invention and the common technical knowledge. It is understood that the patents, patent applications, and other documents cited in the present specification should be incorporated by reference in the present specification as if the contents thereof are specifically described herein.

INDUSTRIAL APPLICABILITY

As described above, the inventors obtained an invention of a new living radical polymerization method (a precisely controlled radical polymerization), which uses a carbon atom as a central atom of a catalyst. The method is characterized by the low toxicity of the catalyst, low amount of the catalyst required, high solubility of the catalyst (a ligand is unnecessary), mild reaction conditions, no coloration, no odor (treatment after a polymerization reaction is unnecessary), and the like. The method is significantly more environmental-friendly and economically advantageous than the conventional living radical polymerization methods.

One half or more of the amount of polymer compounds produced in the world is produced by radical polymerizations. A living radical polymerization method can be applied to the production of a variety of high value added material. Specifically, it can be used for production of, for example, thermoplastic elastomer (material for automobiles, industrial articles, medical materials, footwear, sports articles, toys, materials for coating electrical wire, materials for buildings or construction, materials for modifying resins, and the like), materials for resistor, materials for organic electroluminescence device), adhesives, polymer alloy, various filler additives, lubricant, surfactant, paint, ink, packaging material, pharmaceuticals (for example, materials for sustained release medicaments), personal care products (cosmetics, hairdressings, and the like), and the like. The scale of the market is very large. The living radical polymerization of the present invention can be widely used as a satisfactory process for producing new electronic materials, optical materials, separation materials, or materials for a living body.

The biggest problem in the prior art concerning the practical utilization of living radical polymerization has been the high cost of the catalyst. That is, when a living radical polymerization is carried out, the catalyst enters a state in which the catalyst has been incorporated into the resulting polymer, and therefore, it takes time and effort to recover the catalyst from the polymer. This, as a result, increases the process costs enormously, and is not practical. For this reason, it is difficult to practically recover and recycle the catalyst, and under the current situation, the catalyst is substantially used once and thrown away.

The inventors of the present invention discovered that inexpensive carbon compounds act as excellent catalysts in a living radical polymerization, and thus realized living radical polymerization at far lower costs as compared with the conventional techniques. Specifically, when the cost of catalyst required in synthesizing 1 kg of a polymer is calculated based on the prices described in the catalogue of Sigma-Aldrich Company, for example, with copper complex catalyst that is most frequently used as a conventional type catalyst, the cost of catalyst sums approximately to several thousand yen. Further, even if a germanium catalyst is used, the cost sums to about one thousand yen. On the other hand, in the present invention, the cost sums only to several ten yen, or even to several yen, when catalysts of carbon-iodides or nitrogen iodides are used. When catalysts of far more inexpensive chlorides or the like are used, the cost for catalyst is further reduced. When far more inexpensive hydrocarbon compounds are used, the cost for catalyst is still further reduced. For example, in the case of the catalyst of a hydrocarbon compound described in the examples, the cost sums only to several yen to several hundredths of a yen. In other words, according to the present invention, it is possible to reduce the cost significantly, as compared with the conventional catalysts.

Upon considering that the prices of various general-purpose monomers are generally around 100 yen to several hundred yen per kilogram, the cost for catalyst that is about ten times the cost for monomer, was required in the conventional techniques. In this regard, the present invention requires the cost for catalyst that is only about one-tenth or about one-hundredth of the cost for monomer, and thus the cost reducing effect is dramatic.

In addition, the advantages possessed by germanium catalysts, such as low toxicity (or non-toxicity) of catalyst, high dissolubility (no need for ligand), mild reaction conditions, no coloration/no odor (no need for treatment after polymerization reaction), are all possessed by the catalyst and catalyst precursor of the present invention having oxygen as the central element. Furthermore, a polymerization can be controlled with an amount of catalyst that is far lower (for example, down to one-third) than the small amount of catalyst realized by germanium catalysts. Although germanium catalysts (iodides) are somehow sensitive to moisture and light, the catalyst and catalyst precursor having oxygen as the central element are resistant to moisture and light, and further facilitate the operation of polymerization. As such, the present invention exhibits high environmental safety which is not possessed by conventional processes, as well as excellent economic efficiency and superior convenience that exceed the conventional techniques by far, and is highly excellent in practicality.

Moreover, the carbon catalysts have particularly excellent functional-group-tolerance, and accordingly are expected to be utilized for various functional monomers that have a functional group, and have many practical applications.

The invention claimed is:

1. A polymerization method comprising a step of conducting a living radical polymerization, wherein the living radical polymerization step is conducted in the presence of a catalyst and an organic halide having a carbon-halogen bond, wherein the catalyst reversibly produces a radical from the organic halide having a carbon-halogen bond, and
wherein the catalyst comprises:
at least one central element consisting of carbon and
a halogen atom binding to the central element,
wherein the central element is further bound to two or three substituents which are electron-withdrawing substituents or substituents forming a resonance structure together with the central element,
wherein when the number of substituents is two, the two substituents may be linked to each other such that the central element and the two substituents form a ring structure,
when the number of substituents is three, two of the three substituents may be linked to each other such that the two linked substituents and the central element form a ring structure, or the three substituents may be linked to one another to form a ring structure, and
the substituent binding to the central element stabilizes a carbon radical that is generated by elimination of a halogen atom from the central element, and
wherein the method does not use a catalyst for living radical polymerization containing Ge, Sn, or Sb as a central element.

2. A polymerization method comprising a step of conducting a living radical polymerization, wherein the living radical polymerization step is conducted in the presence of a catalyst and an organic halide having a carbon-halogen bond, wherein the catalyst reversibly produces a radical from the organic halide having a carbon-halogen bond, and
the catalyst consists of a compound comprising
at least one central element consisting of carbon and
a halogen atom binding to the central element,
wherein the compound is represented by the following general formula (Ia):

[Formula 1]

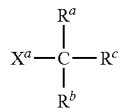

(Ia)

wherein $R^a$ is halogen, or an organic group having a double or triple bond;

when $R^a$ has a double or triple bond, one of the atoms constituting the double or triple bond is bound to the carbon of the central element in the aforementioned formula Ia;

$R^b$ is halogen, or an organic group having a double or triple bond;

when $R^b$ has a double or triple bond, one of the atoms constituting the double or triple bond is bound to the carbon of the central element in the aforementioned formula Ia;

$R^c$ is halogen, hydrogen, or an organic group having a double or triple bond;

when $R^c$ has a double or triple bond, one of the atoms constituting the double or triple bond is bound to the carbon of the central element in formula Ia;

$R^a$ and $R^b$ may be linked to each other such that $R^a$, $R^b$, and the central element form a ring;

$R^a$ and $R^c$ may be linked to each other such that $R^a$, $R^c$, and the central element form a ring;

$R^b$ and $R^c$ may be linked to each other such that $R^b$, $R^c$, and the central element form a ring;

$R^a$, $R^b$, and $R^c$ may be linked to one another such that $R^a$, $R^b$, and $R^c$ form a ring;

$X^a$ is halogen;

$R^a$ and $R^b$ may be taken together with the carbon atom of the central element to form an unsaturated aliphatic ring structure; and $R^a$, $R^b$, and $R^c$ may be taken together with the carbon atom of the central element to form an aromatic ring structure, and wherein the method does not use a catalyst for living radical polymerization containing Ge, Sn, or Sb as a central element.

3. The method according to claim 1, wherein the catalyst consists of a compound represented by the following general formula (Ib):

(Ib)

wherein $R^1$ is aryl, heteroaryl, substituted aryl, or substituted heteroaryl;

the substituent in the substituted aryl or substituted heteroaryl is lower alkyl, lower alkoxy, or cyano;

$X^1$ is halogen, and bound to a carbon atom in an aromatic ring structure of $R^1$; and h is an arbitrary positive integer which is not more than the number of carbon atoms in the aromatic ring structure of $R^1$.

4. The method according to claim 3, wherein $R^1$ is phenyl or substituted phenyl; the substituent in the substituted phenyl is lower alkyl, lower alkoxy, or cyano; and the number of substituents in the substituted phenyl is 1 to 5.

5. The method according to claim 2, wherein the catalyst consists of a compound represented by the following general formula (Ic):

$$CX^2{}_mI_n \qquad (Ic)$$

wherein $X^2$ is halogen, m and n are each integer from 1 to 3, and m+n=4.

6. A polymerization method comprising a step of conducting a living radical polymerization, wherein the living radical polymerization step is conducted in the presence of a catalyst and an organic halide having a carbon-halogen bond wherein the catalyst reversibly produces a radical from the organic halide having a carbon-halogen bond, and wherein the catalyst comprises:
at least one central element consisting of carbon and
a halogen atom binding to the central element,
wherein the central element is further bound to two or three electron-donating substituents capable of stabilizing a carbon radical that is generated by elimination of the halogen atom from the central element;
wherein when the number of substituents is two, the two substituents may be linked to each other such that the central element and the two substituents form a ring structure, and
when the number of substituents is three, two of the three substituents may be linked to each other such that the two linked substituents and the central element form a ring structure, or the three substituents may be linked to one another to form a ring structure, and
wherein the method does not use a catalyst for living radical polymerization containing Ge, Sn, or Sb as a central element.

7. A method of conducting a living radical polymerization, the method comprising:
reacting a radical generated from a radical initiator with a catalyst precursor compound to generate an activated radical; and
polymerizing a monomer having a radical-reactive unsaturated bond using the activated radical to obtain a polymer,
wherein the precursor compound has a carbon atom which becomes a central element, and the carbon atom which becomes the central element is bound to one or two hydrogen atoms, and bound to two or three substituents that are taken together with the central element to form a resonance structure;
wherein when the number of substituents is two, the two substituents may be linked to each other such that the central element and the two substituents form a ring structure,
when the number of substituents is three, two of the three substituents may be linked to each other such that the central element and the two linked substituents form a ring structure, or the three substituents may be linked to one another to form a ring structure;
a radical generated from the radical initiator abstracts a hydrogen atom from the carbon atom of the central element in the precursor compound to generate the activated radical;
the activated radical acts as a catalyst for a living radical polymerization in the polymerization reaction of the monomer;
the activated radical, which is generated after the abstraction of the hydrogen atom, is stabilized by a resonance structure formed by the central element and the substituents which are taken together.

8. The method according to claim 7, wherein the catalyst precursor compound is a hydrocarbon compound represented by the following formula (Id):

[Formula 2]

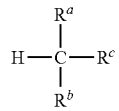

(Id)

wherein $R^a$ is an organic group having a double or triple bond, and one of atoms constituting the double or triple bond is bound to the carbon of the central element in the aforementioned formula Id;

$R^b$ is an organic group having a double or triple bond, and one of the atoms constituting the double or triple bond is bound to the carbon of the central element in the aforementioned formula Id;

$R^c$ is hydrogen, or an organic group having a double or triple bond;

when $R^c$ has a double or triple bond, one of the atoms constituting the double or triple bond is bound to the carbon of the central element in the aforementioned formula Id;

$R^a$ and $R^b$ may be linked to each other such that $R^a$, $R^b$, and the central element form a ring;

$R^a$ and $R^c$ may be linked to each other such that $R^a$, $R^c$, and the central element form a ring;

$R^b$ and $R^c$ may be linked to each other such that $R^b$, $R^c$, and the central element form a ring;

$R^a$, $R^b$, and $R^c$ may be linked to one another such that $R^a$, $R^b$, and $R^c$ form a ring; $R^a$ and $R^b$ may be taken together with the carbon atom of the central element to form an unsaturated aliphatic ring structure; and $R^a$, $R^b$, and $R^c$ may be taken together with the carbon atom of the central element to form an aromatic ring structure.

9. The method according to claim 8, wherein
$R^a$ is phenyl or substituted phenyl, the substituent in the substituted phenyl is lower alkyl, lower alkoxy, or cyano, and the number of substituents in the substituted phenyl is 1 to 5;
$R^b$ is phenyl or substituted phenyl, the substituent in the substituted phenyl is lower alkyl, lower alkoxy, or cyano, and the number of substituents in the substituted phenyl is 1 to 5; and
$R^c$ is hydrogen, phenyl, or substituted phenyl, the substituent in the substituted phenyl is lower alkyl, lower alkoxy, or cyano, and the number of substituents in the substituted phenyl is 1 to 5.

10. The method according to claim 8, wherein
$R^a$ and $R^b$ are taken together with the carbon atom of the central element to form 1,4-cyclohexanediene or substituted 1,4-cyclohexanediene, and
$R^c$ is hydrogen, phenyl, or substituted phenyl, the substituent in the substituted phenyl is lower alkyl, lower alkoxy, or cyano, the number of substituents in the substituted phenyl is 1 to 5.

11. The method according to claim 1, wherein the carbon atom of the central element which is bound to a halogen in the organic halide, is bound to two methyl groups or is bound to one methyl group and one hydrogen.

12. The method according to claim 1, wherein a halogen in the organic halide is iodine or bromine.

13. The method according to claim 1, wherein a halogen in the organic halide is iodine.

14. The method according to claim 1, which comprises mixing an azo-type radical initiator with a halogen molecule in a reaction solution, and decomposing the azo-type radical initiator in the reaction solution to produce an organic halide.

15. The method according to claim 1, wherein a concentration of the catalyst in a reaction solution is 0.75 wt % or less.

16. The method according to claim 1, wherein a reaction temperature is 20° C. to 100° C.

17. The method according to claim 8, wherein, in the catalyst precursor compound,
   $R^a$ is an organic group having a double bond, one of the atoms constituting the double bond is bound to the carbon of the central element in formula Id, and an atom binding to the central element is carbon;
   $R^b$ is an organic group having a double bond, one of the atoms constituting the double bond is bound to the carbon of the central element in formula Id, and an atom binding to the central element is carbon; and
   $R^c$ is hydrogen.

18. The method according to claim 7, wherein the catalyst precursor is selected from the group consisting of:
1,4-cyclohexadiene;
diphenylmethane;
dimesitylmethane;
fluorene;
xanthene;
thioxanthene; and
diethyl malonate.

19. The method according to claim 1, wherein
   a catalyst is used in the living radical polymerization reaction wherein the catalyst is selected from the group consisting of:
iodobenzene;
2,4,6-trimethyliodobenzene;
4-iodoanisole;
3-cyanoiodobenzene;
tetraiodomethane; and
difluorodiiodomethane.

20. A method of using the catalyst according to claim 1 in a living radical polymerization, wherein the living radical polymerization step is conducted in the presence of the catalyst and an organic halide having a carbon-halogen bond, wherein the catalyst reversibly produces a radical from the organic halide having a carbon-halogen bond.

* * * * *

UNITED STATES PATENT AND TRADEMARK OFFICE
CERTIFICATE OF CORRECTION

PATENT NO. : 8,575,285 B2  Page 1 of 1
APPLICATION NO. : 13/062688
DATED : November 5, 2013
INVENTOR(S) : Goto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 114 days.

Signed and Sealed this
Twenty-second Day of September, 2015

Michelle K. Lee
*Director of the United States Patent and Trademark Office*